United States Patent
Firminger et al.

(10) Patent No.: US 8,127,002 B2
(45) Date of Patent: *Feb. 28, 2012

(54) HYPOTHESIS DEVELOPMENT BASED ON USER AND SENSING DEVICE DATA

(75) Inventors: Shawn P. Firminger, Redmond, WA (US); Jason Garms, Redmond, WA (US); Edward K. Y. Jung, Bellevue, WA (US); Chris D. Karkanias, Sammamish, WA (US); Eric C. Leuthardt, St. Louis, MO (US); Royce A. Levien, Lexington, MA (US); Robert W. Lord, Seattle, WA (US); Mark A. Malamud, Seattle, WA (US); John D. Rinaldo, Jr., Bellevue, WA (US); Clarence T. Tegreene, Bellevue, WA (US); Kristin M. Tolle, Redmond, WA (US); Lowell L. Wood, Jr., Bellevue, WA (US)

(73) Assignee: The Invention Science Fund I, LLC, Bellevue, WA (US)

(*) Notice: Subject to any disclaimer, the term of this patent is extended or adjusted under 35 U.S.C. 154(b) by 179 days.

This patent is subject to a terminal disclaimer.

(21) Appl. No.: 12/459,775

(22) Filed: Jul. 6, 2009

(65) Prior Publication Data

US 2010/0131963 A1 May 27, 2010

Related U.S. Application Data

(63) Continuation-in-part of application No. 12/456,433, filed on Jun. 15, 2009, and a continuation-in-part of application No. 12/456,249, filed on Jun. 12, 2009, and a continuation-in-part of application No. 12/455,317, filed on May 29, 2009, and a continuation-in-part of application No. 12/455,309, filed on May 28, 2009, now Pat. No. 8,010,664, and a continuation-in-part of application No. 12/387,487, filed on Apr. 30, 2009, and (Continued)

(51) Int. Cl.
*G06F 15/16* (2006.01)
*G06N 5/02* (2006.01)

(52) U.S. Cl. ........ 709/224; 709/206; 709/217; 707/755; 707/687; 707/736; 706/52; 706/46; 706/12; 706/11

(58) Field of Classification Search .................. 709/203, 709/206, 224

See application file for complete search history.

(56) References Cited

U.S. PATENT DOCUMENTS 3,599,149 A 8/1971 Pardoe (Continued)

FOREIGN PATENT DOCUMENTS

WO WO 99/18842 4/1999

OTHER PUBLICATIONS

Buchanan, Matt; "Twitter Toilet Tweets Your Poo"; Gizmodo.com; Bearing a date of May 18, 2009; Printed on Jul. 1, 2009; pp. 1-2; located at http://gizmodo.com/5259381/twitter-toilet-tweets-your-poo.

(Continued)

*Primary Examiner* — Jude Jean Gilles

(57) ABSTRACT

A computationally implemented method includes, but is not limited to: acquiring a first data indicating at least one reported event as originally reported by a user and a second data indicating at least a second reported event as originally reported by one or more sensing devices; and developing a hypothesis based, at least in part, on the first data and the second data. In addition to the foregoing, other method aspects are described in the claims, drawings, and text forming a part of the present disclosure.

45 Claims, 28 Drawing Sheets

Related U.S. Application Data a continuation-in-part of application No. 12/387,465, filed on Apr. 30, 2009, and a continuation-in-part of application No. 12/384,779, filed on Apr. 7, 2009, and a continuation-in-part of application No. 12/384,660, filed on Apr. 6, 2009, and a continuation-in-part of application No. 12/383,817, filed on Mar. 25, 2009, now Pat. No. 8,010,663, and a continuation-in-part of application No. 12/383,581, filed on Mar. 24, 2009, and a continuation-in-part of application No. 12/380,573, filed on Feb. 26, 2009, and a continuation-in-part of application No. 12/380,409, filed on Feb. 25, 2009, now Pat. No. 8,010,662, and a continuation-in-part of application No. 12/378,288, filed on Feb. 11, 2009, now Pat. No. 8,032,628, and a continuation-in-part of application No. 12/378,162, filed on Feb. 9, 2009, now Pat. No. 8,028,063, and a continuation-in-part of application No. 12/319,135, filed on Dec. 31, 2008, now Pat. No. 7,937,465, and a continuation-in-part of application No. 12/319,134, filed on Dec. 31, 2008, now Pat. No. 7,945,632, and a continuation-in-part of application No. 12/315,083, filed on Nov. 26, 2008, now Pat. No. 8,005,948, and a continuation-in-part of application No. 12/313,659, filed on Nov. 21, 2008, now Pat. No. 8,046,455.

(56) References Cited

U.S. PATENT DOCUMENTS

| | | | |
|---|---|---|---|
| 7,203,430 | B2 | 4/2007 | Ohta |
| 7,400,928 | B2 | 7/2008 | Hatlestsad |
| 7,627,544 | B2 | 12/2009 | Chkodrov et al. |
| 7,937,465 | B2* | 5/2011 | Firminger et al. ............ 709/224 |
| 7,945,632 | B2* | 5/2011 | Firminger et al. ............ 709/206 |
| 8,005,948 | B2* | 8/2011 | Firminger et al. ............ 709/224 |
| 8,010,604 | B2 | 8/2011 | Lapstun et al. |
| 8,010,662 | B2* | 8/2011 | Firminger et al. ............ 709/224 |
| 8,010,663 | B2* | 8/2011 | Firminger et al. ............ 709/224 |
| 8,010,664 | B2* | 8/2011 | Firminger et al. ............ 709/224 |
| 8,028,063 | B2* | 9/2011 | Firminger et al. ............ 709/224 |
| 8,032,628 | B2* | 10/2011 | Firminger et al. ............ 709/224 |
| 8,046,455 | B2* | 10/2011 | Firminger et al. ............ 709/224 |
| 2003/0166277 | A1 | 9/2003 | Zauderer et al. |
| 2004/0103108 | A1 | 5/2004 | Andreev et al. |
| 2005/0102578 | A1 | 5/2005 | Bliss et al. |
| 2006/0034430 | A1 | 2/2006 | Liakis |
| 2007/0293731 | A1 | 12/2007 | Downs et al. |
| 2008/0034056 | A1 | 2/2008 | Renger et al. |
| 2008/0091515 | A1 | 4/2008 | Thieberger et al. |
| 2008/0215607 | A1 | 9/2008 | Kaushansky et al. |
| 2008/0218472 | A1 | 9/2008 | Breen et al. |
| 2009/0049154 | A1 | 2/2009 | Ge |
| 2009/0077658 | A1 | 3/2009 | King et al. |
| 2009/0132197 | A1 | 5/2009 | Rubin et al. |
| 2009/0240647 | A1 | 9/2009 | Green et al. |
| 2009/0276221 | A1* | 11/2009 | Heiman et al. ................ 704/270 |
| 2009/0326981 | A1 | 12/2009 | Karkanias et al. |
| 2010/0010866 | A1 | 1/2010 | Bal et al. |
| 2010/0088104 | A1* | 4/2010 | DeRemer et al. .............. 705/1.1 |
| 2010/0092095 | A1 | 4/2010 | King et al. |

OTHER PUBLICATIONS

"Find Patterns in Data that Identify Combinations of Events that Occur Together"; SPSS Association Rule Components; Bearing a date of 2002; 5 Total Pages; SPSS Inc.; located at: http://www.spss.com/spssetd/files/AssocRuleTech.pdf.

"Find Sequential Patterns in Data to Predict Events More Accurately"; SPSS Sequence Association™ Component; Bearing a date of 2002; pp. 1-5; SPSS Inc.; located at: http://www.spss.com/spssetd/files/sequencetech.pdf.

Fox, Stuart; "The John 2.0"; Popular Science; Bearing a date of May 18, 2009; Printed on Jul. 1, 2009; pp. 1-2; located at http://www.popsci.com/scitech/article/2009-05/john-20.

Frucci, Adam; "SNIF Dog Tags Track What Your Dog Does All Day; Spoiler: Eat, Sleep, Poop"; Gizmodo.com; Bearing a date of Jun. 10, 2009; Printed on Jul. 1, 2009; pp. 1-2; located at http://i.gizmodo.com/5286076/snif-dog-tags-track-what-your-dog-does-all-day-spoiler-eat-sleep-poop.

"Hacklab.Toilet—a twitter-enabled toilet at hacklab.to"; Aculei.net; Printed on Jul. 1, 2009; pp. 1-8; located at http://aculei.net/~shardy/hacklabtoilet/.

Hansen, et al.; "Microblogging—Facilitating Tacit Knowledge?"—A Second Year Term Paper; Information Management Study at Copenhagen Business School; Bearing a date of 2008; pp. 1-42; located at http://www.scribd.com/doc/3460679/Microblogging-as-a-Facilitator-for-Tacit-Knowledge.

June, Laura; "Apple patent filing shows off activity monitor for skiers, bikers"; Engadget.com; Bearing a date of Jun. 11, 2009; Printed on Jul. 1, 2009; pp. 1-8; located at http://www.engadget.com/2009/06/11/apple-patent-filing-shows-off-activity-monitor-for-skiers-biker/.

Kraft, Caleb; "Twittering toilet"; Hackaday.com; Bearing a dated of May 5, 2009; Printed on Jul. 1, 2009; pp. 1-11; located at http://hackaday.com/2009/05/05/twittering-toilet/.

"Mobile pollution sensors deployed"; BBC News; Bearing a date of Jun. 30, 2009; Printed on Jul. 1, 2009; pp. 1-2; located at http://news.bbc.co.uk/2/hi/science/nature/8126498.stm; BBC MMIX.

Morales, et al.; "Using Sequential Pattern Mining for Links Recommendation in Adaptive Hypermedia Educational Systems"; Current Developments in Technology-Assisted Education; Bearing a date of 2006; pp. 1016-1020; Formatex 2006; located at: http://www.formatex.org/micte2006/pdf/1016-1020.pdf.

Nesbit, et al.; "Sequential Pattern Analysis Software for Educational Event Data"; pp. 1-5; Simon Fraser University, Burnaby, Canada; located at: http://www.sfu.ca/~mzhou2/temp/MB2008_1.pdf.

Oliver, Sam; "Apple developing activity monitor for skiers, snowboarders, bikers"; AppleInsider; Bearing a date of Jun. 11, 2009; Printed on Jul. 1, 2009; pp. 1-6; located at http://www.appleinsider.com/articles/09/06/11/apple_developing_activity_monitor_for_skiers_snowboarders_bikers.html; AppleInsider.

Reiss, M.; "Correlations Between Changes in Mental States and Thyroid Activity After Different Forms of Treatment"; The British Journal of Psychology—Journal of Mental Science; Bearing dates of Mar. 6, 1954 and 1954; pp. 687-703 [Abstract only provided]; located at http://bjp.rcpsych.org/cgi/content/abstract/100/420/687; The Royal College of Psychiatrists.

Rettner, Rachael; "Technology, Cell Phones Allow Everyone to Be a Scientist"; LiveScience; Bearing a date of Jun. 4, 2009; Printed on Jul. 1, 2009; pp. 1-3; located at http://www.livescience.com/technology/090604-mobile-sensor.html; Imaginova Corp.

U.S. Appl. No. 12/462,201, Firminger et al.
U.S. Appl. No. 12/462,128, Firminger et al.
U.S. Appl. No. 12/459,854, Firminger et al.
U.S. Appl. No. 12/456,433, Firminger et al.
U.S. Appl. No. 12/456,249, Firminger et al.
U.S. Appl. No. 12/455,317, Firminger et al.
U.S. Appl. No. 12/455,309, Firminger et al.
U.S. Appl. No. 12/387,487, Firminger et al.
U.S. Appl. No. 12/387,465, Firminger et al.
U.S. Appl. No. 12/384,779, Firminger et al.
U.S. Appl. No. 12/384,660, Firminger et al.
U.S. Appl. No. 12/383,817, Firminger et al.
U.S. Appl. No. 12/383,581, Firminger et al.
U.S. Appl. No. 12/380,573, Firminger et al.
U.S. Appl. No. 12/380,409, Firminger et al.
U.S. Appl. No. 12/378,288, Firminger et al.
U.S. Appl. No. 12/378,162, Firminger et al.
U.S. Appl. No. 12/319,135, Firminger et al.
U.S. Appl. No. 12/319,134, Firminger et al.
U.S. Appl. No. 12/315,083, Firminger et al.
U.S. Appl. No. 12/313,659, Firminger et al.

Diaz, Jesus; "One Day, This Will Be Remembered as the First Real Tricorder"; gizmodo.com; bearing a date of Nov. 12, 2009; pp. 1-2;

located at http://gizmodo.com/5403126/one-day-this-will-be-remembered-as-the . . . ; printed on Nov. 25, 2009.

Gross, Daniel; "A Jewish Mother in Your Cell Phone"; Slate; bearing a date of Nov. 10, 2009; pp. 1-3; located at http://www.slate.com/formatdynamics/CleanPrintProxy.aspx?125919 . . . ; printed on Nov. 25, 2009.

Agger, Michael; "Every Day We Write the Book: What would happen if Facebook made its data available for research?"; Slate; bearing date of Nov. 30, 2010; printed on Dec. 10, 2010; pp. 1-3; located at: http://www.slate.com/formatdynamics/CleanPrintProxy.aspx?1292008532368.

"Self-tracking links to get you started"; The Quantified Self: self knowledge through numbers; printed on Dec. 10, 2010; pp. 1-5; located at: http://quantifiedself.com/self-tracking-links-to-get-you-started/.

Karimi, A. et al.; "A Predictive Location Model for Location-Based Services"; *GIS'03*; Nov. 7-8, 2003; pp. 126-133; ACM.

Ulicny, B. et al.; "New Metrics for Blog Mining"; Data Mining, Intrusion Detection, Information Assurance, and Data Networks Security 2007; Proceedings of the SPIE; 2007; 12 pages; vol. 6570.

* cited by examiner

**35\* Sensing Device[s]**

281 Physiological Sensor Device[s]

- 282 Heart Rate Sensor Device
- 283 Blood Pressure Sensor Device
- 284 Blood Glucose Sensor Device
- 285 fMRI Device
- 286 fNIR Device
- 287 Blood Alcohol Sensor Device
- 288 Temperature Sensor Device
- 289 Respiration Sensor Device
- 322 Blood Cell-Sorting Sensor Device

290 Imaging System Device[s]

291 User Activity Sensing Device[s]

- 292 Pedometer
- 293 Accelerometer
- 294 Image Capturing Device
- 295 Toilet Monitoring Device
- 296 Exercise Machine Sensor Device

- 297 GPS
- 298 Environmental Temperature Sensor Device
- 299 Environmental Humidity Sensor Device
- 320 Environmental Air Pollution Sensor Device

FIG. 2d

HYPOTHESIS DEVELOPMENT BASED ON USER AND SENSING DEVICE DATA

CROSS-REFERENCE TO RELATED APPLICATIONS

The present application is related to and claims the benefit of the earliest available effective filing date(s) from the following listed application(s) (the "Related Applications") (e.g., claims earliest available priority dates for other than provisional patent applications or claims benefits under 35 USC §119(e) for provisional patent applications, for any and all parent, grandparent, great-grandparent, etc. applications of the Related Application(s)). All subject matter of the Related Applications and of any and all parent, grandparent, great-grandparent, etc. applications of the Related Applications is incorporated herein by reference to the extent such subject matter is not inconsistent herewith.

RELATED APPLICATIONS

For purposes of the USPTO extra-statutory requirements, the present application constitutes a continuation-in-part of U.S. patent application Ser. No. 12/313,659, entitled CORRELATING SUBJECTIVE USER STATES WITH OBJECTIVE OCCURRENCES ASSOCIATED WITH A USER, naming Shawn P. Firminger, Jason Garms, Edward K. Y. Jung, Chris D. Karkanias, Eric C. Leuthardt, Royce A. Levien, Robert W. Lord, Mark A. Malamud, John D. Rinaldo, Jr., Clarence T. Tegreene, Kristin M. Tolle, and Lowell L. Wood, Jr., as inventors, filed 21 Nov. 2008, now U.S. Pat. No. 8,046,455 which is currently co-pending, or is an application of which a currently co-pending application is entitled to the benefit of the filing date.

For purposes of the USPTO extra-statutory requirements, the present application constitutes a continuation-in-part of U.S. patent application Ser. No. 12/315,083, entitled CORRELATING SUBJECTIVE USER STATES WITH OBJECTIVE OCCURRENCES ASSOCIATED WITH A USER, naming Shawn P. Firminger, Jason Garms, Edward K. Y. Jung, Chris D. Karkanias, Eric C. Leuthardt, Royce A. Levien, Robert W. Lord, Mark A. Malamud, John D. Rinaldo, Jr., Clarence T. Tegreene, Kristin M. Tolle, and Lowell L. Wood, Jr., as inventors, filed 26 Nov. 2008, now U.S. Pat. No. 8,005,948 which is currently co-pending, or is an application of which a currently co-pending application is entitled to the benefit of the filing date.

For purposes of the USPTO extra-statutory requirements, the present application constitutes a continuation-in-part of U.S. patent application Ser. No. 12/319,135, entitled CORRELATING DATA INDICATING AT LEAST ONE SUBJECTIVE USER STATE WITH DATA INDICATING AT LEAST ONE OBJECTIVE OCCURRENCE ASSOCIATED WITH A USER, naming Shawn P. Firminger; Jason Garms; Edward K. Y. Jung; Chris D. Karkanias; Eric C. Leuthardt; Royce A. Levien; Robert W. Lord; Mark A. Malamud; John D. Rinaldo, Jr.; Clarence T. Tegreene; Kristin M. Tolle; Lowell L. Wood, Jr. as inventors, filed 31 Dec. 2008, now U.S. Pat. No. 7,937,465 which is currently co-pending, or is an application of which a currently co-pending application is entitled to the benefit of the filing date.

For purposes of the USPTO extra-statutory requirements, the present application constitutes a continuation-in-part of U.S. patent application Ser. No. 12/319,134, entitled CORRELATING DATA INDICATING AT LEAST ONE SUBJECTIVE USER STATE WITH DATA INDICATING AT LEAST ONE OBJECTIVE OCCURRENCE ASSOCIATED WITH A USER, naming Shawn P. Firminger; Jason Garms; Edward K. Y. Jung; Chris D. Karkanias; Eric C. Leuthardt; Royce A. Levien; Robert W. Lord; Mark A. Malamud; John D. Rinaldo, Jr.; Clarence T. Tegreene; Kristin M. Tolle; Lowell L. Wood, Jr. as inventors, filed 31 Dec. 2008, now U.S. Pat. No. 7,945,632 which is currently co-pending, or is an application of which a currently co-pending application is entitled to the benefit of the filing date.

For purposes of the USPTO extra-statutory requirements, the present application constitutes a continuation-in-part of U.S. patent application Ser. No. 12/378,162, entitled SOLICITING DATA INDICATING AT LEAST ONE OBJECTIVE OCCURRENCE IN RESPONSE TO ACQUISITION OF DATA INDICATING AT LEAST ONE SUBJECTIVE USER STATE, naming Shawn P. Firminger; Jason Garms; Edward K. Y. Jung; Chris D. Karkanias; Eric C. Leuthardt; Royce A. Levien; Robert W. Lord; Mark A. Malamud; John D. Rinaldo, Jr.; Clarence T. Tegreene; Kristin M. Tolle; Lowell L. Wood, Jr. as inventors, filed 9 Feb. 2009, now U.S. Pat. No. 8,028,063 which is currently co-pending, or is an application of which a currently co-pending application is entitled to the benefit of the filing date.

For purposes of the USPTO extra-statutory requirements, the present application constitutes a continuation-in-part of U.S. patent application Ser. No. 12/378,288, entitled SOLICITING DATA INDICATING AT LEAST ONE OBJECTIVE OCCURRENCE IN RESPONSE TO ACQUISITION OF DATA INDICATING AT LEAST ONE SUBJECTIVE USER STATE, naming Shawn P. Firminger; Jason Garms; Edward K. Y. Jung; Chris D. Karkanias; Eric C. Leuthardt; Royce A. Levien; Robert W. Lord; Mark A. Malamud; John D. Rinaldo, Jr.; Clarence T. Tegreene; Kristin M. Tolle; Lowell L. Wood, Jr. as inventors, filed 11 Feb. 2009, now U.S. Pat. No. 8,032,628 which is currently co-pending, or is an application of which a currently co-pending application is entitled to the benefit of the filing date.

For purposes of the USPTO extra-statutory requirements, the present application constitutes a continuation-in-part of U.S. patent application Ser. No. 12/380,409, entitled SOLICITING DATA INDICATING AT LEAST ONE SUBJECTIVE USER STATE IN RESPONSE TO ACQUISITION OF DATA INDICATING AT LEAST ONE OBJECTIVE OCCURRENCE, naming Shawn P. Firminger; Jason Garms; Edward K. Y. Jung; Chris D. Karkanias; Eric C. Leuthardt; Royce A. Levien; Robert W. Lord; Mark A. Malamud; John D. Rinaldo, Jr.; Clarence T. Tegreene; Kristin M. Tolle; Lowell L. Wood, Jr. as inventors, filed 25 Feb. 2009, now U.S. Pat. No. 8,010,662 which is currently co-pending, or is an application of which a currently co-pending application is entitled to the benefit of the filing date.

For purposes of the USPTO extra-statutory requirements, the present application constitutes a continuation-in-part of U.S. patent application Ser. No. 12/380,573, entitled SOLICITING DATA INDICATING AT LEAST ONE SUBJECTIVE USER STATE IN RESPONSE TO ACQUISITION OF DATA INDICATING AT LEAST ONE OBJECTIVE OCCURRENCE, naming Shawn P. Firminger; Jason Garms; Edward K. Y. Jung; Chris D. Karkanias; Eric C. Leuthardt; Royce A. Levien; Robert W. Lord; Mark A. Malamud; John D. Rinaldo, Jr.; Clarence T. Tegreene; Kristin M. Tolle; Lowell L. Wood, Jr. as inventors, filed 26 Feb. 2009, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 12/383,581, entitled COR- RELATING DATA INDICATING SUBJECTIVE USER STATES ASSOCIATED WITH MULTIPLE USERS WITH DATA INDICATING OBJECTIVE OCCURRENCES, naming Shawn P. Firminger, Jason Garms, Edward K. Y. Jung, Chris D. Karkanias, Eric C. Leuthardt, Royce A. Levien, Robert W. Lord, Mark A. Malamud, John D. Rinaldo, Jr., Clarence T. Tegreene, Kristin M. Tolle, and Lowell L. Wood, Jr., as inventors, filed 24 Mar. 2009, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 12/383,817, entitled CORRELATING DATA INDICATING SUBJECTIVE USER STATES ASSOCIATED WITH MULTIPLE USERS WITH DATA INDICATING OBJECTIVE OCCURRENCES, naming Shawn P. Firminger, Jason Garms, Edward K. Y. Jung, Chris D. Karkanias, Eric C. Leuthardt, Royce A. Levien, Robert W. Lord, Mark A. Malamud, John D. Rinaldo, Jr., Clarence T. Tegreene, Kristin M. Tolle, and Lowell L. Wood, Jr., as inventors, filed 25 Mar. 2009, now U.S. Pat. No. 8,010,663 which is currently co-pending, or is an application of which a currently co-pending application is entitled to the benefit of the filing date.

For purposes of the USPTO extra-statutory requirements, the present application constitutes a continuation-in-part of U.S. patent application Ser. No. 12/384,660, entitled HYPOTHESIS BASED SOLICITATION OF DATA INDICATING AT LEAST ONE SUBJECTIVE USER STATE, naming Shawn P. Firminger, Jason Garms, Edward K. Y. Jung, Chris D. Karkanias, Eric C. Leuthardt, Royce A. Levien, Robert W. Lord, Mark A. Malamud, John D. Rinaldo, Jr., Clarence T. Tegreene, Kristin M. Tolle, and Lowell L. Wood, Jr., as inventors, filed 6 Apr. 2009, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 12/384,779, entitled HYPOTHESIS BASED SOLICITATION OF DATA INDICATING AT LEAST ONE SUBJECTIVE USER STATE, naming Shawn P. Firminger, Jason Garms, Edward K. Y. Jung, Chris D. Karkanias, Eric C. Leuthardt, Royce A. Levien, Robert W. Lord, Mark A. Malamud, John D. Rinaldo, Jr., Clarence T. Tegreene, Kristin M. Tolle, and Lowell L. Wood, Jr., as inventors, filed 7 Apr. 2009, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 12/387,487, entitled HYPOTHESIS BASED SOLICITATION OF DATA INDICATING AT LEAST ONE OBJECTIVE OCCURRENCE, naming Shawn P. Firminger, Jason Garms, Edward K. Y. Jung, Chris D. Karkanias, Eric C. Leuthardt, Royce A. Levien, Robert W. Lord, Mark A. Malamud, John D. Rinaldo, Jr., Clarence T. Tegreene, Kristin M. Tolle, and Lowell L. Wood, Jr., as inventors, filed 30 Apr. 2009, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 12/387,465, entitled HYPOTHESIS BASED SOLICITATION OF DATA INDICATING AT LEAST ONE OBJECTIVE OCCURRENCE, naming Shawn P. Firminger, Jason Garms, Edward K. Y. Jung, Chris D. Karkanias, Eric C. Leuthardt, Royce A. Levien, Robert W. Lord, Mark A. Malamud, John D. Rinaldo, Jr., Clarence T. Tegreene, Kristin M. Tolle, and Lowell L. Wood, Jr., as inventors, filed 30 Apr. 2009, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 12/455,309, entitled HYPOTHESIS DEVELOPMENT BASED ON SELECTIVE REPORTED EVENTS, naming Shawn P. Firminger, Jason Garms, Edward K. Y. Jung, Chris D. Karkanias, Eric C. Leuthardt, Royce A. Levien, Robert W. Lord, Mark A. Malamud, John D. Rinaldo, Jr., Clarence T. Tegreene, Kristin M. Tolle, and Lowell L. Wood, Jr., as inventors, filed 28 May 2009, now U.S. Pat. No. 8,010,664 which is currently co-pending, or is an application of which a currently co-pending application is entitled to the benefit of the filing date.

For purposes of the USPTO extra-statutory requirements, the present application constitutes a continuation-in-part of U.S. patent application Ser. No. 12/455,317, entitled HYPOTHESIS DEVELOPMENT BASED ON SELECTIVE REPORTED EVENTS, naming Shawn P. Firminger, Jason Garms, Edward K. Y. Jung, Chris D. Karkanias, Eric C. Leuthardt, Royce A. Levien, Robert W. Lord, Mark A. Malamud, John D. Rinaldo, Jr., Clarence T. Tegreene, Kristin M. Tolle, and Lowell L. Wood, Jr., as inventors, filed 29 May 2009, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 12/456,249, entitled HYPOTHESIS SELECTION AND PRESENTATION OF ONE OR MORE ADVISORIES, naming Shawn P. Firminger, Jason Garms, Edward K. Y. Jung, Chris D. Karkanias, Eric C. Leuthardt, Royce A. Levien, Robert W. Lord, Mark A. Malamud, John D. Rinaldo, Jr., Clarence T. Tegreene, Kristin M. Tolle, and Lowell L. Wood, Jr., as inventors, filed 12 Jun. 2009, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 12/456,433, entitled HYPOTHESIS SELECTION AND PRESENTATION OF ONE OR MORE ADVISORIES, naming Shawn P. Firminger, Jason Garms, Edward K. Y. Jung, Chris D. Karkanias, Eric C. Leuthardt, Royce A. Levien, Robert W. Lord, Mark A. Malamud, John D. Rinaldo, Jr., Clarence T. Tegreene, Kristin M. Tolle, and Lowell L. Wood, Jr., as inventors, filed 15 Jun. 2009, which is currently co-pending, or is an application of which a currently co-pending application is entitled to the benefit of the filing date.

The United States Patent Office (USPTO) has published a notice to the effect that the USPTO's computer programs require that patent applicants reference both a serial number and indicate whether an application is a continuation or continuation-in-part. Stephen G. Kunin, *Benefit of Prior-Filed Application*, USPTO Official Gazette Mar. 18, 2003, available at http://www.uspto.gov/web/offices/com/sol/og/2003/week11/patbene.htm. The present Applicant Entity (hereinafter "Applicant") has provided above a specific reference to the application(s) from which priority is being claimed as recited by statute. Applicant understands that the statute is unambiguous in its specific reference language and does not require either a serial number or any characterization, such as "continuation" or "continuation-in-part," for claiming priority to U.S. patent applications. Notwithstanding the foregoing, Applicant understands that the USPTO's computer programs have certain data entry requirements, and hence Applicant is designating the present application as a continuation-in-part of its parent applications as set forth above, but expressly points out that such designations are not to be construed in any way as any type of commentary and/or admission as to whether or not the present application contains any new matter in addition to the matter of its parent application(s).

All subject matter of the Related Applications and of any and all parent, grandparent, great-grandparent, etc. applications of the Related Applications is incorporated herein by reference to the extent such subject matter is not inconsistent herewith.

SUMMARY

A computationally implemented method includes, but is not limited to acquiring a first data indicating at least one reported event as originally reported by a user and a second data indicating at least a second reported event as originally reported by one or more sensing devices; and developing a hypothesis based, at least in part, on the first data and the second data. In addition to the foregoing, other method aspects are described in the claims, drawings, and text forming a part of the present disclosure.

In one or more various aspects, related systems include but are not limited to circuitry and/or programming for effecting the herein-referenced method aspects; the circuitry and/or programming can be virtually any combination of hardware, software, and/or firmware configured to effect the herein-referenced method aspects depending upon the design choices of the system designer.

A computationally implemented system includes, but is not limited to: means for acquiring a first data indicating at least one reported event as originally reported by a user and a second data indicating at least a second reported event as originally reported by one or more sensing devices; and means for developing a hypothesis based, at least in part, on the first data and the second data. In addition to the foregoing, other system aspects are described in the claims, drawings, and text forming a part of the present disclosure.

A computationally implemented system includes, but is not limited to: circuitry for acquiring a first data indicating at least one reported event as originally reported by a user and a second data indicating at least a second reported event as originally reported by one or more sensing devices; and circuitry for developing a hypothesis based, at least in part, on the first data and the second data. In addition to the foregoing, other system aspects are described in the claims, drawings, and text forming a part of the present disclosure.

A computer program product including a signal-bearing medium bearing one or more instructions acquiring a first data indicating at least one reported event as originally reported by a user and a second data indicating at least a second reported event as originally reported by one or more sensing devices; and one or more instructions for developing a hypothesis based, at least in part, on the first data and the second data. In addition to the foregoing, other computer program product aspects are described in the claims, drawings, and text forming a part of the present disclosure.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

FIG. 2d shows another perspective of the one or more sensing devices 35a and/or 35b of FIGS. 1a and 1b.

FIG. 4l is a high-level logic flowchart of a process depicting alternate implementations of the data acquisition operation 302 of FIG. 3.

DETAILED DESCRIPTION

Figure 1A:
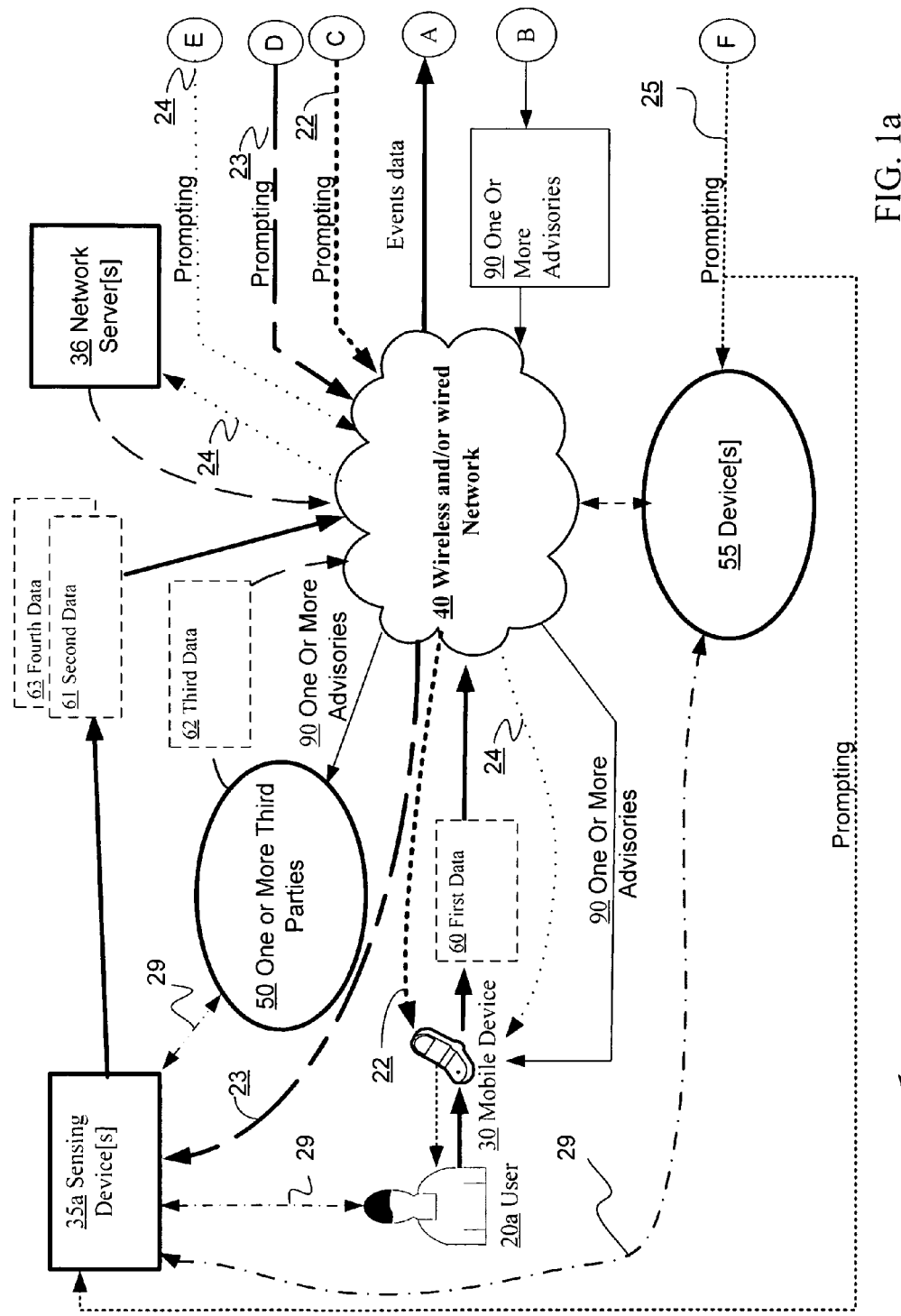
FIGS. 1a and 1b show a high-level block diagram of a computing device 10 operating in a network environment.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

A recent trend that is becoming increasingly popular in the computing/communication field is to electronically record one's feelings, thoughts, and other aspects of the person's everyday life onto an open diary. One place where such open diaries are maintained are at social networking sites commonly known as "blogs" where users may report or post their latest status, personal activities, and various other aspects of the users' everyday life. The process of reporting or posting blog entries is commonly referred to as blogging. Other social networking sites may allow users to update their personal information via, for example, social networking status reports in which a user may report or post for others to view their current status, activities, and/or other aspects of the user.

A more recent development in social networking is the introduction and explosive growth of microblogs in which individuals or users (referred to as "microbloggers") maintain open diaries at microblog websites (e.g., otherwise known as "twitters") by continuously or semi-continuously posting microblog entries. A microblog entry (e.g., "tweet") is typically a short text message that is usually not more than 140 characters long. The microblog entries posted by a microblogger may report on any aspect of the microblogger's daily life. Typically, such microblog entries will describe the various "events" associated with or are of interest to the microblogger that occurs during a course of a typical day. The microblog entries are often continuously posted during the course of a typical day, and thus, by the end of a normal day, a substantial number of events may have been reported and posted.

Each of the reported events that may be posted through microblog entries may be categorized into one of at least three possible categories. The first category of events that may be reported through microblog entries are "objective occurrences" that may or may not be associated with the microblogger. Objective occurrences that are associated with a microblogger may be any characteristic, incident, happening, or any other event that occurs with respect to the microblogger or are of interest to the microblogger that can be objectively reported by the microblogger, a third party, or by a device. Such events would include, for example, intake of food, medicine, or nutraceutical, certain physical characteristics of the microblogger or by others such as blood sugar level or blood pressure that can be objectively measured, activities of the microblogger objectively observable by the microblogger, by others, or by a device, activities of others that may be objectively observed by the microblogger, by others, or by a device, external events such as performance of the stock market (which the microblogger may have an interest in), performance of a favorite sports team, and so forth.

In some cases, objective occurrences may not be at least directly associated with a microblogger. Examples of such objective occurrences include, for example, external events such as the local weather, activities of others (e.g., spouse or boss), the behavior or activities of a pet or livestock, the characteristics or performances of mechanical or electronic devices such as automobiles, appliances, and computing devices, and other events that may directly or indirectly affect the microblogger.

A second category of events that may be reported or posted through microblog entries include "subjective user states" of the microblogger. Subjective user states of a microblogger may include any subjective state or status associated with the microblogger that can only be typically reported by the microblogger (e.g., generally cannot be directly reported by a third party or by a device). Such states including, for example, the subjective mental state of the microblogger (e.g., happiness, sadness, anger, tension, state of alertness, state of mental fatigue, jealousy, envy, and so forth), the subjective physical state of the microblogger (e.g., upset stomach, state of vision, state of hearing, pain, and so forth), and the subjective overall state of the microblogger (e.g., "good," "bad," state of overall wellness, overall fatigue, and so forth). Note that the term "subjective overall state" as will be used herein refers to those subjective states that may not fit neatly into the other two categories of subjective user states described above (e.g., subjective mental states and subjective physical states).

A third category of events that may be reported or posted through microblog entries include "subjective observations" made by the microblogger. A subjective observation is similar to subjective user states and may be any subjective opinion, thought, or evaluation relating to any external incidence (e.g., outward looking instead of inward looking as in the case of subjective user states). Thus, the difference between subjective user states and subjective observations is that subjective user states relates to self-described subjective descriptions of the user states of one's self while subjective observations relates to subjective descriptions or opinions regarding external events. Examples of subjective observations include, for example, a microblogger's perception about the subjective user state of another person (e.g., "he seems tired"), a microblogger's perception about another person's activities (e.g., "he drank too much yesterday"), a microblogger's perception about an external event (e.g., "it was a nice day today"), and so forth. Although microblogs are being used to provide a wealth of personal information, thus far they have been primarily limited to their use as a means for providing commentaries and for maintaining open diaries.

Another potential source for valuable but not yet fully exploited data is the data provided by sensing devices that are used to sense and/or monitor various aspects of everyday life. Currently there are a number of sensing devices that can detect and/or monitor various user related and nonuser related events. For example, there are presently a number of sensing devices that can sense various physical or physiological characteristics of a person or an animal (e.g., a pet or livestock). Examples of such devices include commonly known and used monitoring devices such as blood pressure devices, heart rate monitors, blood glucose sensors (e.g., glucometers), respiration sensor devices, temperature sensors, and so forth. Other examples of devices that can monitor physical or physiological characteristics include more exotic and sophisticated devices such as functional magnetic resonance imaging (fMRI) device, functional Near Infrared (fNIR) devices, blood cell-sorting sensing device, and so forth. Many of these devices are becoming more compact and less expensive such that they are becoming increasingly accessible for purchase and/or self-use by the general public.

Other sensing devices may be used in order to sense and monitor activities of a person or an animal. These would include, for example, global positioning systems (GPS), pedometers, accelerometers, and so forth. Such devices are compact and can even be incorporated into, for example, a mobile communication device such a cellular telephone or on the collar of a pet. Other sensing devices for monitoring activities of individuals (e.g., users) may be incorporated into larger machines and may be used in order to monitor the usage of the machines by the individuals. These would include, for example, sensors that are incorporated into exercise machines, automobiles, bicycles, and so forth. Today there are even toilet monitoring devices that are available to monitor the toilet usage of individuals.

Other sensing devices are also available that can monitor general environmental conditions such as environmental temperature sensor devices, humidity sensor devices, barometers, wind speed monitors, water monitoring sensors, air pollution sensor devices (e.g., devices that can measure the amount of particulates in the air such as pollen, those that measure $CO_2$ levels, those that measure ozone levels, and so forth). Other sensing devices may be employed in order to monitor the performance or characteristics of mechanical and/or electronic devices. All the above described sensing devices may provide useful data that may indicate objectively observable events (e.g., objective occurrences).

In accordance with various embodiments, robust methods, systems, and computer program products are provided to, among other things, acquiring events data indicating multiple events as originally reported by multiple sources including acquiring at least a first data indicating at least one reported event as originally reported by a user and a second data indicating at least a second reported event as originally reported by one or more sensing devices. The methods, systems, and computer program products may then develop a hypothesis based, at least in part, on the first data and the second data. In some embodiments, one or more actions may be executed based, at least in part, on the developed hypothesis. Examples of the types of actions that may be executed include, for example, the presentation of the developed hypothesis or advisories relating to the developed hypothesis. Other actions that may be executed include the prompting of mechanical and/or electronic devices to execute one or more operations based, at least in part, on the developed hypothesis.

The robust methods, systems, and computer program products may be employed in a variety of environments including, for example, social networking environments, blogging or microblogging environments, instant messaging (IM) environments, or any other type of environment that allows a user to, for example, maintain a diary.

In various implementations, a "hypothesis," as referred to herein, may define one or more relationships or links between different types of events (i.e., event types) including at least a first event type (e.g., a type of event such as a particular type of subjective user state including, for example, a subjective mental state such as "happy") and a second event type (e.g., another type of event such as a particular type of objective occurrence, for example, favorite sports team winning a game). In some cases, a hypothesis may be represented by an events pattern that may indicate spatial or sequential relationships between different event types (e.g., different types of events such as subjective user states and objective occurrences). In some embodiments, a hypothesis may be further defined by an indication of the soundness (e.g., strength) of the hypothesis.

Note that for ease of explanation and illustration, the following description will describe a hypothesis as defining, for example, the sequential or spatial relationship between two different event types, for example, a first event type and a second event type. However, those skilled in the art will recognize that such a hypothesis may also identify the relationships between three or more event types (e.g., a first event type, a second event type, a third event type, and so forth).

In some embodiments, a hypothesis may, at least in part, be defined or represented by an events pattern that indicates or suggests a spatial or a sequential (e.g., time/temporal) relationship between different event types. Such a hypothesis, in some cases, may also indicate the strength or weakness of the link between the different event types. That is, the strength or weakness (e.g., soundness) of the correlation between different event types may depend upon, for example, whether the events pattern repeatedly occurs and/or whether a contrasting events pattern has occurred that may contradict the hypothesis and therefore, weaken the hypothesis (e.g., an events pattern that indicates a person becoming tired after jogging for thirty minutes when a hypothesis suggests that a person will be energized after jogging for thirty minutes).

As briefly described above, a hypothesis may be represented by an events pattern that may indicate spatial or sequential (e.g., time or temporal) relationship or relationships between multiple event types. In some implementations, a hypothesis may merely indicate temporal sequential relationships between multiple event types that indicate the temporal relationships between multiple event types. In alternative implementations a hypothesis may indicate a more specific time relationship between multiple event types. For example, a sequential pattern may represent the specific pattern of events that occurs along a timeline that may indicate the specific time intervals between event types. In still other implementations, a hypothesis may indicate the spatial (e.g., geographical) relationships between multiple event types.

In various embodiments, the development of a hypothesis may be particularly useful to a user (e.g., a microblogger or a social networking user) that the hypothesis may or may not be directly associated with. That is, in some embodiments, a hypothesis may be developed that directly relates to a user. Such a hypothesis may relate to, for example, one or more subjective user states associated with the user, one or more activities associated with the user, or one or more characteristics associated with the user. In other embodiments, however, a hypothesis may be developed that may not be directly associated with a user. For example, a hypothesis may be developed that may be particularly associated with an acquaintance of the user, a pet, or a device operated or used by the user.

In some embodiments, the development of a hypothesis may assist a user in modifying his/her future behavior, while in other embodiments, such a hypothesis may be useful to third parties such as other users or nonusers, or even to advertisers in order to assist the advertisers in developing a more targeted marketing scheme. In still other situations, the development of a hypothesis relating to a user may help in the treatment of ailments associated with the user.

In some embodiments, a hypothesis may be developed (e.g., creating and/or further refinement of a hypothesis) by determining a pattern of reported events that repeatedly occurs and/or to compare similar or dissimilar reported pattern of events. For example, if a user such as a microblogger reports repeatedly that after each visit to a particular restaurant, the user always has an upset stomach, then a hypothesis may be created and developed that suggests that the user will get an upset stomach after visiting the particular restaurant. Note that such events may be based on reported data originally provided by two different sources, the user who reports having a stomach ache, and a sensing device such as a GPS device that reports data that indicates the user's visit to the restaurant just prior to the user reporting the occurrence of the stomach ache.

If, on the other hand, after developing such a hypothesis, the GPS device reports data that indicates that the user visited the same restaurant again but after the second visit the user reports feeling fine, then the reported data provided by the GPS device and the data provided by the user during and/or after the second visit may result in the weakening of the hypothesis (e.g., the second visit contradicts the hypothesis that a stomach ache is associated with visiting the restaurant). Alternatively, if after developing such a hypothesis, the GPS device and the user reports that in a subsequent visit to the restaurant, the user again got an upset stomach, then such reporting, as provided by both the user and the GPS device, may result in a confirmation of the soundness of the hypothesis.

In various embodiments, other types of hypothesis may be developed that may not be directly related to a user. For instance, a user (e.g., a person) and one or more sensing devices may report on the various characteristics, activities, and/or behaviors of a friend, a spouse, a pet, or even a mechanical or electronic device that the user may have an interest in. Based on such reported data, one or more hypothesis may be developed that may not be directly related to the user.

Thus, in accordance with various embodiments, robust methods, systems, and computer program products are provided that may be designed to, among other things, acquire events data indicating multiple events as originally reported by multiple sources including at least a first data indicating at least one reported event as originally reported by a user and a second data indicating at least a second reported event originally reported by one or more sensing devices. Based on the at least one reported event as indicated by the acquired first data and the at least second reported event as indicated by the second data, a hypothesis may be developed. In various embodiments, such a hypothesis may be related to, for example, the user, a third party (e.g., another user or nonuser, or a nonhuman living organism such as a pet or livestock), a mechanical and/or electronic device, the environment, or any other entity or item that may be relevant to the user. Note that the phrase "as originally reported" is used herein since the first data and the second data indicating the at least one reported event and the at least second reported event may be obtained from other sources other than their original sources (e.g., the user and the one or more sensing devices).

Figure 1B:
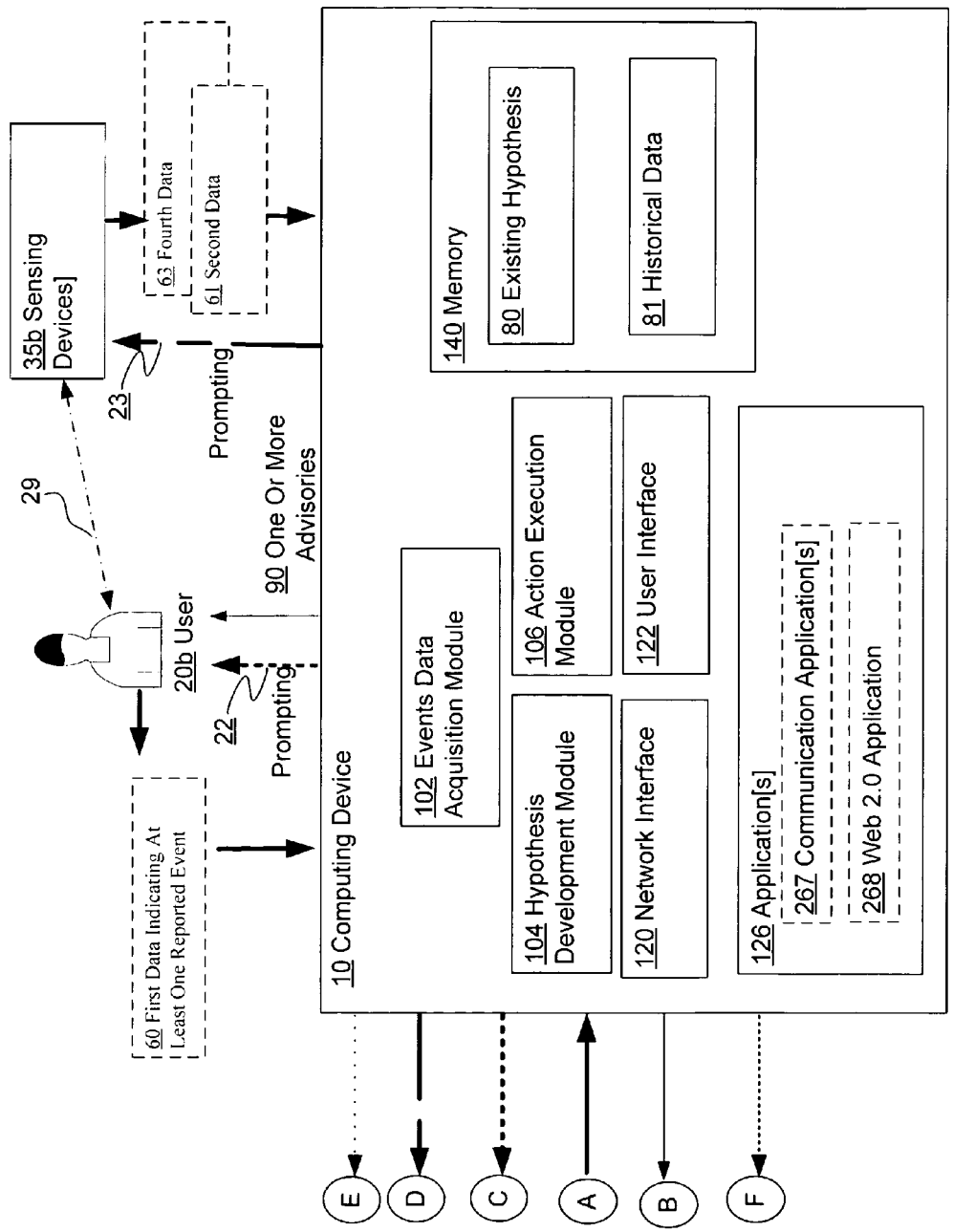

FIGS. 1a and 1b illustrate an example environment in accordance with various embodiments. In the illustrated environment, an exemplary system 100 may include at least a computing device 10 (see FIG. 1b). The computing device 10, which may be a server (e.g., network server) or a standalone device, may be designed to, among other things, acquire events data that indicates multiple reported events originally reported by different sources. For example, in some implementations, the events data to be acquired by the computing device 10 may include at least a first data 60 indicating at least one reported event as originally reported by a user 20* and a second data 61 indicating at least a second reported event as originally reported by one or more sensing devices 35*. In some embodiments, the computing device 10 may further acquire a third data 62 indicating at least a third reported event as originally reported by a third party 50 and/or a fourth data 63 indicating at least a fourth reported event as originally reported by another one or more sensing devices 35*.

Based at least on the reported events as indicated by the acquired first data 60 and the second data 61 (and in some cases, based further on the reported events indicated by the third data 62 and/or the fourth data 63), a hypothesis may be developed by the computing device 10. In some embodiments, one or more actions may be executed by the computing device 10 in response at least in part to the development of the hypothesis. In the following, "*" indicates a wildcard. Thus, references to user 20* may indicate a user 20a or a user 20b of FIGS. 1a and 1b. Similarly, references to sensing devices 35* may be a reference to sensing devices 35a or sensing devices 35b of FIGS. 1a and 1b.

As indicated earlier, in some embodiments, the computing device 10 may be a server while in other embodiments the computing device 10 may be a standalone device. In the case where the computing device 10 is a network server, the computing device 10 may communicate indirectly with a user 20a, one or more third parties 50, and one or more sensing devices 35a via wireless and/or wired network 40. The wireless and/or wired network 40 may comprise of, for example, a local area network (LAN), a wireless local area network (WLAN), personal area network (PAN), Worldwide Interoperability for Microwave Access (WiMAX), public switched telephone network (PTSN), general packet radio service (GPRS), cellular networks, and/or other types of wires or wired networks. In contrast, in embodiments where the computing device 10 is a standalone device, the computing device 10 may communicate directly at least with a user 20b (e.g., via a user interface 122) and one or more sensing devices 35b. In embodiments in which the computing device 10 is a standalone device, the computing device 10 may also communicate indirectly with one or more third parties 50 and one or more sensing devices 35a via a wireless and/or wired network 40.

In embodiments in which the computing device 10 is a network server (or simply "server"); the computing device 10 may communicate with a user 20a through a wireless and/or wired network 40 and via a mobile device 30. A network server, as will be described herein, may be in reference to a server located at a single network site or located across multiple network sites or a conglomeration of servers located at multiple network sites. The mobile device 30 may be a variety of computing/communication devices including, for example, a cellular phone, a personal digital assistant (PDA), a laptop, a desktop, or other types of computing/communication devices that can communicate with the computing device 10. In some embodiments, the mobile device 30 may be a handheld device such as a cellular telephone, a smartphone, a Mobile Internet Device (MID), an Ultra Mobile Personal Computer (UMPC), a convergent device such as a personal digital assistant (PDA), and so forth.

In embodiments in which the computing device 10 is a standalone device that may communicate directly with a user 20b, the computing device 10 may be any type of portable device (e.g., a handheld device) or non-portable device (e.g., desktop computer or workstation). For these embodiments, the computing device 10 may be any one of a variety of computing/communication devices including, for example, a cellular phone, a personal digital assistant (PDA), a laptop, a desktop, or other types of computing/communication devices. In some embodiments, in which the computing device 10 is a handheld device, the computing device 10 may be a cellular telephone, a smartphone, an MID, an UMPC, a convergent device such as a PDA, and so forth. In various embodiments, the computing device 10 may be a peer-to-peer network component device. In some embodiments, the computing device 10 and/or the mobile device 30 may operate via a Web 2.0 construct (e.g., Web 2.0 application 268).

In some implementations, in order to acquire the first data 60 and/or the second data 61, the computing device 10 may be designed to prompt the user 20* and/or the one or more sensing devices 35* (e.g., transmitting or indicating a request or an inquiry to the user 20* and/or the one or more sensing device 35*) to report occurrences of the first reported event and/or the second reported event as indicated by refs. 22 and 23. In alternative implementations, however, the computing device 10 may be designed to, rather than prompting the user 20* and/or the one or more sensors 35*, prompt one or more network devices such as the mobile device 30 and/or one or more network servers 36 in order to acquire the first data 60 and/or the second data 61. That is, in some cases, the user 20* and/or the one or more sensors 35* may already have previously provided the first data 60 and/or the second data 61 to one or more of the network devices (e.g., mobile device 30 and/or network servers 36).

Each of the reported events indicated by the first data 60 and/or the second data 61 may or may not be directly associated with a user 20*. For example, although each of the reported events may have been originally reported by the user 20* or by the one or more sensing devices 35*, the reported events (e.g., at least the one reported event as indicated by the first data 60 and the at least second reported event as indicated by the second data 61) may be, in some implementations, related or associated with one or more third parties (e.g., another user, a nonuser, or a nonhuman living organism such as a pet dog or livestock), one or more devices 55 (e.g., electronic and/or mechanical devices), or one or more aspects of the environmental (e.g., the quality of the local drinking water, local weather conditions, and/or atmospheric conditions). For example, when providing the first data 60, a user 20* may report on the perceptions made by the user 20* regarding the behavior or activities of a third party (e.g., another user or a pet) rather than the behavior or activities of the user 20* him or herself.

As previously described, a user 20* may at least be the original source for the at least one reported event as indicated by the first data 60. The at least one reported event as indicated by the first data 60 may indicate any one or more of a variety of possible events that may be reported by the user 20*. For example, and as will be explained in greater detail herein, the at least one reported event as indicated by the first data 60 may relate to at least a subjective user state (e.g., a subjective mental state, a subjective physical state, or a subjective overall state) of the user 20*, a subjective observation (e.g., the perceived subjective user state of a third party 50 as perceived by user 20*, the perceived activity of a third party 50 or the user 20* as perceived by the user 20*, the perceived performance or characteristic of a device 55 as perceived by the user 20*, the perceived occurrence of an external event as perceived by the user 20* such as the weather, and so forth), or an objective occurrence (e.g., objectively observable activities of the user 20*, a third party 50, or a device 55; objectively observable physical or physiological characteristics of the user 20* or a third party 50; objective observable external events including environmental events or characteristics of a device 55; and so forth).

In contrast, the at least second reported event as originally reported by one or more sensing devices 35* and indicated by the second data 61 may be related to an objective occurrence that may be objectively observed by the one or more sensing devices 35*. Examples of the type of objective occurrences that may be indicated by the second data 61 includes, for example, physical or physiological characteristics of the user 20* or a third party 50, selective activities of the user 20* or a third party 50, some external events such as environmental conditions (e.g., atmospheric temperature and humidity, air quality, and so forth), characteristics and/or operational activities of a device 35, geographic location of the user 20* or a third party 50, and so forth. FIGS. 1a and 1b show the one or more sensing device 35* detecting or sensing various aspects of a user 20*, one or more third parties 50, or one or more device 55 as indicated by ref. 29. As will be described in greater detail herein, the one or more sensing devices 35* may include one or more different types of sensing devices (see FIG. 2d) that are capable of sensing objective occurrences.

After acquiring the events data including the first data 60 indicating the at least one reported event as originally reported by a user 20* and the second data 61 indicating the at least second reported event as originally reported by one or more sensing devices 35*, the computing device may be designed to develop a hypothesis. In various embodiments, the computing device 10 may develop a hypothesis by creating a new hypothesis based on the acquired events data and/or by refining an already existing hypothesis 80, which in some cases, may be stored in a memory 140.

After developing a hypothesis, the computing device 10 may be designed to execute one or more actions in response, at least in part, to the development of the hypothesis. One such action that may be executed is to present (e.g., transmit via a wireless and/or wired network 40 and/or indicate via user interface 122) one or more advisories 90 that may be related to the developed hypothesis. For example, in some implementations, the computing device 10 may present the developed hypothesis itself, or present an advisory such as a alert regarding reported past events or a recommendation for a future action to a user 20*, to one or more third parties 50, and/or to one or more remote network devices (e.g., network servers 36). In other implementations, or in the same implementations, the computing device 10 may prompt (e.g., as indicated by ref. 25) one or more devices 55 (e.g., an automobile or a portion thereof, a household appliance or a portion thereof, a computing or communication device or a portion thereof, and so forth) to execute one or more operations.

Turning now to FIG. 1b, the computing device 10 may include one or more components and/or sub-modules. As those skilled in the art will recognize, these components and sub-modules may be implemented by employing hardware (e.g., in the form of circuitry such as application specific integrated circuit or ASIC, field programmable gate array or FPGA, or other types of circuitry), software, a combination of both hardware and software, or may be implemented by a general purpose computing device executing instructions included in a signal-bearing medium. In various embodiments, computing device 10 may include an events data acquisition module 102, a hypothesis development module 104, an action module 106, a network interface 120 (e.g., network interface card or NIC), a user interface 122 (e.g., a display monitor, a touchscreen, a keypad or keyboard, a mouse, an audio system including a microphone and/or speakers, an image capturing system including digital and/or video camera, and/or other types of interface devices), one or more applications 126 (e.g., a web 2.0 application 268, one or more communication applications 267 including, for example, a voice recognition application, and/or other applications), and/or memory 140. In some implementations, memory 140 may include an existing hypothesis 80 and/or historical data 81. Note that although not depicted, in various implementations, one or more copies of the one or more applications 126 may be included in memory 140.

The events data acquisition module 102 of FIG. 1b may be configured to, among other things, acquire events data indicating multiple reported events as reported by different sources. The events data to be acquired by the events data acquisition module 102 may include at least a first data 60 indicating at least one reported event as originally reported by a user 20* and a second data 61 indicating at least a second reported event as originally reported by one or more sensing devices 35*. In some implementations, the events data acquisition module 102 may be configured to further acquire a third data indicating at least a third reported event as originally reported by one or more third parties 50 and/or a fourth data indicating at least a fourth reported event as originally reported by another one or more sensing devices 35*.

Figure 2A:
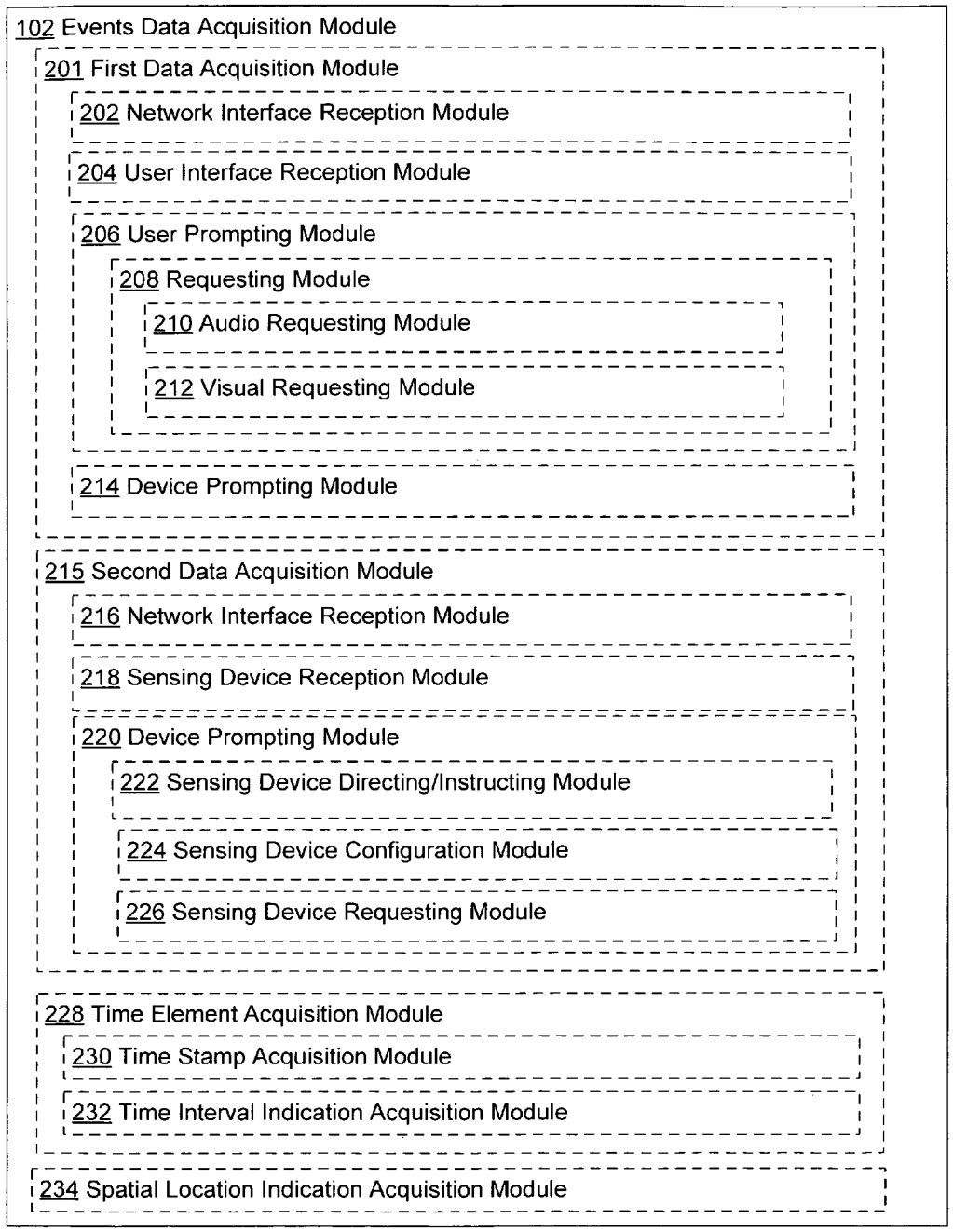
FIG. 2a shows another perspective of the events data acquisition module 102 of the computing device 10 of FIG. 1b.

Referring now to FIG. 2a illustrating particular implementations of the events data acquisition module 102 of the computing device 10 of FIG. 1b. The events data acquisition module 102 may include at least a first data acquisition module 201 configured to, among other things, acquire a first data 60 indicating at least one reported event that was originally reported by a user 20* and a second data acquisition module 215 configured to, among other things, acquire a second data 61 indicating at least a second reported event that was originally reported by one or more sensing devices 35*. In some implementations, the events data acquisition module 102 may further include a time element acquisition module 228 configured to acquire time elements associated with the reported events (e.g., the at least one reported event and the at least second reported event) and/or a spatial location indication acquisition module 234 configured to acquire spatial locations associated with reported events.

In various implementations, the first data acquisition module 201 may include one or more sub-modules. For example, in some implementations, such as in the case where the computing device 10 is a server, the first data acquisition module 201 may include a network interface reception module 202 configured to interface with a wireless and/or wired network 40 in order to receive the first data from a wireless and/or a wired network 40. In some implementations, such as when the computing device 10 is a standalone device, the first data acquisition module 201 may include a user interface reception module 204 configured to receive the first data 60 through a user interface 122.

In some instances, the first data acquisition module 201 may include a user prompting module 206 configured to prompt a user 20* to report occurrence of an event. Such an operation may be needed in some cases when, for example, the computing device 10 is missing data (e.g., first data 60 indicating the at least one reported event) that may be needed in order to develop a hypothesis (e.g., refining an existing hypothesis 80). In order to implement its operations, the user prompting module 206 may include a requesting module 208 that may be configured to indicate (e.g., via a user interface 122) or transmit (e.g., via a wireless and/or wired network 40) a request to a user 20* to report the occurrence of the event. The requesting module 208 may, in turn, include an audio requesting module 210 configured to audioally request (e.g., via one or more speakers) the user 20* to report the occurrence of the event and/or a visual requesting module 212 configured to visually request (e.g., via a display monitor) the user 20* to report the occurrence of the event. In some implementations, the first data acquisition module 201 may include a device prompting module 214 configured to, among other things, prompt a network device (e.g., a mobile device 30 or a network server 36) to provide the first data 60.

Turning now to the second data acquisition module, 215, the second data acquisition module 215 in various implementations may include one or more sub-modules. For example, in some implementations, the second data acquisition module 215 may include a network interface reception module 216 configured to interface with a wireless and/or wired network 40 in order to, for example, receive the second data 61 from at least one of a wireless and/or a wired network 40 and/or a sensing device reception module 218 configured to receive the second data 61 directly from the one or more sensing devices 35b. In various implementations, the second data acquisition module 215 may include a device prompting module 220 configured to prompt the one or more sensing devices 35* to provide the second data 61 (e.g., to report the second reported event).

In order to implement its functional operations, the device prompting module 220 in some implementations may further include one or more sub-modules including a sensing device directing/instructing module 222 configured to direct or instruct the one or more sensing devices 35* to provide the second data 61 (e.g., to report the second reported event). In the same or different implementations, the device prompting module 220 may include a sensing device configuration module 224 designed to configure the one or more sensing devices 35* to provide the second data 61 (e.g., to report the second reported event). In the same or different implementations, the device prompting module 220 may include a sensing device requesting module 226 configured to request the one or more sensing devices 35* to provide the second data 61 (e.g., to report the second reported event).

In various implementations, the time element acquisition module 228 of the events data acquisition module 102 may include one or more sub-modules. For example, in some implementations, the time element acquisition module 228 may include a time stamp acquisition module 230 configured to acquire a first time stamp associated with the at least one reported event and a second time stamp associated with the at least second reported event. In the same or different implementations, the time element acquisition module 228 may include a time interval indication acquisition module 232 configured to acquire an indication of a first time interval associated with the at least one reported event and an indication of second time interval associated with the at least second reported event.

Referring back to FIG. 1b, the hypothesis development module 104 of FIG. 1b may be configured to, among other things, develop a hypothesis based, at least in part, on the first data 60 and the second data 61 (e.g., the at least one reported event and the at least second reported event) acquired by the events data acquisition module 102. In some embodiments, the hypothesis development module 104 may develop a hypothesis by creating a new hypothesis based, at least in part, on the acquired first data 60 (e.g., at least one reported event as indicated by the first data 60) and the second data 61 (e.g., at least a second reported event as indicated by the second data 61). In other embodiments, however, a hypothesis may be developed by refining an existing hypothesis 80 based, at least in part, on the acquired first data 60 (e.g., at least one reported event as indicated by the first data 60) and the second data 61 (e.g., at least a second reported event as indicated by the second data 61).

Figure 2B:
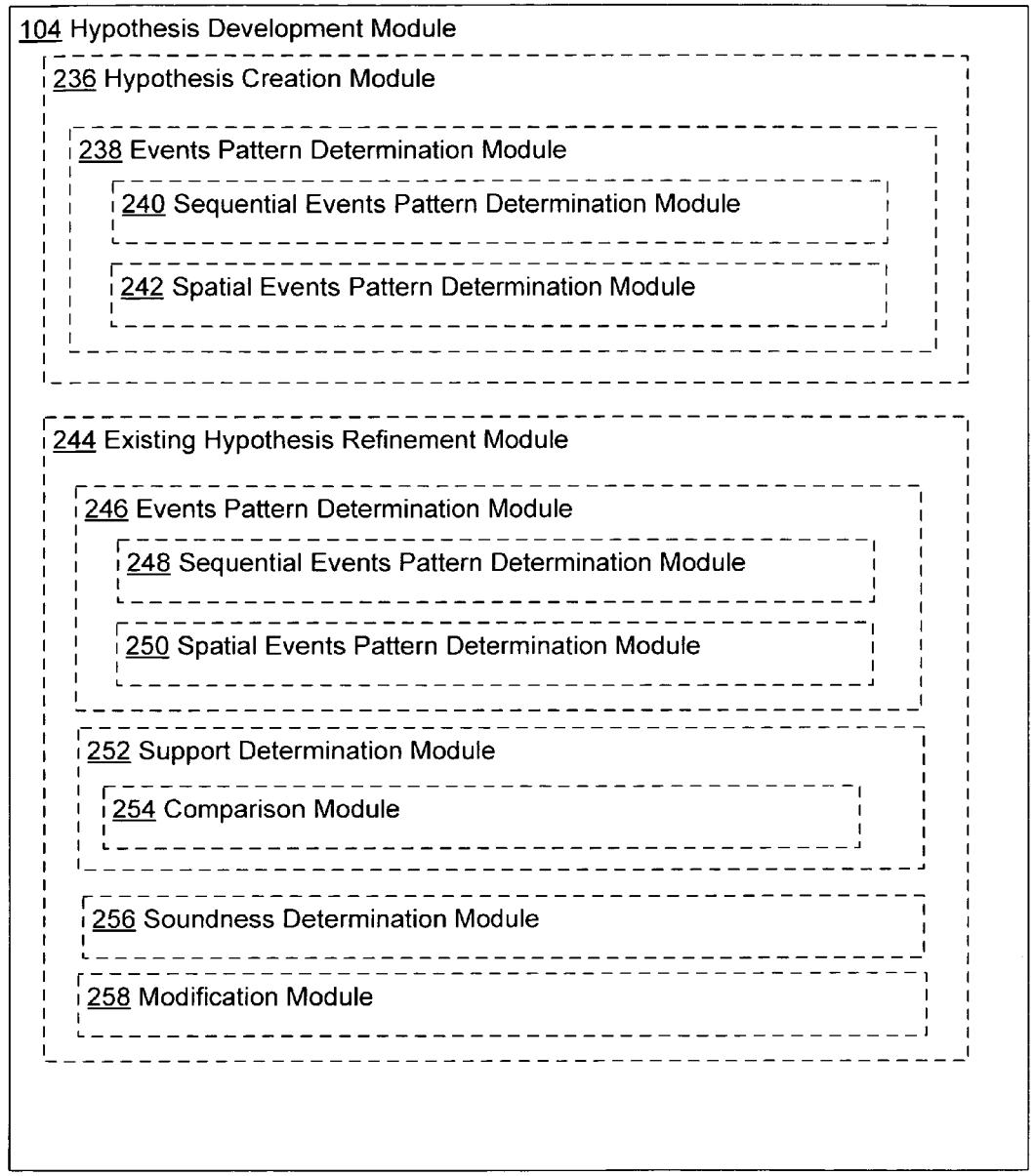
FIG. 2b shows another perspective of the hypothesis development module 104 of the computing device 10 of FIG. 1b.

FIG. 2b illustrates particular implementations of the hypothesis development module 104 of FIG. 1b. In various implementations, the hypothesis development module 104 may include a hypothesis creation module 236 configured to create a hypothesis based, at least in part, on the first data 60 (e.g., at least one reported event as indicated by the first data 60) and the second data 61 (e.g., at least a second reported event as indicated by the second data 61) acquired by the events data acquisition module 102. In the same or different implementations, the hypothesis development module 104 may include an existing hypothesis refinement module 244 configured to refine an existing hypothesis 80 based, at least in part, on the at least one reported event (e.g., as indicated by the first data 60) and the at least reported event (e.g., as indicated by the second data 61).

The hypothesis creation module 236 may include one or more sub-modules in various implementations. For example, in some implementations, the hypothesis creation module 236 may include an events pattern determination module 238 configured to determine an events pattern based, at least in part, on occurrence of the first reported event and occurrence of the second reported event. The determined events pattern may then facilitate the hypothesis creation module 236 in creating a hypothesis. In some implementations, the events pattern determination module 238, in order to for example facilitate the hypothesis creation module 236 to create a hypothesis, may further include a sequential events pattern determination module 240 configured to determine a sequential events pattern based, at least in part, on the time or temporal occurrence of the at least one reported event and the time or temporal occurrence of the at least second reported event and/or a spatial events pattern determination module 242 configured to determine a spatial events pattern based, at least in part, on the spatial occurrence of the at least one reported event and the spatial occurrence of the at least second reported event.

The existing hypothesis refinement module 244, in various implementations, may also include one or more sub-modules. For example, in various implementations, the existing hypothesis refinement module 244 may include an events pattern determination module 246 configured to, for example, facilitate the existing hypothesis refinement module 244 in refining the existing hypothesis 80 by determining at least an events pattern based, at least in part, on occurrence of the at least one reported event and occurrence of the at least second reported event. In some implementations, the events pattern determination module 246 may further include a sequential events pattern determination module 248 configured to determine a sequential events pattern based, at least in part, on the time or temporal occurrence of the at least one reported event and the time or temporal occurrence of the at least second reported event and/or a spatial events pattern determination module 250 configured to determine a spatial events pattern based, at least in part, on the spatial occurrence of the at least one reported event and the spatial occurrence of the at least second reported event. Note that in cases where both the hypothesis creation module 236 and the existing hypothesis refinement module 244 are present in the hypothesis development module 104, one or more of the events pattern determination module 246, the sequential events pattern determination module 248, and the spatial events pattern determination module 250 of the existing hypothesis refinement module 244 may be the same modules as the events pattern determination module 238, the sequential events pattern determination module 240, and the spatial events pattern determination module 242, respectively, of the hypothesis creation module 236.

In some cases, the existing hypothesis refinement module 244 may include a support determination module 252 configured to determine whether an events pattern, as determined by the events pattern determination module 246, supports an existing hypothesis 80. In some implementations, the support determination module may further include a comparison module 254 configured to compare the determined events pattern (e.g., as determined by the events pattern determination module 246) with an events pattern associated with the existing hypothesis 80 to facilitate in the determination as to whether the determined events pattern supports the existing hypothesis 80.

In some cases, the existing hypothesis refinement module 244 may include a soundness determination module 256 configured to determine soundness of an existing hypothesis 80 based, at least in part, on a comparison made by the comparison module 254. In some cases, the existing hypothesis refinement module 244 may include a modification module 258 configured to modify an existing hypothesis 80 based, at least in part, on a comparison made by the comparison module 254.

Referring back to FIG. 1*b*, the action execution module 106 of the computing device 10 may be designed to execute one or more actions (e.g., operations) in response, at least in part, to the development of a hypothesis by the hypothesis development module 104. The one or more actions to be executed may include, for example, presentation (e.g., transmission or indication) of one or more advisories related to the hypothesis developed by the hypothesis development module 104 and/or prompting one or more local or remote devices 55 to execute one or more actions or operations.

Figure 2C:
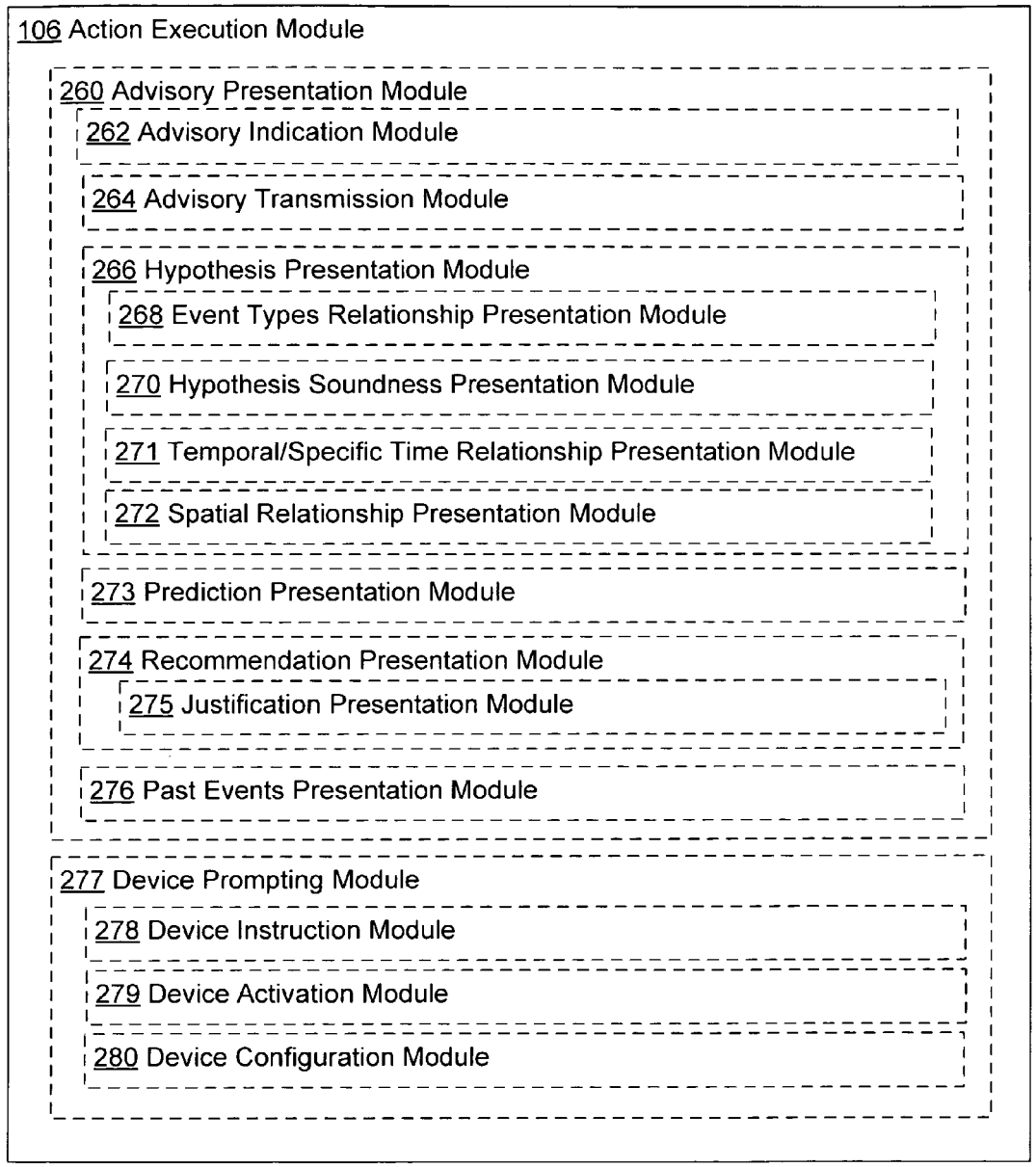
FIG. 2c shows another perspective of the action execution module 106 of the computing device 10 of FIG. 1b.

Referring now to FIG. 2*c* illustrating particular implementations of the action execution module 106. In various embodiments, the action execution module 106 may include one or more sub-modules. For example, in various implementations, the action execution module 106 may include an advisory presentation module 260 configured to present one or more advisories relating to a hypothesis developed by, for example, the hypothesis development module 104 and/or a device prompting module 277 configured to prompt (e.g., as indicated by ref 25) one or more devices 55 to execute one or more operations (e.g., actions) based, at least in part, on a hypothesis developed by, for example, the hypothesis development module 104.

The advisory presentation module 260, in turn, may further include one or more additional sub-modules. For instance, in some implementations, the advisory presentation module 260 may include an advisory indication module 262 configured to indicate, via a user interface 122, the one or more advisories related to the hypothesis developed by, for example, the hypothesis development module 104. In the same or different implementations, the advisory presentation module 260 may include an advisory transmission module 264 configured to transmit, via at least one of a wireless network or a wired network, the one or more advisories related to the hypothesis developed by, for example, the hypothesis development module 104.

In the same or different implementations, the advisory presentation module 260 may include a hypothesis presentation module 266 configured to, among other things, present (e.g., either transmit or indicate) at least a form of a hypothesis developed by, for example, the hypothesis development module 104. In various implementations, the hypothesis presentation module 266 may include one or more additional sub-modules. For example, in some implementations, the hypothesis presentation module 266 may include an event types relationship presentation module 268 configured to present an indication of a relationship between at least a first event type and at least a second event type as referenced by the hypothesis developed by, for example, the hypothesis development module 104.

In the same or different implementations, the hypothesis presentation module 266 may include a hypothesis soundness presentation module 270 configured to present an indication of soundness of the hypothesis developed by, for example, the hypothesis development module 104. In the same or different implementations, the hypothesis presentation module 266 may include a temporal/specific time relationship presentation module 271 configured to present an indication of a temporal or specific time relationship between the at least first event type and the at least second event type as referenced by the hypothesis developed by, for example, the hypothesis development module 104. In the same or different implementations, the hypothesis presentation module 266 may include a spatial relationship presentation module 272 configured to present an indication of a spatial relationship between the at least first event type and the at least second event type as referenced by the hypothesis developed by, for example, the hypothesis development module 104.

In various implementations, the advisory presentation module 260 may include a prediction presentation module 273 configured to present an advisory relating to a predication of one or more future events based, at least in part, on the hypothesis developed by, for example, the hypothesis development module 104. In the same or different implementations, the advisory presentation module 260 may include a recommendation presentation module 274 configured to present a recommendation for a future course of action based, at least in part, on the hypothesis developed by, for example, the hypothesis development module 104. In some implementations, the recommendation presentation module 274 may further include a justification presentation module 275 configured to present a justification for the recommendation presented by the recommendation presentation module 274.

In various implementations, the advisory presentation module 260 may include a past events presentation module 276 configured to present an indication of one or more past events based, at least in part, on the hypothesis developed by, for example, the hypothesis development module 104.

The device prompting module 277 in various embodiments may include one or more sub-modules. For example, in some implementations, the device prompting module 277 may include a device instruction module 278 configured to instruct one or more devices 55 to execute one or more operations (e.g., actions) based, at least in part, on the hypothesis developed by, for example, the hypothesis development module 104. In the same or different implementations, the device prompting module 277 may include a device activation module 279 configured to activate one or more devices 55 to execute one or more operations (e.g., actions) based, at least in part, on the hypothesis developed by, for example, the hypothesis development module 104. In the same or different implementations, the device prompting module 277 may include a device configuration module 280 designed to configure one or more devices 55 to execute one or more operations (e.g., actions) based, at least in part, on the hypothesis developed by, for example, the hypothesis development module 104.

Turning now to FIG. 2d illustrating particular implementations of the one or more sensing devices 35* (e.g., one or more sensing devices 35a and/or one or more sensing devices 35b). In some implementations, the one or more sensing devices 35* may include one or more physiological sensor devices 281 designed to sense one or more physical or physiological characteristics of a subject such as a user 20* or a third party 50 (e.g., another user, a nonuser, or a nonhuman living organism such as a pet or livestock). In various implementations, the one or more physiological sensor devices 281 may include, for example, a heart rate sensor device 282, blood pressure sensor device 283, a blood glucose sensor device 284, a functional magnetic resonance imaging (fMRI) device 285, a functional near-infrared (fNIR) device 286, a blood alcohol sensor device 287, a temperature sensor device 288 (e.g., to measure a temperature of the subject), a respiration sensor device 289, a blood cell-sorting sensor device 322 (e.g., to sort between different types of blood cells), and/or other types of devices capable of sensing one or more physical or physiological characteristics of a subject (e.g., a user 20*).

In the same or different implementations, the one or more sensing devices 35* may include one or more imaging system devices 290 for capturing various types of images of a subject (e.g., a user 20* or a third party 50). Examples of such imaging system devices 290 include, for example, a digital or video camera, an x-ray machine, an ultrasound device, and so forth. Note that in some instances, the one or more imaging system devices 290 may also include an fMRI device 285 and/or an fNIR device 286.

In the same or different implementations, the one or more sensing devices 35* may include one or more user activity sensing devices 291 designed to sense or monitor one or more user activities of a subject (e.g., a user 20* or a third party 50 such as another person or a pet or livestock). For example, in some implementations, the user activity sensing devices 291 may include a pedometer 292, an accelerometer 293, an image capturing device 294 (e.g., digital or video camera), a toilet monitoring device 295, an exercise machine sensor device 296, and/or other types of sensing devices capable of sensing a subject's activities.

In the same or different implementations, the one or more sensing devices 35* may include a global position system (GPS) 297 to determine one or more locations of a subject (e.g., a user 20* or a third party 50 such as another user or an animal), an environmental temperature sensor device 298 designed to sense or measure environmental (e.g. atmospheric) temperature, an environmental humidity sensor device 299 designed to sense or measure environmental (e.g. atmospheric) humidity level, an environmental air pollution sensor device 320 to measure or sense various gases such as $CO_2$, ozone, xenon, and so forth in the atmosphere or to measure particulates (e.g., pollen) in the atmosphere, and/or other devices for measuring or sensing various other characteristics of the environment (e.g., a barometer, a wind speed sensor, a water quality sensing device, and so forth).

In various implementations, the computing device 10 of FIG. 1b may include one or more applications 126. The one or more applications 126 may include, for example, one or more communication applications 267 (e.g., text messaging application, instant messaging application, email application, voice recognition system, and so forth) and/or Web 2.0 application 268 to facilitate in communicating via, for example, the World Wide Web. In some implementations, copies of the one or more applications 126 may be stored in memory 140.

In various implementations, the computing device 10 may include a network interface 120, which may be a device designed to interface with a wireless and/or wired network 40. Examples of such devices include, for example, a network interface card (NIC) or other interface devices or systems for communicating through at least one of a wireless network or wired network 40. In some implementations, the computing device 10 may include a user interface 122. The user interface 122 may comprise any device that may interface with a user 20b. Examples of such devices include, for example, a keyboard, a display monitor, a touchscreen, a microphone, a speaker, an image capturing device such as a digital or video camera, a mouse, and so forth.

The computing device 10 may include a memory 140. The memory 140 may include any type of volatile and/or non-volatile devices used to store data. In various implementations, the memory 140 may comprise, for example, a mass storage device, a read only memory (ROM), a programmable read only memory (PROM), an erasable programmable read-only memory (EPROM), random access memory (RAM), a flash memory, a synchronous random access memory (SRAM), a dynamic random access memory (DRAM), and/or other memory devices. In various implementations, the memory 140 may store an existing hypotheses 80 and/or historical data 81 (e.g., historical data including, for example, past events data or historical events patterns related to a user 20*, related to a subgroup of the general population that the user 20 belongs to, or related to the general population).

The various features and characteristics of the components, modules, and sub-modules of the computing device 10 presented thus far will be described in greater detail with respect to the processes and operations to be described herein.

Figure 3:
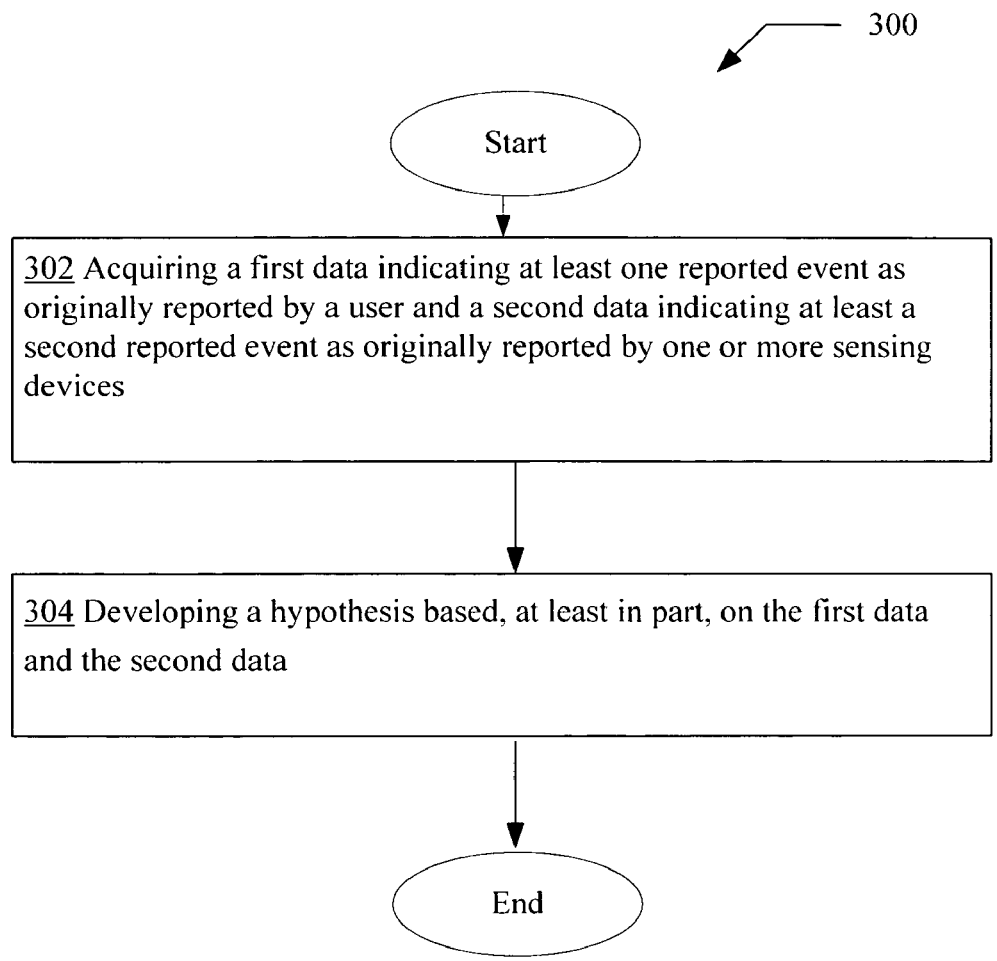
FIG. 3 is a high-level logic flowchart of a process.

FIG. 3 illustrates an operational flow 300 representing example operations related to, among other things, acquisition of events data from multiple sources including at least a first data indicating at least one reported event as originally reported by a user and a second data indicating at least a second reported event as originally reported by one or more sensing devices, and the development of a hypothesis based, at least in part, on the acquired first and second data. In some embodiments, the operational flow 300 may be executed by, for example, the computing device 10 of FIG. 1*b*, which may be a server or a standalone device.

In FIG. 3 and in the following figures that include various examples of operational flows, discussions and explanations may be provided with respect to the above-described exemplary environment of FIGS. 1*a* and 1*b*, and/or with respect to other examples (e.g., as provided in FIGS. 2*a*-2*c*) and contexts. However, it should be understood that the operational flows may be executed in a number of other environments and contexts, and/or in modified versions of FIGS. 1*a*, 1*b*, and 2*a*-2*d*. Also, although the various operational flows are presented in the sequence(s) illustrated, it should be understood that the various operations may be performed in different sequential orders other than those which are illustrated, or may be performed concurrently.

Further, in the following figures that depict various flow processes, various operations may be depicted in a box-within-a-box manner. Such depictions may indicate that an operation in an internal box may comprise an optional example embodiment of the operational step illustrated in one or more external boxes. However, it should be understood that internal box operations may be viewed as independent operations separate from any associated external boxes and may be performed in any sequence with respect to all other illustrated operations, or may be performed concurrently.

In any event, after a start operation, the operational flow 300 may move to a data acquisition operation 302 for acquiring a first data indicating at least one reported event as originally reported by a user and a second data indicating at least a second reported event as originally reported by one or more sensing devices. For instance, the events data acquisition module 102 of the computing device 10 acquiring a first data 60 (e.g., in the form of a blog entry, a status report, an electronic message, or a diary entry) indicating at least one reported event (e.g., a subjective user state, a subjective observation, or an objective occurrence) as originally reported by a user 20* and a second data 61 indicating at least a second reported event (e.g., objective occurrence) as originally reported by one or more sensing devices 35*.

Next, operational flow 300 may include hypothesis development operation 304 for developing a hypothesis based, at least in part, on the first data and the second data. For instance, the hypothesis development module 104 of the computing device 10 developing a hypothesis (e.g., creating a new hypothesis or refining an existing hypothesis) based, at least in part, on the first data 60 and the second data 61. Note that in the following description and for ease of illustration and understanding the hypothesis to be developed through the hypothesis development operation 304 may be described as linking together two types of events (i.e., event types). However, those skilled in the art will recognize that such a hypothesis 80 may alternatively relate to the association of three or more types of events in various implementations.

Figure 4A:
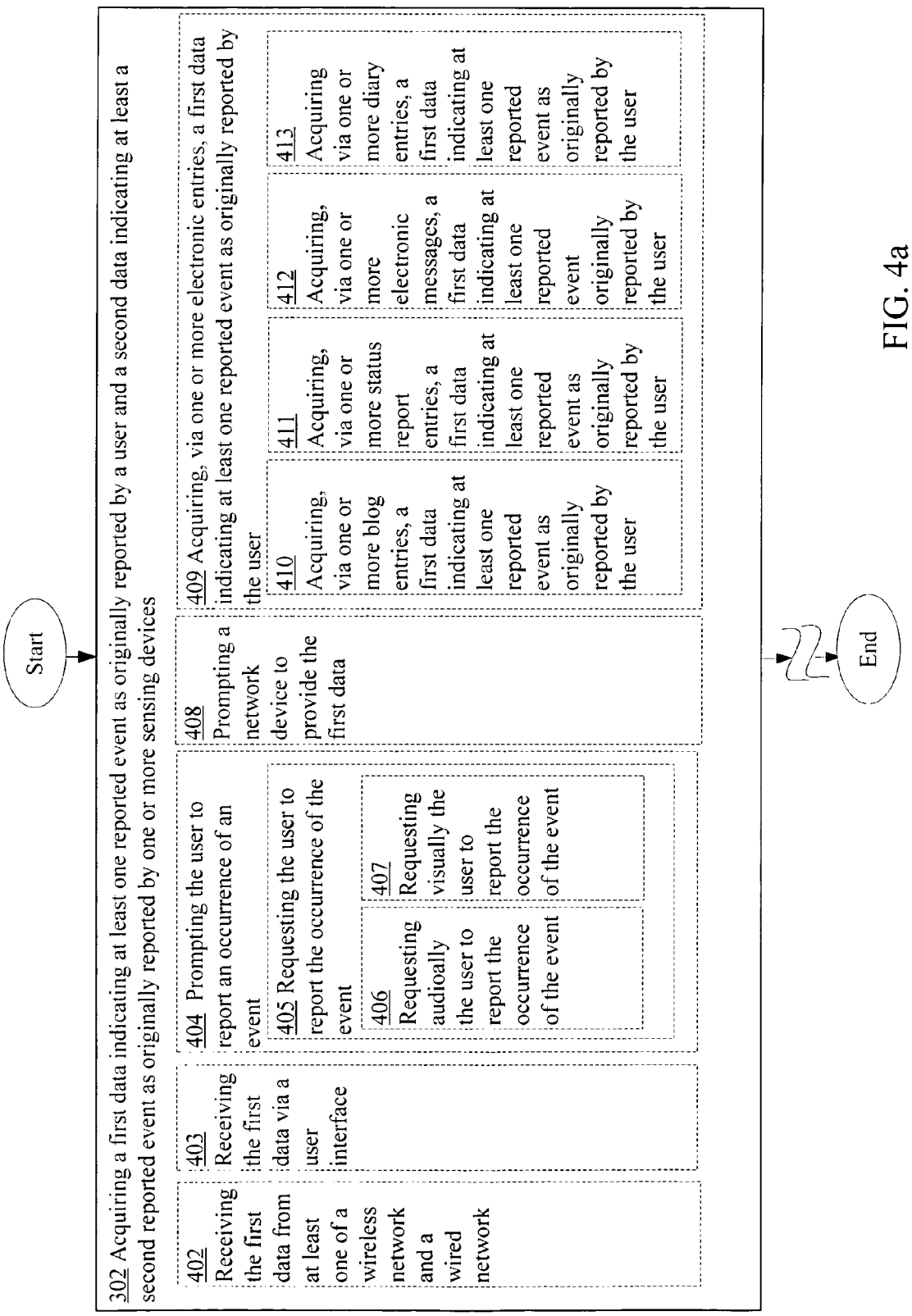
FIG. 4a is a high-level logic flowchart of a process depicting alternate implementations of the data acquisition operation 302 of FIG. 3.

In various implementations, the first data 60 to be acquired during the data acquisition operation 302 of FIG. 3 may be acquired through various means in various forms. For example, in some implementations, the data acquisition operation 302 may include an operation 402 for receiving the first data from at least one of a wireless network and a wired network as depicted in FIG. 4*a*. For instance, when the computing device 10 of FIG. 1*b* is a server, the network interface reception module 202 of the computing device 10 may receive the first data 60 from at least one of a wireless network and a wired network 40.

In some alternative implementations, the data acquisition operation 302 may include an operation 403 for receiving the first data via a user interface as depicted in FIG. 4*a*. For instance, when the computing device 10 is a standalone device, such as a handheld device, the user interface reception module 204 of the computing device 10 may receive the first data 60 via a user interface 122 (e.g., a touch screen, a microphone, a mouse, and/or other input devices).

In the same or different implementations, the data acquisition operation 302 may include an operation 404 for prompting the user to report an occurrence of an event as depicted in FIG. 4*a*. For instance, when the computing device 10 is either a server or a standalone device, the user prompting module 206 of the computing device 10 prompting (as indicated by ref. 22 in FIGS. 1*a* and 1*b*) the user 20* (e.g., by generating a simple "ping," or generating a more specific request) to report an occurrence of an event (e.g., the reported event may be a subjective user state, a subjective observation, or an objective occurrence).

In various implementations, operation 404 may comprise an operation 405 for requesting the user to report the occurrence of the event as depicted in FIG. 4*a*. For instance, the requesting module 208 of the computing device 10 requesting (e.g., transmitting a request or indicating a request via the user interface 122) the user 20* to report the occurrence of the event.

In some implementations, operation 405 may further comprise an operation 406 for requesting audioally the user to report the occurrence of the event as depicted in FIG. 4*a*. For instance, audio requesting module 210 of the computing device 10 requesting audioally (e.g., via the user interface 122 in the case where the computing device 10 is a standalone device or via a speaker system of the mobile device 30 in the case where the computing device 10 is a server) the user 20* to report the occurrence of the event.

In some implementations, operation 405 may further comprise an operation 407 for requesting visually the user to report the occurrence of the event as depicted in FIG. 4*a*. For instance, visual requesting module 212 of the computing device 10 requesting visually (e.g., via the user interface 122 in the case where the computing device 10 is a standalone device or via a display system of the mobile device 30 in the case where the computing device 10 is a server) the user 20* to report the occurrence of the event.

In some implementations, the data acquisition operation 302 may include an operation 408 for prompting a network device to provide the first data as depicted in FIG. 4a. For instance, the device prompting module 214 of the computing device 10 prompting (as indicated by ref. 24 in FIG. 1a) a network device such as the mobile device 30 or a network server 36 to provide the first data 60.

The first data 60 to be acquired through the data acquisition operation 302 may be in a variety of different forms. For example, in some implementations, the data acquisition operation 302 may include an operation 409 for acquiring, via one or more electronic entries, a first data indicating at least one reported event as originally reported by the user as depicted in FIG. 4a. For instance, the first data acquisition module 201 of the computing device 10 acquiring (e.g., acquiring through the user interface 122 or receiving through the wireless and/or wired network 40) a first data 60 indicating at least one reported event as originally reported by the user 20*.

In some implementations, operation 409 may comprise an operation 410 for acquiring, via one or more blog entries, a first data indicating at least one reported event as originally reported by the user as depicted in FIG. 4a. For instance, the first data acquisition module 201 of the computing device 10 acquiring (e.g., receiving through the wireless and/or wired network 40), via one or more blog entries (e.g., microblog entries), a first data 60 indicating at least one reported event as originally reported by the user 20a.

In some implementations, operation 409 may include an operation 411 for acquiring, via one or more status report entries, a first data indicating at least one reported event as originally reported by the user as depicted in FIG. 4a. For instance, the first data acquisition module 201 of the computing device 10 acquiring (e.g., receiving through the wireless and/or wired network 40), via one or more status report entries, a first data 60 indicating at least one reported event as originally reported by the user 20a.

In some implementations, operation 409 may include an operation 412 for acquiring, via one or more electronic messages, a first data indicating at least one reported event originally reported by the user as depicted in FIG. 4a. For instance, the first data acquisition module 201 of the computing device 10 acquiring (e.g., receiving through the wireless and/or wired network 40), via one or more status electronic messages (e.g., text messages, email messages, IM messages, and so forth), a first data 60 indicating at least one reported event as originally reported by the user 20a.

In some implementations, operation 409 may include an operation 413 for acquiring via one or more diary entries, a first data indicating at least one reported events originally reported by the user as depicted in FIG. 4a. For instance, the first data acquisition module 201 of the computing device 10 acquiring (e.g., acquiring through the user interface 122), via one or more diary entries, a first data 60 indicating at least one reported event as originally reported by the user 20b.

Figure 4B:
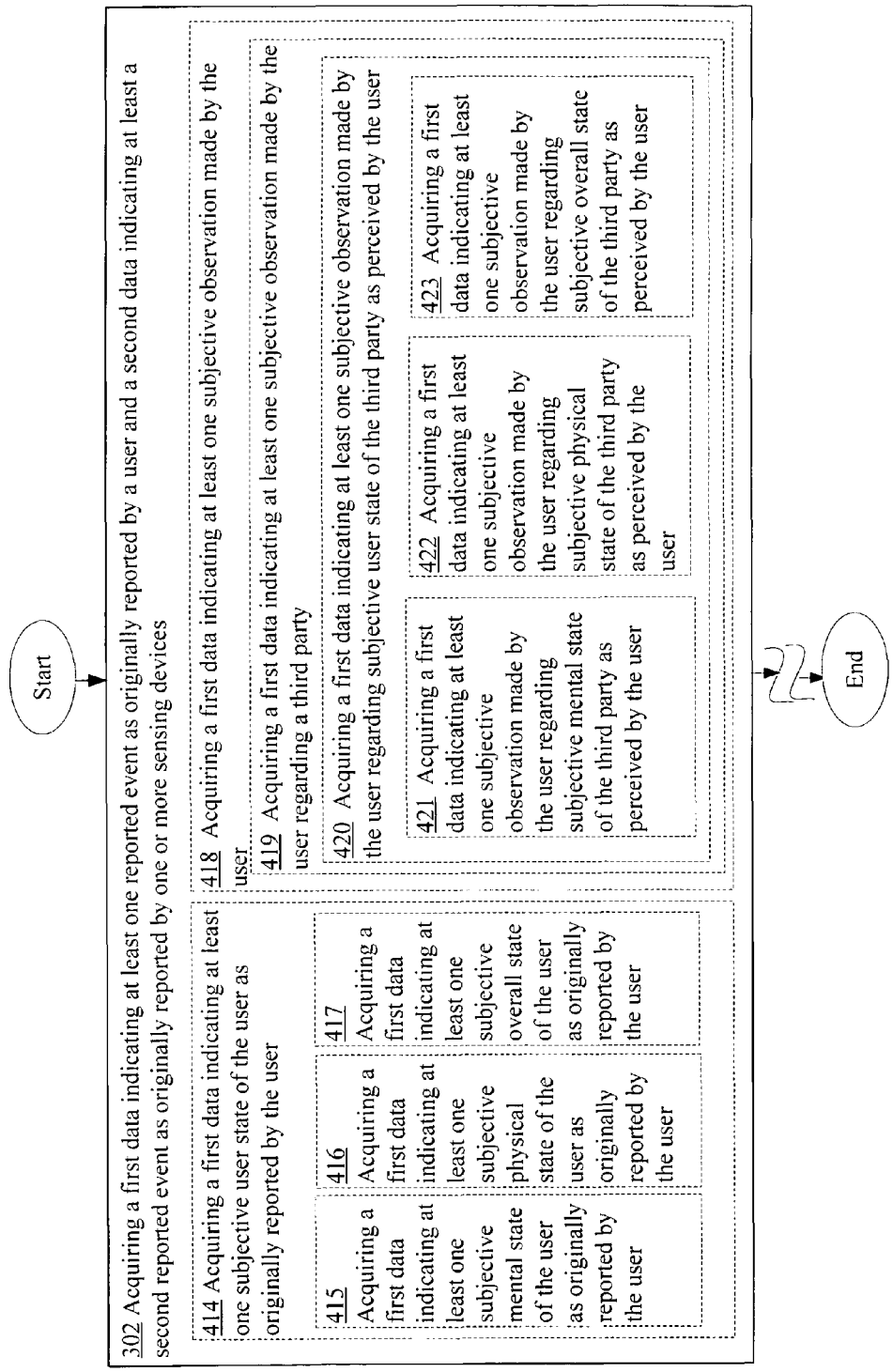
FIG. 4b is a high-level logic flowchart of a process depicting alternate implementations of the data acquisition operation 302 of FIG. 3.

As will be further described herein, the first data 60 acquired during the data acquisition operation 302 of FIG. 3 may indicate a variety of reported events. For example, in various implementations, the data acquisition operation 302 may include an operation 414 for acquiring a first data indicating at least one subjective user state of the user as originally reported by the user as depicted in FIG. 4b. For instance, the first data acquisition module 201 of the computing device 10 acquiring a first data 60 indicating at least one subjective user state (e.g., fatigue, happiness, sadness, nauseous, alertness, energetic, and so forth) of the user 20* as originally reported by the user 20*.

Various types of subjective user states may be indicated by the first data 60 acquired through operation 414. For example, in some implementations, operation 414 may include an operation 415 for acquiring a first data indicating at least one subjective mental state of the user as originally reported by the user as depicted in FIG. 4b. For instance, the first data acquisition module 201 of the computing device 10 acquiring a first data 60 indicating at least one subjective mental state (e.g., fatigue, happiness, sadness, nauseous, alertness, energetic, and so forth) of the user 20* as originally reported by the user 20*.

In some implementations, operation 414 may include an operation 416 for acquiring a first data indicating at least one subjective physical state of the user as originally reported by the user as depicted in FIG. 4b. For instance, the first data acquisition module 201 of the computing device 10 acquiring a first data 60 indicating at least one subjective physical state (e.g., headache, stomach ache, sore back, sore or stiff ankle, overall fatigue, blurry vision, and so forth) of the user 20* as originally reported by the user 20*.

In some implementations, operation 414 may include an operation 417 for acquiring a first data indicating at least one subjective overall state of the user as originally reported by the user as depicted in FIG. 4b. For instance, the first data acquisition module 201 of the computing device 10 acquiring a first data 60 indicating at least one subjective overall state (e.g., "good," "bad," "well," "available," and so forth) of the user 20* as originally reported by the user 20*.

In various alternative implementations, the first data 60 acquired during the data acquisition operation 302 of FIG. 3 may indicate at least one subjective observation. For example, in some implementations, the data acquisition operation 302 of FIG. 3 may include an operation 418 for acquiring a first data indicating at least one subjective observation made by the user as depicted in FIG. 4b. For instance, the first data acquisition module 201 of the computing device 10 acquiring a first data 60 indicating at least one subjective observation (e.g., a subjective observation regarding an external event, a subjective observation regarding an activity executed by the user or by a third party, a subjective observation regarding the subjective user state of a third party as perceived by the user 20*, and so forth) made by the user 20*.

A variety of subjective observations may be indicated by the first data 60 acquired during operation 418. For example, in various implementations, operation 418 may include an operation 419 for acquiring a first data indicating at least one subjective observation made by the user regarding a third party as depicted in FIG. 4b. For instance, the first data acquisition module 201 of the computing device 10 acquiring a first data 60 indicating at least one subjective observation made by the user 20* regarding a third party 50 (e.g., subjective user state of the third party 50 or demeanor of the third party 50 as perceived by the user 20*). A third party 50, as will be described herein, may be in reference to a person such as another user or a non-user, or a non-human living creature or organism such as a pet or livestock.

As will be further described herein, various types of subjective observations may be made by the user 20* regarding a third party. For example, in various implementations, operation 419 may include an operation 420 for acquiring a first data indicating at least one subjective observation made by the user regarding subjective user state of the third party as perceived by the user as depicted in FIG. 4b. For instance, the first data acquisition module 201 of the computing device 10 acquiring a first data 60 indicating at least one subjective observation made by the user 20\* regarding subjective user state (e.g., subjective mental state, subjective physical state, or subjective overall state) of the third party 50 as perceived by the user 20\*.

In some implementations, operation 420 may include an operation 421 for acquiring a first data indicating at least one subjective observation made by the user regarding subjective mental state of the third party as perceived by the user as depicted in FIG. 4*b*. For instance, the first data acquisition module 201 of the computing device 10 acquiring a first data 60 indicating at least one subjective observation made by the user 20\* regarding subjective mental state (e.g., distracted, indifferent, angry, happy, nervous, alert, and so forth) of the third party 50 as perceived by the user 20\*.

In some implementations, operation 420 may include an operation 422 for acquiring a first data indicating at least one subjective observation made by the user regarding subjective physical state of the third party as perceived by the user as depicted in FIG. 4*b*. For instance, the first data acquisition module 201 of the computing device 10 acquiring a first data 60 indicating at least one subjective observation made by the user 20\* regarding subjective physical state (e.g., in pain) of the third party 50 as perceived by the user 20\*.

In some implementations, operation 420 may include an operation 423 for acquiring a first data indicating at least one subjective observation made by the user regarding subjective overall state of the third party as perceived by the user as depicted in FIG. 4*b*. For instance, the first data acquisition module 201 of the computing device 10 acquiring a first data 60 indicating at least one subjective observation made by the user 20\* regarding subjective overall state (e.g., "available") of the third party 50 as perceived by the user 20\*.

Figure 4C:
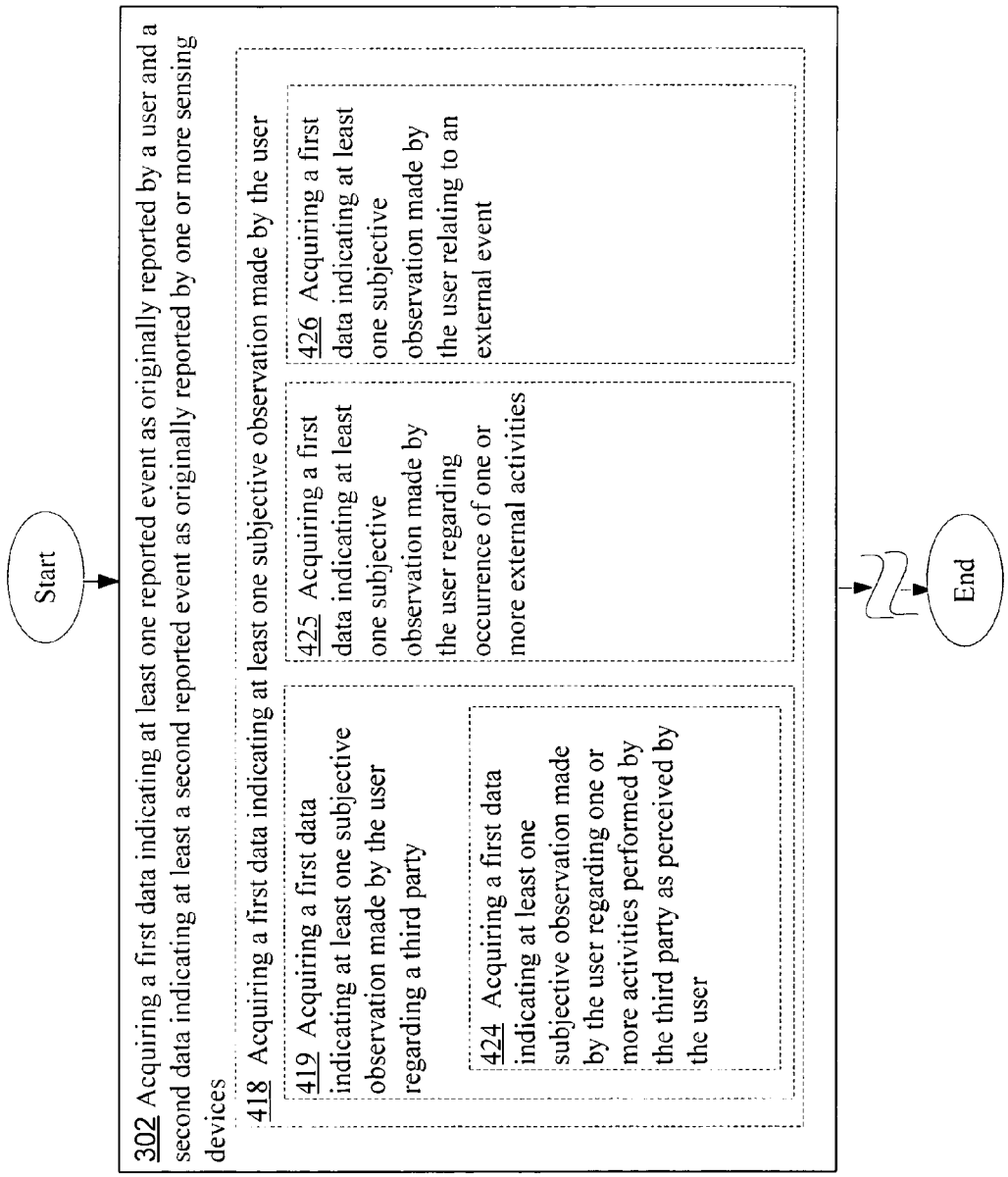
FIG. 4c is a high-level logic flowchart of a process depicting alternate implementations of the data acquisition operation 302 of FIG. 3.

In various implementations, operation 419 of FIG. 4*b* may include an operation 424 for acquiring a first data indicating at least one subjective observation made by the user regarding one or more activities performed by the third party as perceived by the user as depicted in FIG. 4*c*. For instance, the first data acquisition module 201 of the computing device 10 acquiring a first data 60 indicating at least one subjective observation made by the user 20\* regarding one or more activities (e.g., demeanor or facial expression) performed by the third party 50 (e.g., another user or a pet) as perceived by the user 20\*.

In various implementations, operation 418 of FIG. 4*c* may include an operation 425 for acquiring a first data indicating at least one subjective observation made by the user regarding occurrence of one or more external activities as depicted in FIG. 4*c*. For instance, the first data acquisition module 201 of the computing device 10 acquiring a first data 60 indicating at least one subjective observation made by the user 20\* regarding occurrence of one or more external activities (e.g., "my car is poorly running").

In some implementations, operation 418 may include an operation 426 for acquiring a first data indicating at least one subjective observation made by the user relating to an external event as depicted in FIG. 4*c*. For instance, the first data acquisition module 201 of the computing device 10 acquiring a first data 60 indicating at least one subjective observation made by the user 20\* relating to an external event (e.g., "it is a hot day").

Figure 4D:
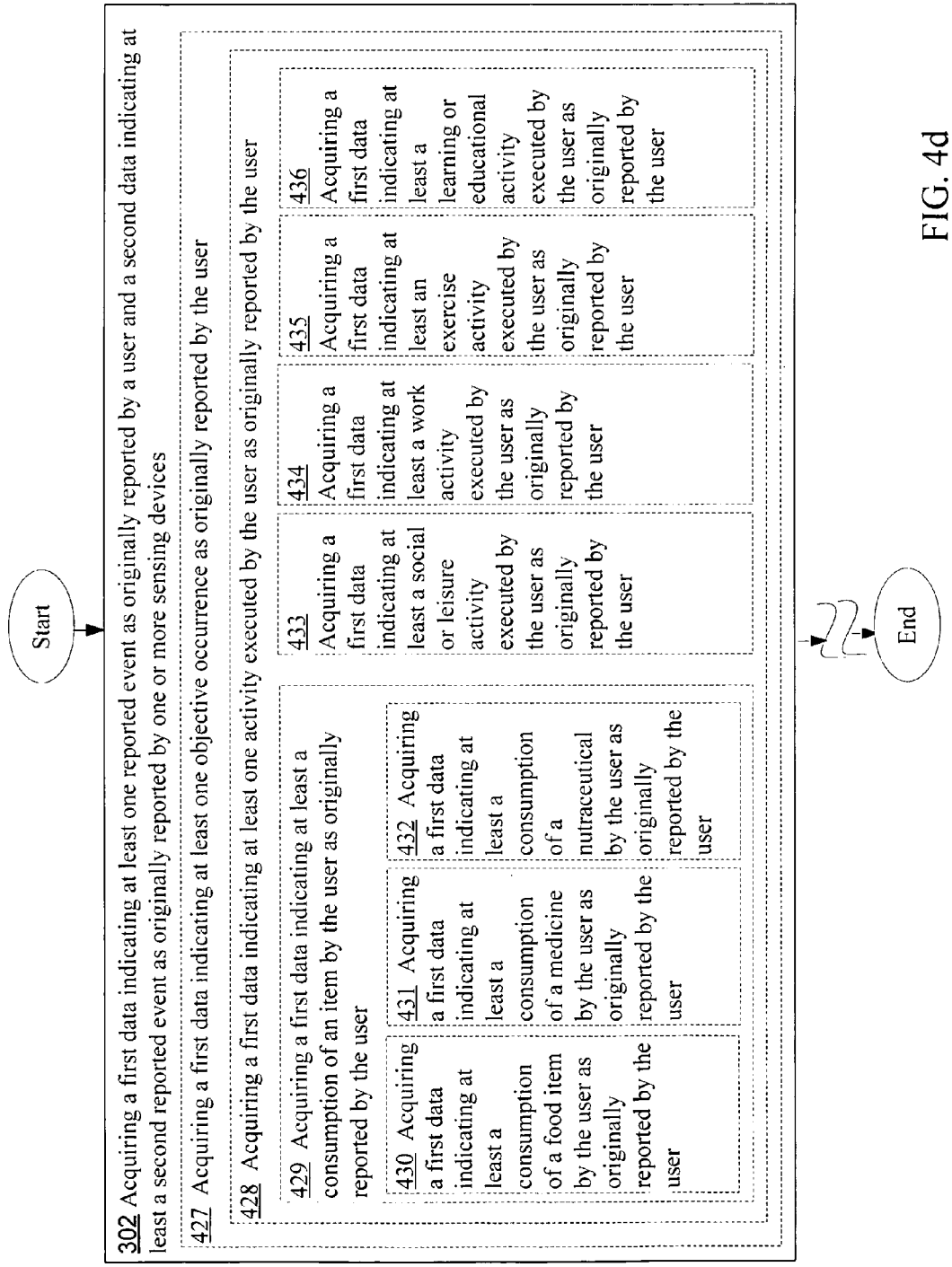
FIG. 4d is a high-level logic flowchart of a process depicting alternate implementations of the data acquisition operation 302 of FIG. 3.

The data acquisition operation 302 of FIG. 3 may acquire a first data that indicates at least one objective occurrence. For example, in various implementations, the data acquisition operation 302 may include an operation 427 for acquiring a first data indicating at least one objective occurrence as originally reported by the user as depicted in FIG. 4*d*. For instance, the first data acquisition module 201 of the computing device 10 acquiring a first data 60 indicating at least one objective occurrence (e.g., an activity executed by the user 20\* or by a third party 50\*) as originally reported by the user 20\*.

In some cases, operation 427 may involve acquiring a first data 60 that indicates an objective occurrence related to the user 20\*. For example, in various implementations, operation 427 may include an operation 428 for acquiring a first data indicating at least one activity executed by the user as originally reported by the user as depicted in FIG. 4*d*. For instance, the first data acquisition module 201 of the computing device 10 acquiring a first data 60 indicating at least one activity (e.g., an activity participated by the user 20\* such as eating or exercising) executed by the user 20\* as originally reported by the user 20\*.

In some instances, the first data 60 to be acquired may indicate an activity involving the consumption of an item by the user 20\*. For example, in some implementations, operation 428 may comprise an operation 429 for acquiring a first data indicating at least a consumption of an item by the user as originally reported by the user as depicted in FIG. 4*d*. For instance, the first data acquisition module 201 of the computing device 10 acquiring a first data 60 indicating at least a consumption of an item (e.g., alcoholic beverage) by the user 20\* as originally reported by the user 20\*.

In these implementations, the first data 60 to be acquired may indicate the user 20\* consuming any one of a variety of items. For example, in some implementations, operation 429 may include an operation 430 for acquiring a first data indicating at least a consumption of a food item by the user as originally reported by the user as depicted in FIG. 4*d*. For instance, the first data acquisition module 201 of the computing device 10 acquiring a first data 60 indicating at least a consumption of a food item (e.g., spicy food) by the user 20\* as originally reported by the user 20\*.

In some implementations, operation 429 may include an operation 431 for acquiring a first data indicating at least a consumption of a medicine by the user as originally reported by the user as depicted in FIG. 4*d*. For instance, the first data acquisition module 201 of the computing device 10 acquiring a first data 60 indicating at least a consumption of a medicine (e.g., aspirin) by the user 20\* as originally reported by the user 20\*.

In some implementations, operation 429 may include an operation 432 for acquiring a first data indicating at least a consumption of a nutraceutical by the user as originally reported by the user as depicted in FIG. 4*d*. For instance, the first data acquisition module 201 of the computing device 10 acquiring a first data 60 indicating at least a consumption of a nutraceutical (e.g., Kava, Ginkgo, Sage, and so forth) by the user 20\* as originally reported by the user 20\*.

The first data 60 acquired in operation 428 may indicate other types of activities executed by the user 20\* in various alternative implementations. For example, in some implementations, operation 428 may include an operation 433 for acquiring a first data indicating at least a social or leisure activity executed by the user as originally reported by the user as depicted in FIG. 4*d*. For instance, the first data acquisition module 201 of the computing device 10 acquiring a first data 60 indicating at least a social or leisure activity (e.g., eating dinner with friends or family or playing golf) executed by the user 20\* as originally reported by the user 20\*.

In some implementations, operation 428 may include an operation 434 for acquiring a first data indicating at least a work activity executed by the user as originally reported by the user as depicted in FIG. 4*d*. For instance, the first data acquisition module 201 of the computing device 10 acquiring a first data 60 indicating at least a work activity (e.g., arriving at work at 6 AM) executed by the user 20* as originally reported by the user 20*.

In some implementations, operation 428 may include an operation 435 for acquiring a first data indicating at least an exercise activity executed by the user as originally reported by the user as depicted in FIG. 4d. For instance, the first data acquisition module 201 of the computing device 10 acquiring a first data 60 indicating at least an exercise activity (e.g., walking, jogging, lifting weights, swimming, aerobics, treadmills, and so forth) executed by the user 20* as originally reported by the user 20*.

In some implementations, operation 428 may include an operation 436 for acquiring a first data indicating at least a learning or educational activity executed by the user as originally reported by the user as depicted in FIG. 4d. For instance, the first data acquisition module 201 of the computing device 10 acquiring a first data 60 indicating at least a learning or educational activity (e.g., reading, attending a class or lecture, and so forth) executed by the user 20* as originally reported by the user 20*.

Figure 4E:
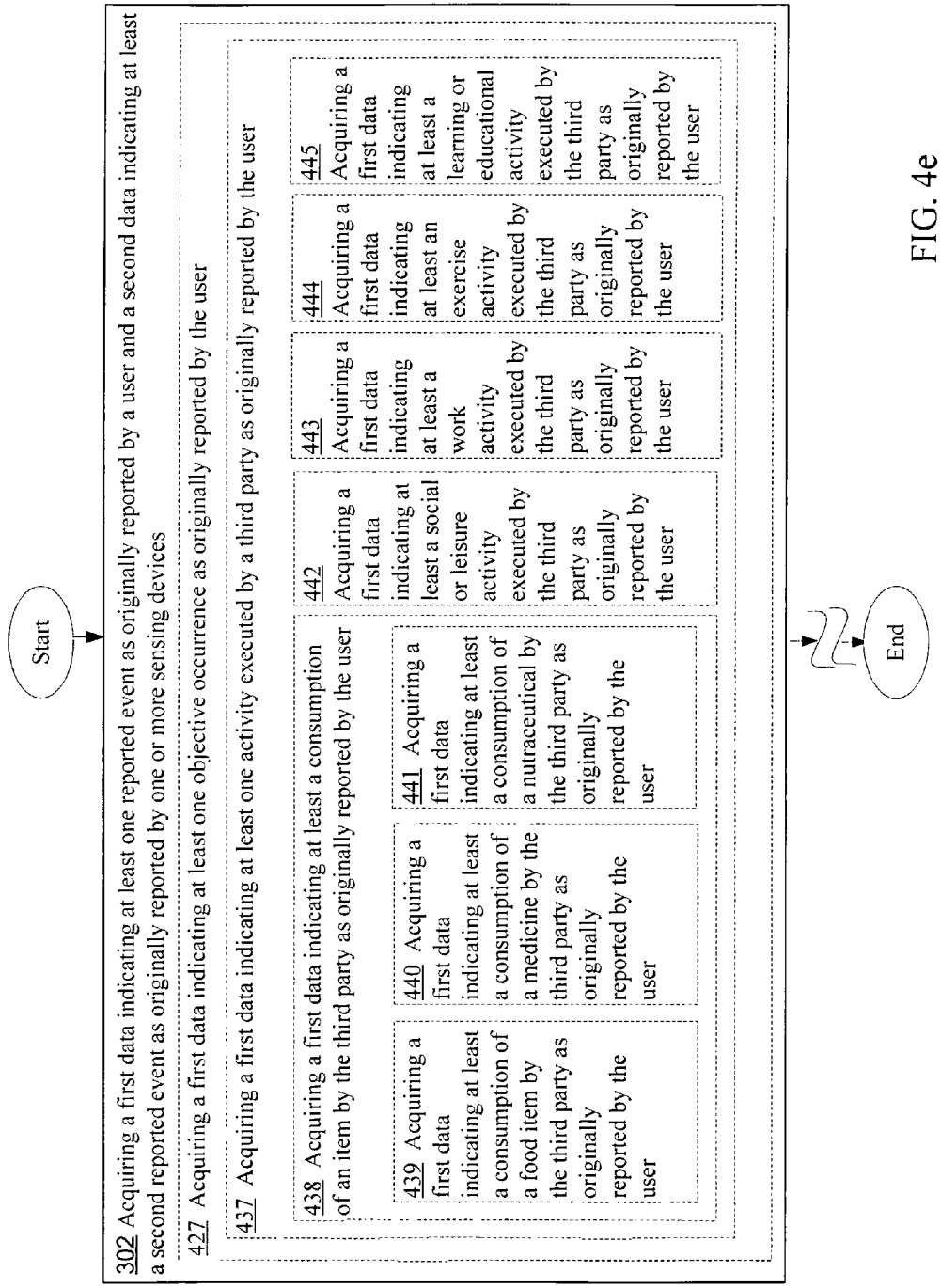
FIG. 4e is a high-level logic flowchart of a process depicting alternate implementations of the data acquisition operation 302 of FIG. 3.

In various implementations, the first data 60 that may be acquired through operation 427 of FIG. 4d may indicate other types of activities or events that may not be directly related to the user 20*. For example, in various implementations, operation 427 may include an operation 437 for acquiring a first data indicating at least one activity executed by a third party as originally reported by the user as depicted in FIG. 4e. For instance, the first data acquisition module 201 of the computing device 10 acquiring a first data 60 indicating at least one activity executed by a third party 50 (e.g., another user, a nonuser, or a nonhuman living organism such as a pet or livestock) as originally reported by the user 20*.

Various types of activities executed by the third party 50 may be indicated by the first data 60 acquired through operation 437. For example, in some implementations, operation 437 may further include an operation 438 for acquiring a first data indicating at least a consumption of an item by the third party as originally reported by the user as depicted in FIG. 4e. For instance, the first data acquisition module 201 of the computing device 10 acquiring a first data 60 indicating at least a consumption of an item by the third party 50* as originally reported by the user 20*.

For these implementations, the first data 60 acquired through operation 438 may indicate the third party 50 consuming at least one item from a variety of edible items. For example, in some implementations, operation 438 may include an operation 439 for acquiring a first data indicating at least a consumption of a food item by the third party as originally reported by the user as depicted in FIG. 4e. For instance, the first data acquisition module 201 of the computing device 10 acquiring a first data 60 indicating at least a consumption of a food item (e.g., ice cream) by the third party 50 (e.g., pet dog) as originally reported by the user 20*.

In alternative implementations, however, operation 438 may include an operation 440 for acquiring a first data indicating at least a consumption of a medicine by the third party as originally reported by the user as depicted in FIG. 4e. For instance, the first data acquisition module 201 of the computing device 10 acquiring a first data 60 indicating at least a consumption of a medicine (e.g., beta blocker) by the third party 50 (e.g., a spouse of the user 20*) as originally reported by the user 20*.

In still other alternative implementations, operation 438 may include an operation 441 for acquiring a first data indicating at least a consumption of a nutraceutical by the third party as originally reported by the user as depicted in FIG. 4e. For instance, the first data acquisition module 201 of the computing device 10 acquiring a first data 60 indicating at least a consumption of a nutraceutical (e.g., Gingko) by the third party (e.g., co-worker) as originally reported by the user 20*.

The first data 60 acquired through operation 437 may indicate other types of activities associated with a third party 50 other than a consumption of an item in various alternative implementations. For example, in some implementations, operation 437 may include an operation 442 for acquiring a first data indicating at least a social or leisure activity executed by the third party as originally reported by the user as depicted in FIG. 4e. For instance, the first data acquisition module 201 of the computing device 10 acquiring a first data 60 indicating at least a social or leisure activity (e.g., attending a family function) executed by the third party 50 (e.g., another user such as a friend or a family member) as originally reported by the user 20*.

In some implementations, operation 437 may include an operation 443 for acquiring a first data indicating at least a work activity executed by the third party as originally reported by the user as depicted in FIG. 4e. For instance, the first data acquisition module 201 of the computing device 10 acquiring a first data 60 indicating at least a work activity (e.g., arriving for work late at 10 AM) executed by the third party 50 (e.g., co-worker or a supervisor) as originally reported by the user 20*.

In some implementations, operation 437 may include an operation 444 for acquiring a first data indicating at least an exercise activity executed by the third party as originally reported by the user as depicted in FIG. 4e. For instance, the first data acquisition module 201 of the computing device 10 acquiring a first data 60 indicating at least an exercise activity (e.g., going for a walk) executed by the third party (e.g., pet dog) as originally reported by the user 20*.

In some implementations, operation 437 may include an operation 445 for acquiring a first data indicating at least a learning or educational activity executed by the third party as originally reported by the user as depicted in FIG. 4e. For instance, the first data acquisition module 201 of the computing device 10 acquiring a first data 60 indicating at least a learning or educational activity (e.g., attending a class) executed by the third party (e.g., an off-spring) as originally reported by the user.

Figure 4F:
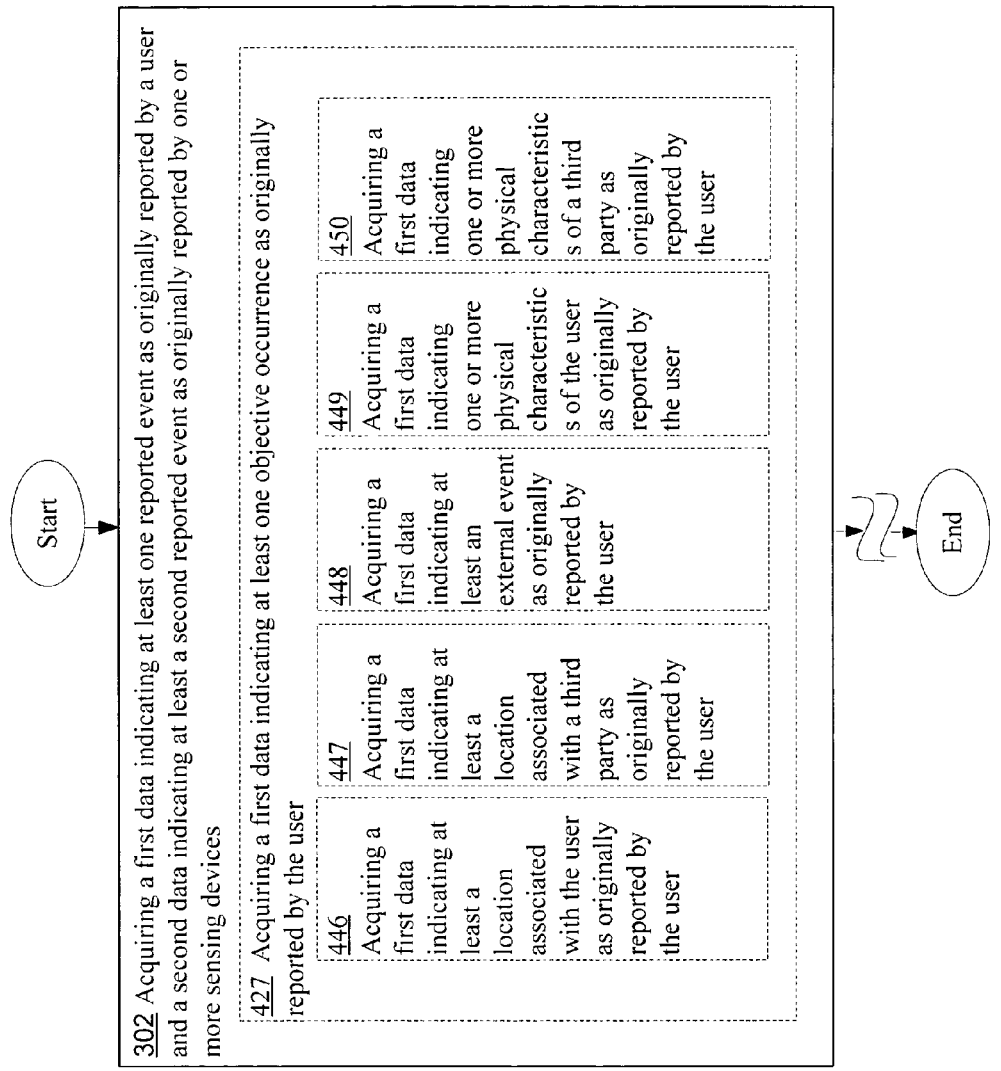
FIG. 4f is a high-level logic flowchart of a process depicting alternate implementations of the data acquisition operation 302 of FIG. 3.

Referring back to FIG. 4d, the first data 60 acquired through operation 427 may indicate other types of objective occurrences in various alternative implementations. For example, in some implementations, operation 427 may include an operation 446 for acquiring a first data indicating at least a location associated with the user as originally reported by the user as depicted in FIG. 4f. For instance, the first data acquisition module 201 of the computing device 10 acquiring a first data 60 indicating at least a location (e.g., geographic location) associated with the user 20* as originally reported by the user 20*.

In some implementations, operation 427 may include an operation 447 for acquiring a first data indicating at least a location associated with a third party as originally reported by the user as depicted in FIG. 4f. For instance, the first data acquisition module 201 of the computing device 10 acquiring a first data 60 indicating at least a location (e.g., home of the user 20*) associated with a third party 50 (e.g., in-laws) as originally reported by the user 20*.

In some implementations, operation 427 may include an operation 448 for acquiring a first data indicating at least an external event as originally reported by the user as depicted in FIG. 4f. For instance, the first data acquisition module 201 of the computing device 10 acquiring a first data 60 indicating at least an external event (e.g., a sports event or the atmospheric pollution level on a particular day) as originally reported by the user 20*.

In some implementations, operation 427 may include an operation 449 for acquiring a first data indicating one or more physical characteristics of the user as originally reported by the user as depicted in FIG. 4f. For instance, the first data acquisition module 201 of the computing device 10 acquiring a first data 60 indicating at least one or more physical characteristics (e.g., blood pressure or skin color) of the user 20* as originally reported by the user 20*.

In some implementations, operation 427 may include an operation 450 for acquiring a first data indicating one or more physical characteristics of a third party as originally reported by the user as depicted in FIG. 4f. For instance, the first data acquisition module 201 of the computing device 10 acquiring a first data 60 indicating at least one or more physical characteristics (e.g., blood shot eyes) of a third party (e.g., another user such as a friend) as originally reported by the user 20*.

Figure 4G:
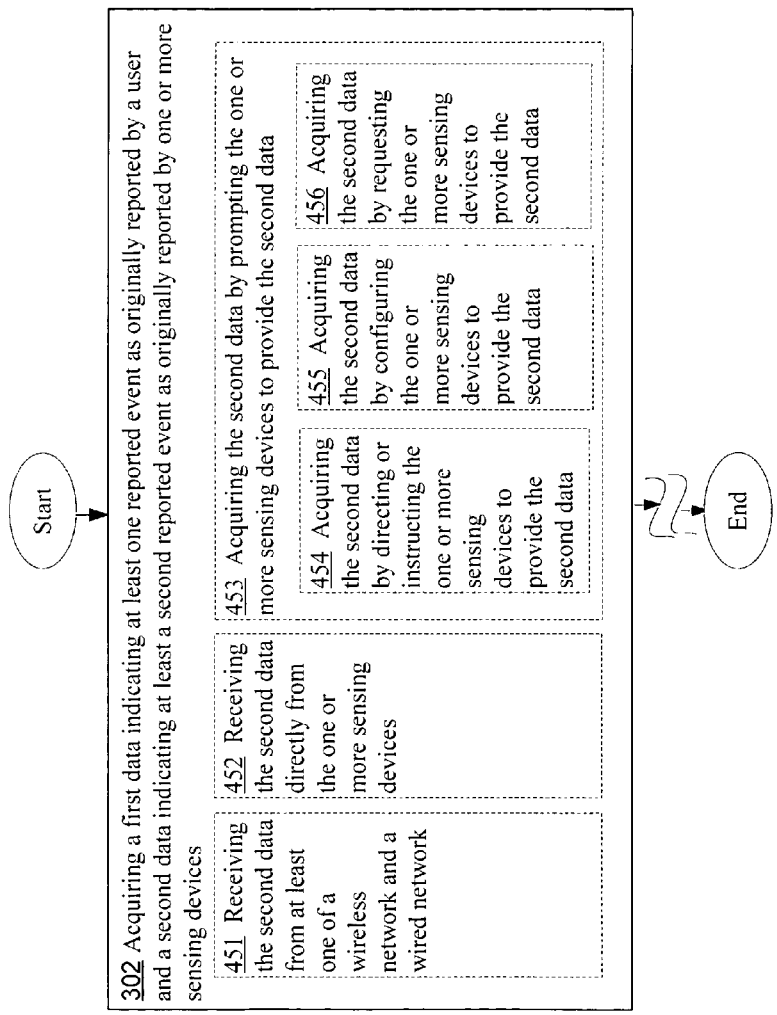
FIG. 4g is a high-level logic flowchart of a process depicting alternate implementations of the data acquisition operation 302 of FIG. 3.

Referring back to the data acquisition operation 302 of FIG. 3, the second data 61 indicating at least a second reported event as acquired in the data acquisition operation 302 may be acquired through various means and in various different forms. For example, in some implementations, the data acquisition operation 302 may include an operation 451 for receiving the second data from at least one of a wireless network and a wired network as depicted in FIG. 4g. For instance, the network interface reception module 216 (which may be the same as the network interface reception module 202) of the computing device 10 receiving the second data 61 (e.g., as originally provided by a sensing device 35a) from at least one of a wireless network and a wired network 40.

Alternatively, in some implementations, the data acquisition operation 302 may include an operation 452 for receiving the second data directly from the one or more sensing devices as depicted in FIG. 4g. For instance, the sensing device reception module 218 of the computing device 10 receiving the second data 61 directly from the one or more sensing devices 35b.

In some implementations, the data acquisition operation 302 may include an operation 453 for acquiring the second data by prompting the one or more sensing devices to provide the second data as depicted in FIG. 4g. For instance, the second data acquisition module 215 of the computing device 10 acquiring the second data 61 by the device prompting module 220 prompting (e.g., as indicated by ref. 23) the one or more sensing devices 35* to provide the second data 61.

Various approaches may be employed in operation 453 in order to prompt the one or more sensing devices 35 to provide the second data 61. For example, in some implementations, operation 453 may include an operation 454 for acquiring the second data by directing or instructing the one or more sensing devices to provide the second data as depicted in FIG. 4g. For instance, the second data acquisition module 215 of the computing device 10 acquiring the second data 60 by the sensing device directing/instructing module 222 directing or instructing the one or more sensing devices 35* to provide the second data 61.

In some implementations, operation 453 may include an operation 455 for acquiring the second data by configuring the one or more sensing devices to provide the second data as depicted in FIG. 4g. For instance, the second data acquisition module 215 of the computing device 10 acquiring the second data 60 by the sensing device configuration module 224 configuring the one or more sensing devices 35* to provide the second data 61.

In some implementations, operation 453 may include an operation 456 for acquiring the second data by requesting the one or more sensing devices to provide the second data as depicted in FIG. 4g. For instance, the second data acquisition module 215 of the computing device 10 acquiring the second data 60 by the sensing device requesting module 226 requesting (e.g., transmitting a request) the one or more sensing devices 35* to provide (e.g., to have access to or to transmit) the second data 61.

Figure 4H:
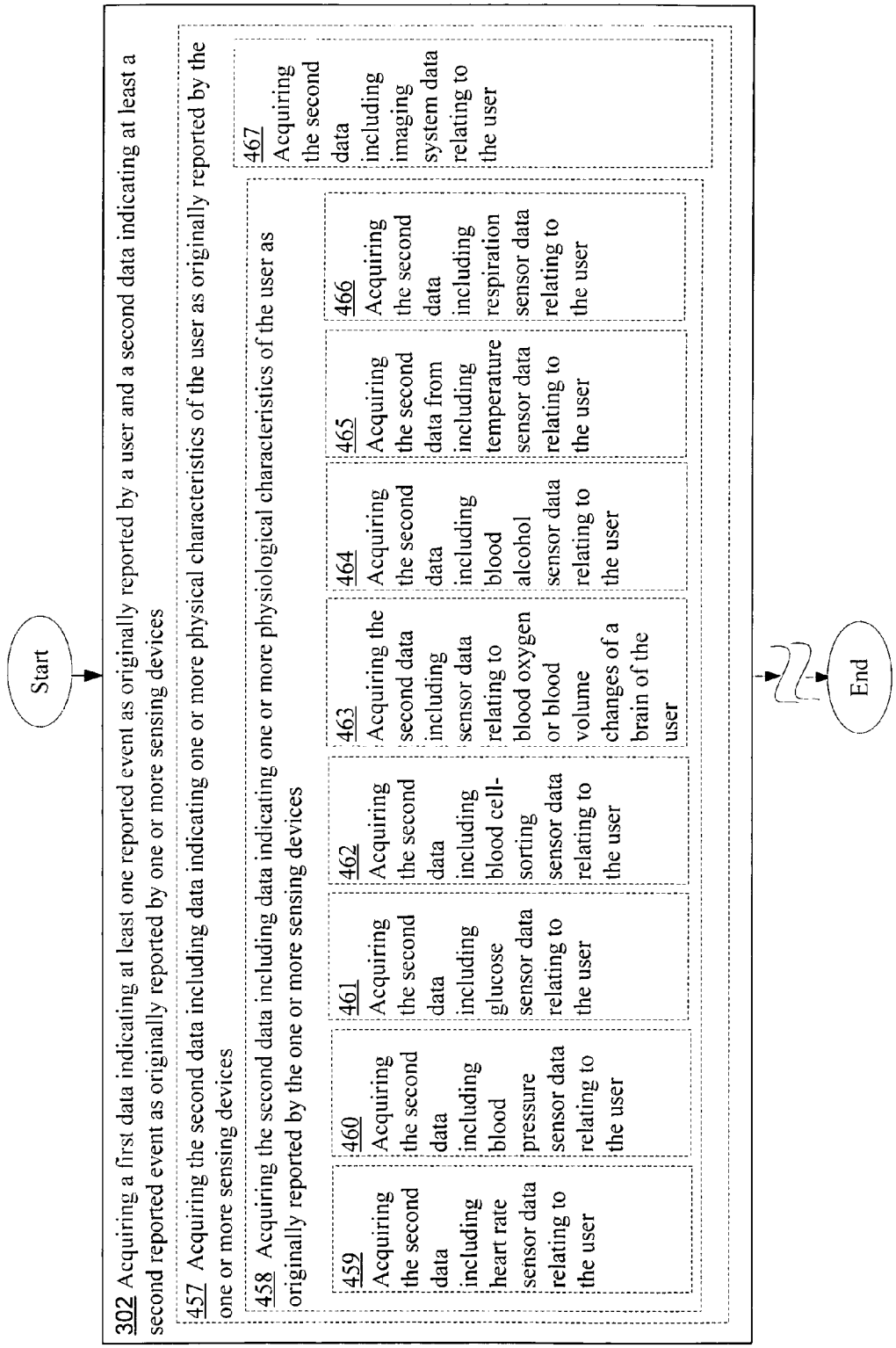
FIG. 4h is a high-level logic flowchart of a process depicting alternate implementations of the data acquisition operation 302 of FIG. 3.

The second data 61 acquired through the data acquisition operation 302 of FIG. 3 may indicate a wide variety of objective occurrences that may be detected by a sensing device 35 including, for example, the objectively observable physical characteristics of the user 20*. For example, in various implementations, the data acquisition operation 302 may include an operation 457 for acquiring the second data including data indicating one or more physical characteristics of the user as originally reported by the one or more sensing devices as depicted in FIG. 4h. For instance, the second data acquisition module 215 of the computing device 10 acquiring the second data 61 including data indicating one or more physical characteristics of the user 20* as originally reported by the one or more sensing devices 35*.

In some implementations, operation 457 may include an operation 458 for acquiring the second data including data indicating one or more physiological characteristics of the user as originally reported by the one or more sensing devices as depicted in FIG. 4h. For instance, the second data acquisition module 215 of the computing device 10 acquiring the second data 61 including data indicating one or more physiological characteristics of the user 20* as originally reported by the one or more sensing devices (e.g., physiological sensor devices 281).

Various types of physiological characteristics of the user 20* may be indicated by the second data 61 acquired through operation 458 in various alternative implementations. For example, in some implementations, operation 458 may include an operation 459 for acquiring the second data including heart rate sensor data relating to the user as depicted in FIG. 4h. For instance, the second data acquisition module 215 of the computing device 10 acquiring the second data 61 including heart rate sensor data relating to the user 20* as at least originally provided by, for example, a heart rate sensor device 282.

In some implementations, operation 458 may include an operation 460 for acquiring the second data including blood pressure sensor data relating to the user as depicted in FIG. 4h. For instance, the second data acquisition module 215 of the computing device 10 acquiring the second data 61 including blood pressure sensor data relating to the user 20* as at least originally provided by, for example, a blood pressure sensor device 283.

In some implementations, operation 458 may include an operation 461 for acquiring the second data including glucose sensor data relating to the user as depicted in FIG. 4h. For instance, the second data acquisition module 215 of the computing device 10 acquiring the second data 61 including glucose sensor data relating to the user 20* as at least originally provided by, for example, a blood glucose sensor device 284 (e.g., glucometer).

In some implementations, operation 458 may include an operation 462 for acquiring the second data including blood cell-sorting sensor data relating to the user as depicted in FIG. 4h. For instance, the second data acquisition module 215 of the computing device 10 acquiring the second data 61 including blood cell-sorting sensor data relating to the user 20\* as provided by, for example, a blood cell-sorting sensor device 322.

In some implementations, operation 458 may include an operation 463 for acquiring the second data including sensor data relating to blood oxygen or blood volume changes of a brain of the user as depicted in FIG. 4h. For instance, the second data acquisition module 215 of the computing device 10 acquiring the second data 61 including sensor data relating to blood oxygen or blood volume changes of a brain of the user 20\* as at least originally provided by, for example, an fMRI device 285 and/or an fNIR device 286.

In some implementations, operation 458 may include an operation 464 for acquiring the second data including blood alcohol sensor data relating to the user as depicted in FIG. 4h. For instance, the second data acquisition module 215 of the computing device 10 acquiring the second data 61 including blood alcohol sensor data relating to the user 20\* as at least originally provided by, for example, a blood alcohol sensor device 287.

In some implementations, operation 458 may include an operation 465 for acquiring the second data including temperature sensor data relating to the user as depicted in FIG. 4h. For instance, the second data acquisition module 215 of the computing device 10 acquiring the second data 61 including temperature sensor data relating to the user 20\* as at least originally provided by, for example, temperature sensor device 288.

In some implementations, operation 458 may include an operation 466 for acquiring the second data including respiration sensor data relating to the user as depicted in FIG. 4h. For instance, the second data acquisition module 215 of the computing device 10 acquiring the second data 61 including respiration sensor data relating to the user 20\* as at least originally provided by, for example, a respiration sensor device 289.

In various implementations, operation 457 of FIG. 4h for acquiring the data indicating one or more physical characteristics of the user 20\* may include an operation 467 for acquiring the second data including imaging system data relating to the user as depicted in FIG. 4h. For instance, the second data acquisition module 215 of the computing device 10 acquiring the second data 61 including imaging system data relating to the user 20\* as at least originally provided by, for example, one or more image system devices 290 (e.g., a digital or video camera, an x-ray machine, an ultrasound device, an fMRI device, an fNIR device, and so forth).

Figure 4I:
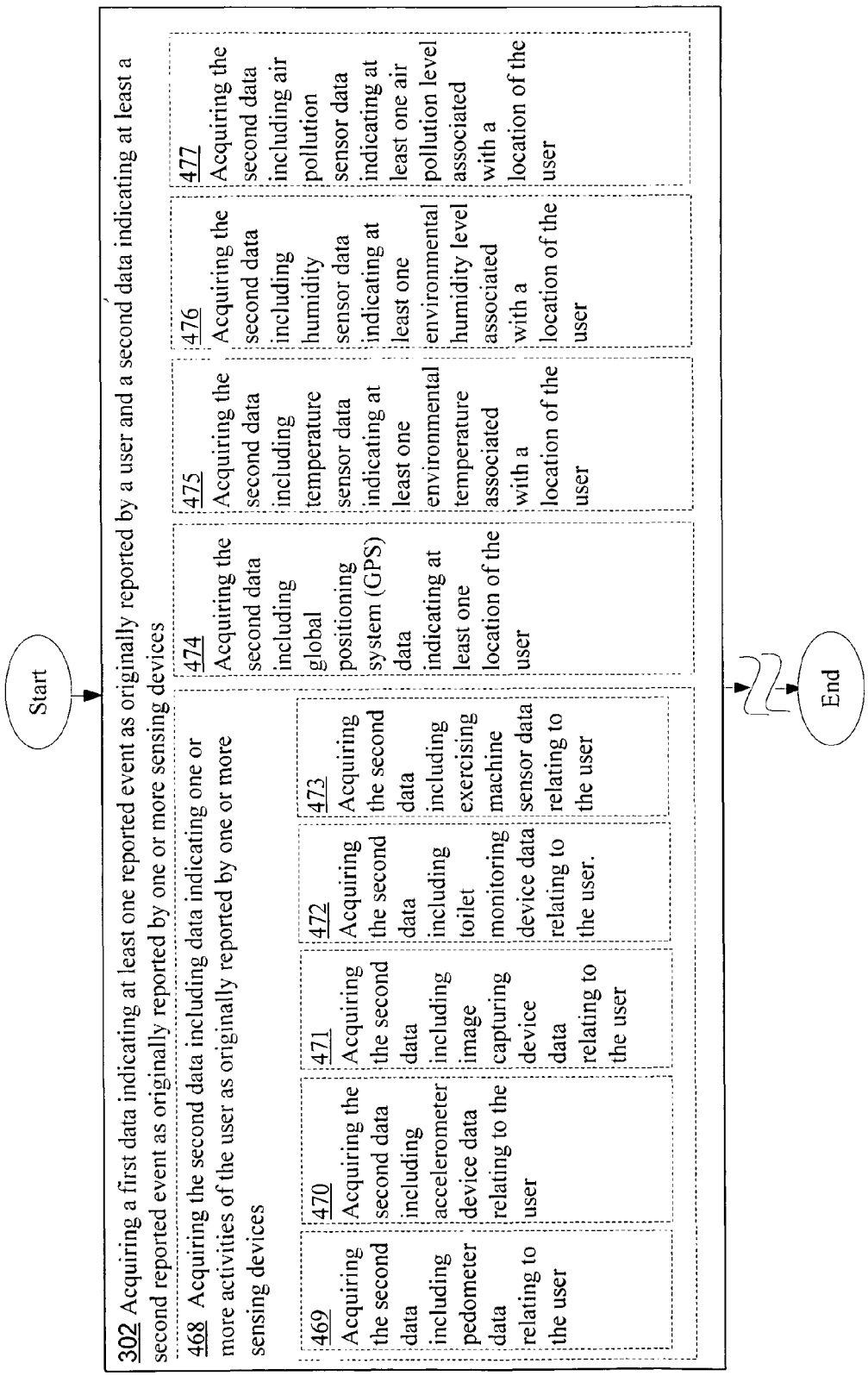
FIG. 4i is a high-level logic flowchart of a process depicting alternate implementations of the data acquisition operation 302 of FIG. 3.

Referring back to the data acquisition operation 302 of FIG. 3, in various implementations, the second data 61 acquired through the data acquisition operation 302 may indicate one or more activities executed by the user 20\* as originally reported by one or more sensing devices 35\*. For example, in some implementations, the data acquisition operation 302 may include an operation 468 for acquiring the second data including data indicating one or more activities of the user as depicted in FIG. 4i. For instance, the second data acquisition module 215 of the computing device 10 acquiring the second data 61 including data indicating one or more activities of the user 20\* as at least originally provided by, for example, one or more user activity sensing devices 291.

The data indicating the one or more activities of the user 20\* acquired through operation 468 may be acquired from any one or more of a variety of different sensing devices 35\* capable of sensing the activities of the user 20\*. For example, in some implementations, operation 468 may include an operation 469 for acquiring the second data including pedometer data relating to the user as depicted in FIG. 4i. For instance, the second data acquisition module 215 of the computing device 10 acquiring the second data 61 including pedometer data relating to the user 20\* as at least originally provided by, for example, a pedometer 292.

In some implementations, operation 468 may include an operation 470 for acquiring the second data including accelerometer device data relating to the user as depicted in FIG. 4i. For instance, the second data acquisition module 215 of the computing device 10 acquiring the second data 61 including accelerometer device data relating to the user 20\* as at least originally provided by, for example, an accelerometer 293.

In some implementations, operation 468 may include an operation 471 for acquiring the second data including image capturing device data relating to the user as depicted in FIG. 4i. For instance, the second data acquisition module 215 of the computing device 10 acquiring the second data 61 including image capturing device data relating to the user 20\* as at least originally provided by, for example, an image capturing device 294 (e.g. digital or video camera to capture user movements).

In some implementations, operation 468 may include an operation 472 for acquiring the second data including toilet monitoring device data relating to the user as depicted in FIG. 4i. For instance, the second data acquisition module 215 of the computing device 10 acquiring the second data 61 including toilet monitoring device data relating to usage of a toilet by the user 20\* as at least originally provided by, for example, a toilet monitoring device 295.

In some implementations, operation 468 may include an operation 473 for acquiring the second data including exercising machine sensor data relating to the user as depicted in FIG. 4i. For instance, the second data acquisition module 215 of the computing device 10 acquiring the second data 61 including exercising machine sensor data relating to exercise machine activities of the user 20\* as at least originally provided by, for example, an exercise machine sensor device 296.

Various other types of events related to the user 20\*, as originally reported by one or more sensing devices 35\*, may be indicated by the second data 61 acquired in the data acquisition operation 302. For example, in some implementations, the data acquisition operation 302 may include an operation 474 for acquiring the second data including global positioning system (GPS) data indicating at least one location of the user as depicted in FIG. 4i. For instance, the second data acquisition module 215 of the computing device 10 acquiring the second data 61 including global positioning system (GPS) data indicating at least one location of the user 20\* as at least originally provided by, for example, a GPS 297.

In some implementations, the data acquisition operation 302 may include an operation 475 for acquiring the second data including temperature sensor data indicating at least one environmental temperature associated with a location of the user as depicted in FIG. 4i. For instance, the second data acquisition module 215 of the computing device 10 acquiring the second data 61 including temperature sensor data indicating at least one environmental temperature associated with a location of the user 20\* as at least originally provided by, for example, an environmental temperature sensor device 298.

In some implementations, the data acquisition operation 302 may include an operation 476 for acquiring the second data including humidity sensor data indicating at least one environmental humidity level associated with a location of the user as depicted in FIG. 4i. For instance, the second data acquisition module 215 of the computing device 10 acquiring the second data 61 including humidity sensor data indicating at least one environmental humidity level associated with a location of the user 20* as at least originally provided by, for example, an environmental humidity sensor device 299.

In some implementations, the data acquisition operation 302 may include an operation 477 for acquiring the second data including air pollution sensor data indicating at least one air pollution level associated with a location of the user as depicted in FIG. 4i. For instance, the second data acquisition module 215 of the computing device 10 acquiring the second data 61 including air pollution sensor data indicating at least one air pollution level (e.g., ozone level, carbon dioxide level, particulate level, pollen level, and so forth) associated with a location of the user 20* as at least originally provided by, for example, an environmental air pollution sensor device 320.

Figure 4J:
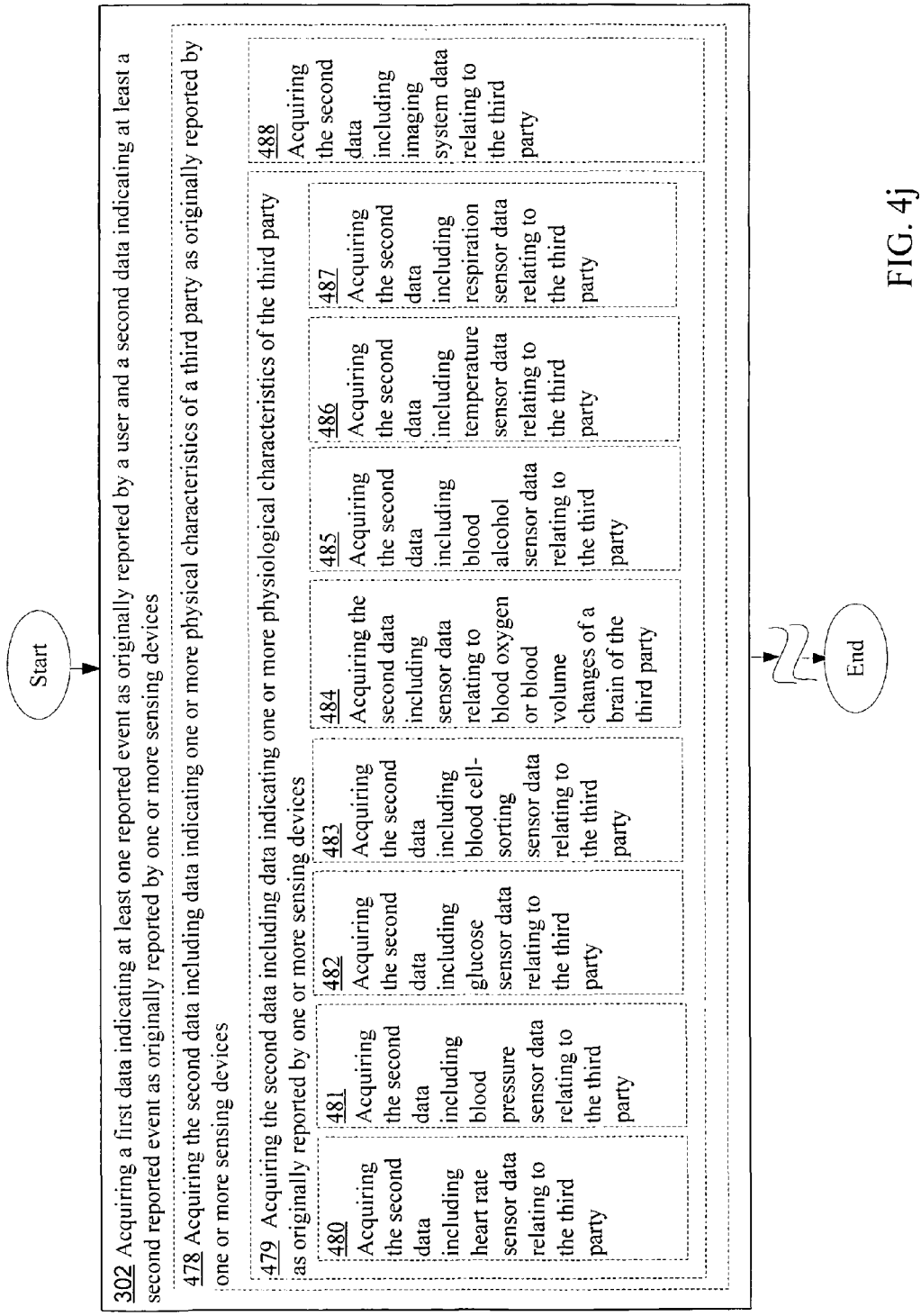
FIG. 4j is a high-level logic flowchart of a process depicting alternate implementations of the data acquisition operation 302 of FIG. 3.

In various implementations, the second data 61 acquired through the data acquisition operation 302 of FIG. 3 may indicate events originally reported by one or more sensing devices 35* that relates to a third party 50 (e.g., another user, a nonuser, or a nonhuman living organism such as a pet or livestock). For example, in some implementations, the data acquisition operation 302 may include an operation 478 for acquiring the second data including data indicating one or more physical characteristics of a third party as originally reported by the one or more sensing devices as depicted in FIG. 4j. For instance, the second data acquisition module 215 of the computing device 10 acquiring the second data 61 including one or more physical characteristics of a third party 50 as originally reported by one or more sensing devices 35a.

In various implementations, operation 478 may further include an operation 479 for acquiring the second data including data indicating one or more physiological characteristics of the third party as originally reported by the one or more sensing devices as depicted in FIG. 4j. For instance, the second data acquisition module 215 of the computing device 10 acquiring the second data 61 including data indicating one or more physiological characteristics of the third party 50 as originally reported by the one or more sensing devices 35a (e.g., a physiological sensor device 281).

In various implementations, the second data 61 acquired through operation 479 may indicate at least one of a variety of physiological characteristics that may be associated with the third party 50*. For example, in some implementations, operation 479 may include an operation 480 for acquiring the second data including heart rate sensor data relating to the third party as depicted in FIG. 4j. For instance, the second data acquisition module 215 of the computing device 10 acquiring the second data 61 including heart rate sensor data relating to the third party 50 as at least originally provided by, for example, a heart rate sensor device 282.

In some implementations, operation 479 may include an operation 481 for acquiring the second data including blood pressure sensor data relating to the third party as depicted in FIG. 4j. For instance, the second data acquisition module 215 of the computing device 10 acquiring the second data 61 including blood pressure sensor data relating to the third party 50 as at least originally provided by, for example, a blood pressure sensor device 283.

In some implementations, operation 479 may include an operation 482 for acquiring the second data including glucose sensor data relating to the third party as depicted in FIG. 4j. For instance, the second data acquisition module 215 of the computing device 10 acquiring the second data 61 including glucose sensor data relating to the third party 50 as at least originally provided by, for example, a blood glucose sensor device 284.

In some implementations, operation 479 may include an operation 483 for acquiring the second data including blood cell-sorting sensor data relating to the third party as depicted in FIG. 4j. For instance, the second data acquisition module 215 of the computing device 10 acquiring the second data 61 including blood cell-sorting sensor data relating to the third party 50 as at least originally provided by, for example, a blood cell-sorting sensor device 322.

In some implementations, operation 479 may include an operation 484 for acquiring the second data including sensor data relating to blood oxygen or blood volume changes of a brain of the third party as depicted in FIG. 4j. For instance, the second data acquisition module 215 of the computing device 10 acquiring the second data 61 including sensor data relating to blood oxygen or blood volume changes of a brain of the third party 50 as at least originally provided by, for example, an fMRI device 285 and/or an fNIR device 286.

In some implementations, operation 479 may include an operation 485 for acquiring the second data including blood alcohol sensor data relating to the third party as depicted in FIG. 4j. For instance, the second data acquisition module 215 of the computing device 10 acquiring the second data 61 including blood alcohol sensor data relating to the third party 50 as at least originally provided by, for example, a blood alcohol sensor device 287.

In some implementations, operation 479 may include an operation 486 for acquiring the second data including temperature sensor data relating to the third party as depicted in FIG. 4j. For instance, the second data acquisition module 215 of the computing device 10 acquiring the second data 61 including temperature sensor data relating to the third party 50 as at least originally provided by, for example, temperature sensor device 288.

In some implementations, operation 479 may include an operation 487 for acquiring the second data including respiration sensor data relating to the third party as depicted in FIG. 4j. For instance, the second data acquisition module 215 of the computing device 10 acquiring the second data 61 including respiration sensor data relating to the third party 50 as at least originally provided by, for example, a respiration sensor device 289.

In various implementations, operation 478 of FIG. 4j for acquiring the data indicating one or more physical characteristics of the third party 50 may include an operation 488 for acquiring the second data including imaging system data relating to the third party as depicted in FIG. 4j. For instance, the second data acquisition module 215 of the computing device 10 acquiring the second data 61 including imaging system data relating to the third party 50 as at least originally provided by, for example, one or more image system devices 290 (e.g., a digital or video camera, an x-ray machine, an ultrasound device, an fMRI device, an fNIR device, and so forth).

Figure 4K:
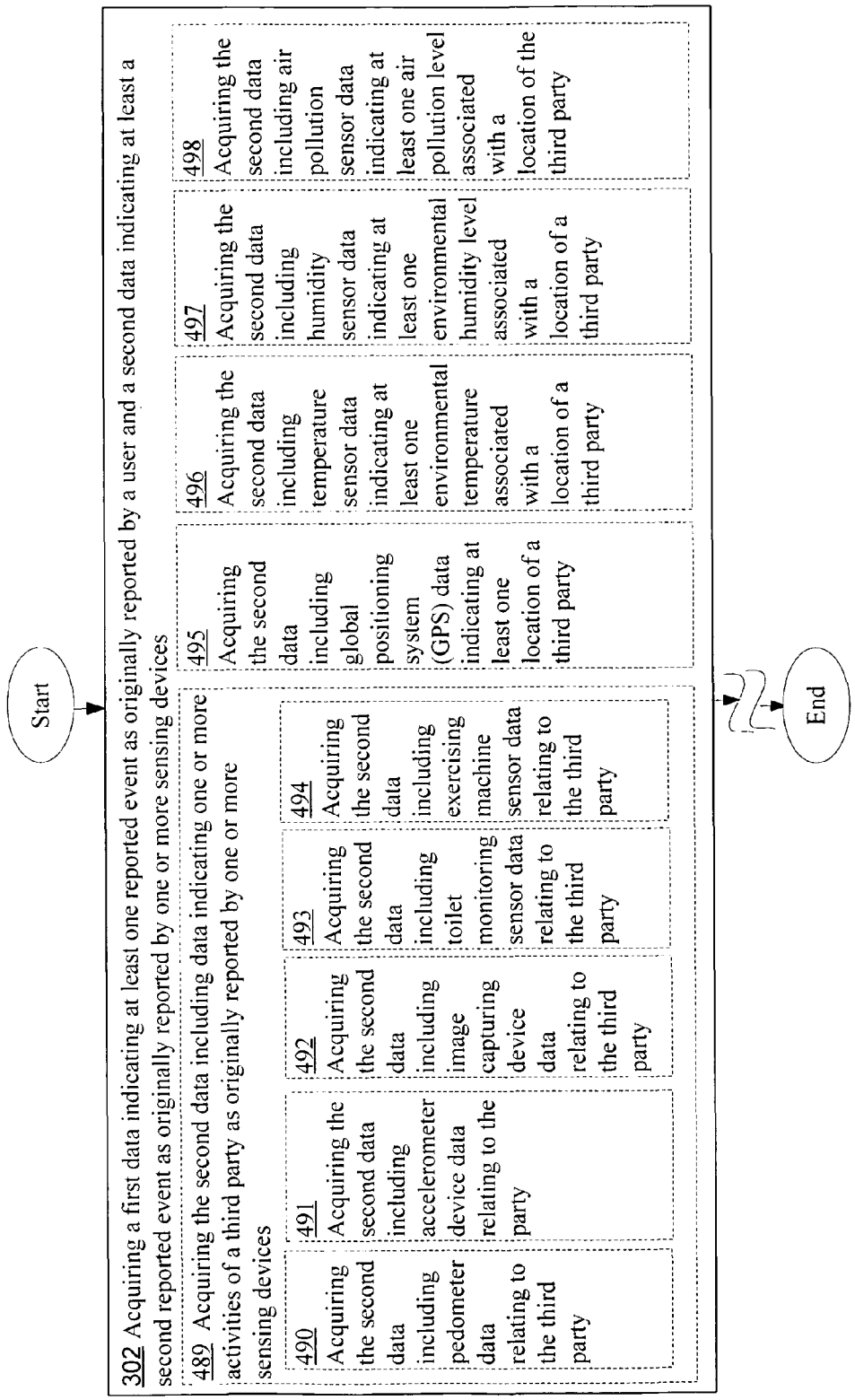
FIG. 4k is a high-level logic flowchart of a process depicting alternate implementations of the data acquisition operation 302 of FIG. 3.
Figure 41:
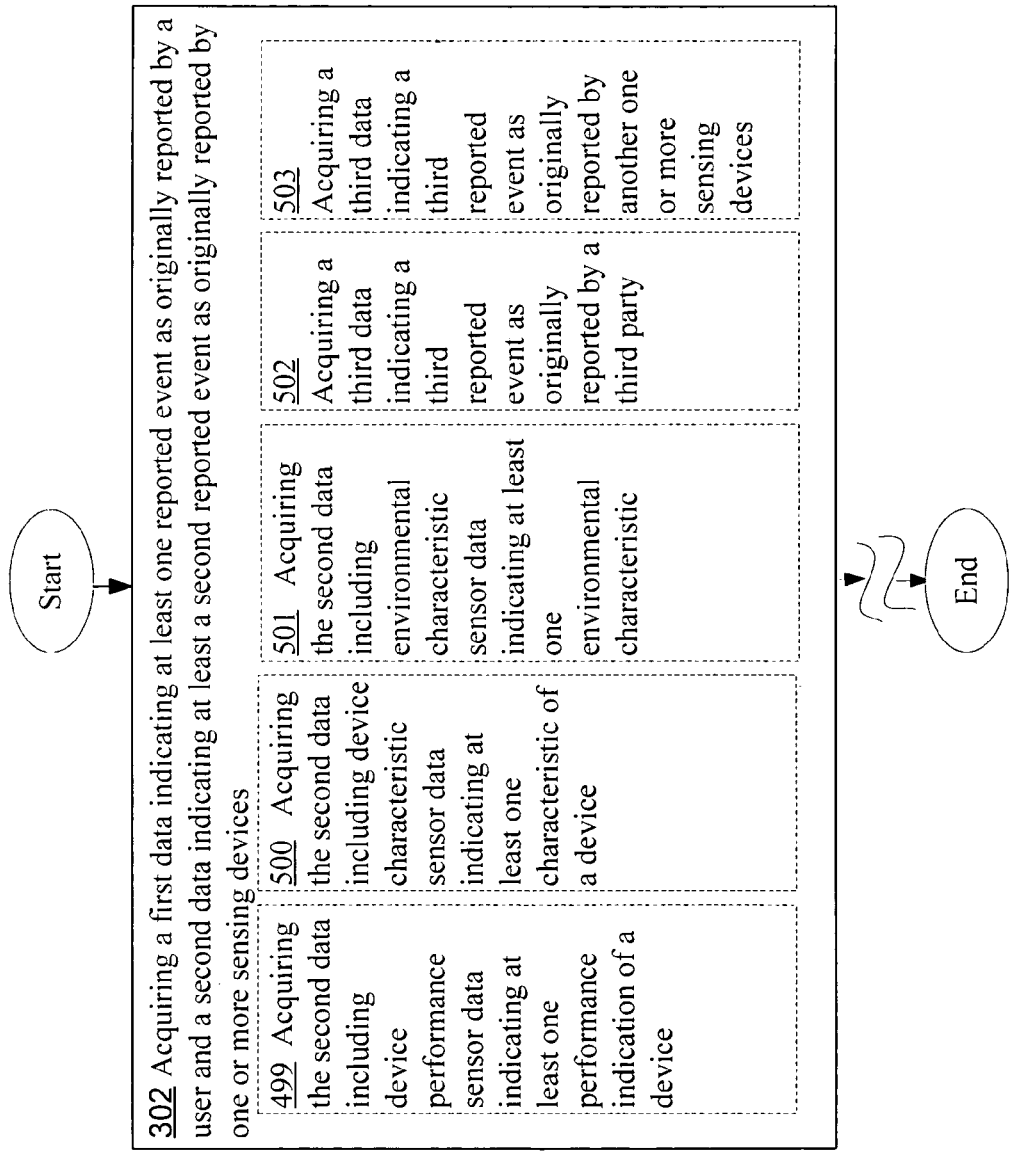

Referring back to the data acquisition operation 302 of FIG. 3, in various implementations the second data 61 acquired through the data acquisition operation 302 may indicate one or more activities executed by a third party 50 as originally reported by one or more sensing devices 35a. For example, in some implementations, the data acquisition operation 302 may include an operation 489 for acquiring the second data including data indicating one or more activities of a third party as depicted in FIG. 4k. For instance, the second data acquisition module 215 of the computing device 10 acquiring the second data 61 including data indicating one or more activities of a third party 50 as at least originally provided by, for example, one or more user activity sensing devices 291.

The data indicating the one or more activities of the third party 50 acquired through operation 489 may be acquired from any one or more of a variety of different sensing devices 35\* capable of sensing the activities of the user 20\*. For example, in some implementations, operation 489 may include an operation 490 for acquiring the second data including pedometer data relating to the third party as depicted in FIG. 4k. For instance, the second data acquisition module 215 of the computing device 10 acquiring the second data 61 including pedometer data relating to the third party 50 as at least originally provided by, for example, a pedometer 292.

In some implementations, operation 489 may include an operation 491 for acquiring the second data including accelerometer device data relating to the third party as depicted in FIG. 4k. For instance, the second data acquisition module 215 of the computing device 10 acquiring the second data 61 including accelerometer device data relating to the third party 50 as at least originally provided by, for example, an accelerometer 293.

In some implementations, operation 489 may include an operation 492 for acquiring the second data including image capturing device data relating to the third party as depicted in FIG. 4k. For instance, the second data acquisition module 215 of the computing device 10 acquiring the second data 61 including image capturing device data relating to the third party 50 as at least originally provided by, for example, an image capturing device 294 (e.g. digital or video camera to capture user movements).

In some implementations, operation 489 may include an operation 493 for acquiring the second data including toilet monitoring sensor data relating to the third party as depicted in FIG. 4k. For instance, the second data acquisition module 215 of the computing device 10 acquiring the second data 61 including toilet monitoring sensor data relating to usage of a toilet by the third party 50 as at least originally provided by, for example, a toilet monitoring device 295.

In some implementations, operation 489 may include an operation 494 for acquiring the second data including exercising machine sensor data relating to the third party as depicted in FIG. 4k. For instance, the second data acquisition module 215 of the computing device 10 acquiring the second data 61 including exercising machine sensor data relating to exercise machine activities of the third party 50 as at least originally provided by, for example, an exercise machine sensor device 296.

Various other types of events related to a third party 50, as originally reported by one or more sensing devices 35\*, may be indicated by the second data 61 acquired in the data acquisition operation 302. For example, in some implementations, the data acquisition operation 302 may include an operation 495 for acquiring the second data including global positioning system (GPS) data indicating at least one location of a third party as depicted in FIG. 4k. For instance, the second data acquisition module 215 of the computing device 10 acquiring the second data 61 including global positioning system (GPS) data indicating at least one location of a third party 50 as at least originally provided by, for example, a GPS 297.

In some implementations, the data acquisition operation 302 may include an operation 496 for acquiring the second data including temperature sensor data indicating at least one environmental temperature associated with a location of a third party as depicted in FIG. 4k. For instance, the second data acquisition module 215 of the computing device 10 acquiring the second data 61 including temperature sensor data indicating at least one environmental temperature associated with a location of a third party 50 as at least originally provided by, for example, an environmental temperature sensor device 298.

In some implementations, the data acquisition operation 302 may include an operation 497 for acquiring the second data including humidity sensor data indicating at least one environmental humidity level associated with a location of a third party as depicted in FIG. 4k. For instance, the second data acquisition module 215 of the computing device 10 acquiring the second data 61 including humidity sensor data indicating at least one environmental humidity level associated with a location of a third party 50 as at least originally provided by, for example, an environmental humidity sensor device 299.

In some implementations, the data acquisition operation 302 may include an operation 498 for acquiring the second data including air pollution sensor data indicating at least one air pollution level associated with a location of the third party as depicted in FIG. 4k. For instance, the second data acquisition module 215 of the computing device 10 acquiring the second data 61 including air pollution sensor data indicating at least one air pollution level (e.g., ozone level, carbon dioxide level, particulate level, pollen level, and so forth) associated with a location of a third party 50 as at least originally provided by, for example, an environmental air pollution sensor device 320.

In various alternative implementations, the second data 61 acquired through the data acquisition operation 302 of FIG. 3 may indicate at least a second reported event that may be related to a device or an environmental characteristic. For example, in some implementations, the data acquisition operation 302 may include an operation 499 for acquiring the second data including device performance sensor data indicating at least one performance indication of a device as depicted in FIG. 4l. For instance, the second data acquisition module 215 of the computing device 10 acquiring the second data 61 including device performance sensor data indicating at least one performance indication (e.g., indication of operational performance) of a device (e.g., household appliance, automobile, communication device such as a mobile phone, medical device, and so forth).

In some alternative implementations, the data acquisition operation 302 may include an operation 500 for acquiring the second data including device characteristic sensor data indicating at least one characteristic of a device as depicted in FIG. 4l. For instance, the second data acquisition module 215 of the computing device 10 acquiring the second data 61 including device characteristic sensor data indicating at least one characteristic (e.g., air pressure) of a device (e.g., tires).

In some alternative implementations, the data acquisition operation 302 may include an operation 501 for acquiring the second data including environmental characteristic sensor data indicating at least one environmental characteristic as depicted in FIG. 4l. For instance, the second data acquisition module 215 of the computing device 10 acquiring the second data 61 including environmental characteristic sensor data indicating at least one environmental characteristic. Such an environmental characteristic sensor data may indicate, for example, air pollution levels or water purity levels of a local drinking water supply.

In some implementations, the data acquisition operation 302 of FIG. 3 may include an operation 502 for acquiring a third data indicating a third reported event as originally reported by a third party as depicted in FIG. 4l. For instance, the events data acquisition module 102 of the computing device 10 acquiring a third data 62 indicating a third reported event as originally reported by a third party 50. As an illustration, suppose a user 20* provides a first data 60 that indicates that the user 20* felt nauseous in the morning (e.g., subjective user state) and a sensing device 35*, such as a blood alcohol sensor device 287, provides a second data 61 indicating that the user 20* had a slightly elevated blood alcohol level, then a third party 50 (e.g., spouse) may provide a third data 62 that indicates that the third party 50 observed the user 20* staying up late the previous evening. This may ultimately result in a hypothesis being developed that indicates that there is a link between moderate alcohol consumption and staying up late with feeling nauseous.

In alternative implementations, the data acquisition operation 302 may include an operation 503 for acquiring a third data indicating a third reported event as originally reported by another one or more sensing devices as depicted in FIG. 4l. For instance, the events data acquisition module 102 of the computing device 10 acquiring a third data (e.g., fourth data 63 in FIG. 1a and 1b) indicating a third reported event as originally reported by another one or more sensing devices 35*.

Figure 4M:
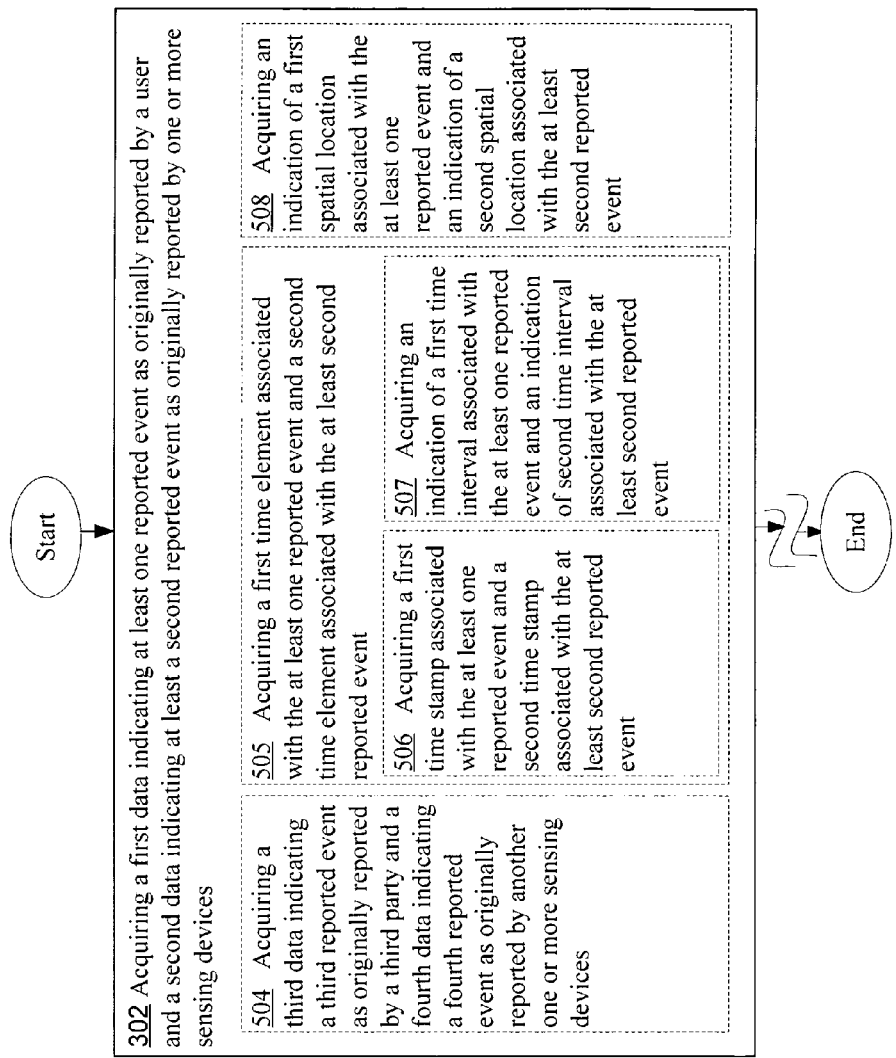
FIG. 4m is a high-level logic flowchart of a process depicting alternate implementations of the data acquisition operation 302 of FIG. 3.

In still other alternative implementations, the data acquisition operation 302 may include an operation 504 for acquiring a third data indicating a third reported event as originally reported by a third party and a fourth data indicating a fourth reported event as originally reported by another one or more sensing devices as depicted in FIG. 4m. For instance, the events data acquisition module 102 of the computing device 10 acquiring a third data 62 indicating a third reported event as originally reported by a third party 50 and a fourth data 63 indicating a fourth reported event as originally reported by another one or more sensing devices 35.

In order to facilitate the development of a hypothesis, the data acquisition operation 302 of FIG. 3 may involve the acquisition of time or spatial data related to the first reported event and the second reported event. For example, in various implementations, the data acquisition operation 302 may include an operation 505 for acquiring a first time element associated with the at least one reported event and a second time element associated with the at least second reported event as depicted in FIG. 4m. For instance, the time element acquisition module 228 of the computing device 10 acquiring a first time element associated with the at least one reported event (e.g., angry exchange with boss) and a second time element associated with the at least second reported event (e.g., elevated blood pressure).

In some implementations, operation 505 may comprise an operation 506 for acquiring a first time stamp associated with the at least one reported event and a second time stamp associated with the at least second reported event as depicted in FIG. 4m. For instance, the time stamp acquisition module 230 of the computing device 10 acquiring (e.g., receiving or self-generating) a first time stamp (e.g., 9 PM) associated with the at least one reported event (e.g., upset stomach) and a second time stamp (e.g., 7 PM) associated with the at least second reported event (e.g., visiting a particular restaurant as indicated by data provided by a GPS 297 or an accelerometer 293).

In some implementations, operation 505 may comprise an operation 507 for acquiring an indication of a first time interval associated with the at least one reported event and an indication of second time interval associated with the at least second reported event as depicted in FIG. 4m. For instance, the time interval indication acquisition module 232 of the computing device 10 acquiring (e.g., receiving or self-generating) an indication of a first time interval (e.g., 2 PM to 4 PM) associated with the at least one reported event (e.g., neighbor's dog being let out) and an indication of a second time interval (e.g., 3 PM to 4:40 PM) associated with the at least second reported event (e.g., user's dog staying near fence line as indicated by a GPS 297 coupled to the user's dog).

In some implementations, the data acquisition operation 302 may comprise an operation 508 for acquiring an indication of a first spatial location associated with the at least one reported event and an indication of a second spatial location associated with the at least second reported event as depicted in FIG. 4m. For instance, the spatial location indication acquisition module 234 of the computing device 10 acquiring (e.g., receiving or self-generating) an indication of a first spatial location (e.g., place of employment) associated with the at least one reported event (e.g., boss is out of office) and an indication of a second spatial location (e.g., place of employment) associated with the at least second reported event (e.g., reduced blood pressure).

Figure 5A:
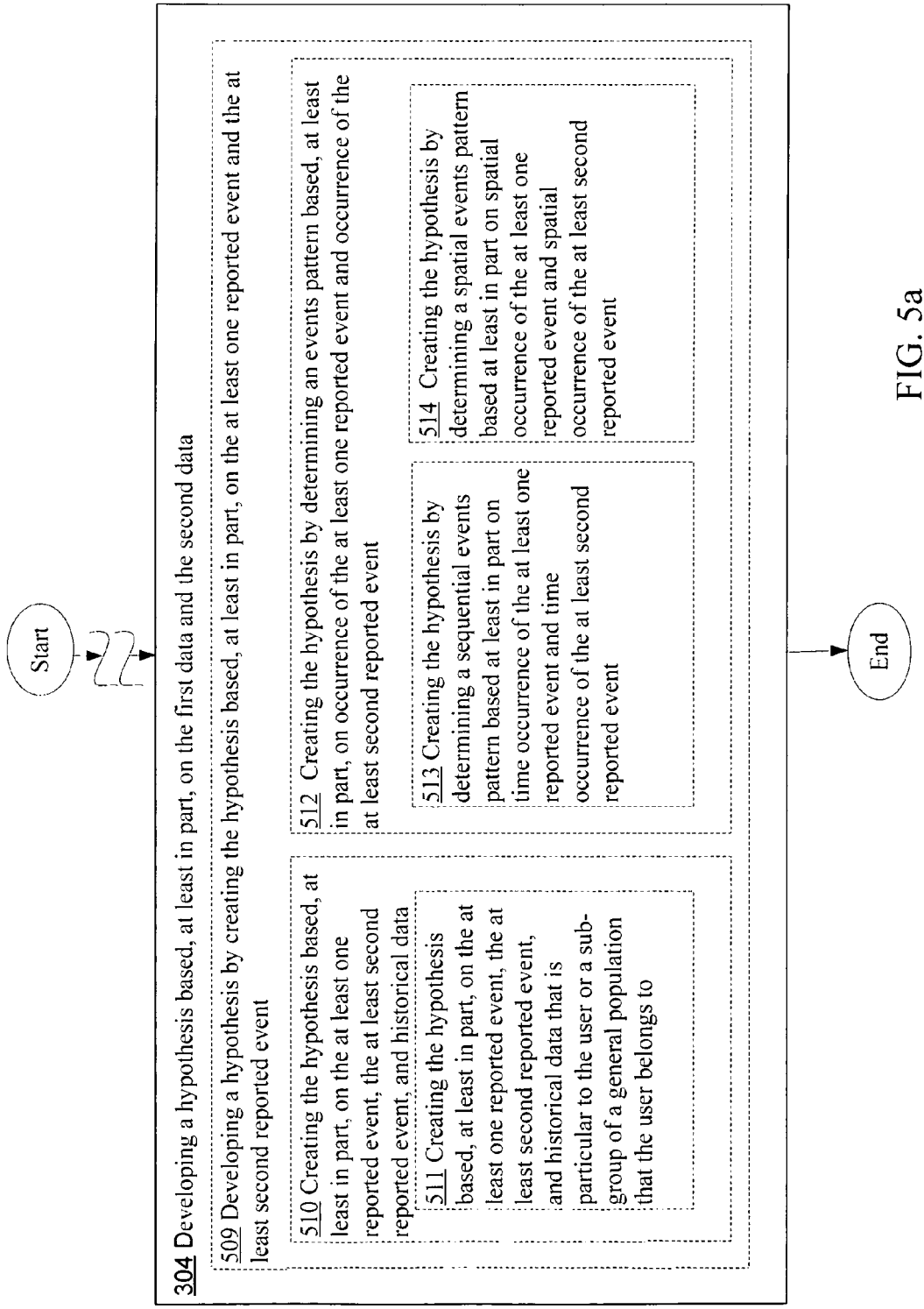
FIG. 5a is a high-level logic flowchart of a process depicting alternate implementations of the hypothesis development operation 304 of FIG. 3.

Referring back to FIG. 3, the hypothesis development operation 304 may be executed in a number of different ways in various alternative implementations. For example, in some implementations, the hypothesis development operation 304 may include an operation 509 for developing a hypothesis by creating the hypothesis based, at least in part, on the at least one reported event and the at least second reported event as depicted in FIG. 5a. For instance, the hypothesis development module 104 of the computing device 10 developing a hypothesis based on the hypothesis creation module 236 creating the hypothesis based, at least in part, on the at least one reported event and the at least second reported event.

In some instances, operation 509 may include an operation 510 for creating the hypothesis based, at least in part, on the at least one reported event, the at least second reported event, and historical data as depicted in FIG. 5a. For instance, the hypothesis creation module 236 of the computing device 10 creating the hypothesis based, at least in part, on the at least one reported event, the at least second reported event, and historical data 81 (e.g., past reported events or historical events pattern).

In some implementations, operation 510 may further include an operation 511 for creating the hypothesis based, at least in part, on the at least one reported event, the at least second reported event, and historical data that is particular to the user or a sub-group of a general population that the user belongs to as depicted in FIG. 5a. For instance, the hypothesis creation module 236 of the computing device 10 creating the hypothesis based, at least in part, on the at least one reported event, the at least second reported event, and historical data 81 that is particular to the user 20* or a sub-group of a general population that the user belongs to. Such a historical data 81 may include historical events pattern that may be associated with the user 20* or the sub-group of the general population.

In various implementations, the hypothesis created through operation 509 may be implemented by determining an events pattern. For example, in some instances, operation 509 may include an operation 512 for creating the hypothesis by determining an events pattern based, at least in part, on occurrence of the at least one reported event and occurrence of the at least second reported event as depicted in FIG. 5a. For instance, the hypothesis creation module 236 of the computing device 10 creating the hypothesis based on the events pattern determination module 238 determining an events pattern based, at least in part, on occurrence (e.g., time or spatial occurrence) of the at least one reported event and occurrence (e.g., time or spatial occurrence) of the at least second reported event.

In some implementations, operation 512 may include an operation 513 for creating the hypothesis by determining a sequential events pattern based at least in part on time occurrence of the at least one reported event and time occurrence of the at least second reported event as depicted in FIG. 5a. For instance, the hypothesis creation module 236 of the computing device 10 creating the hypothesis based on the sequential events pattern determination module 240 determining a sequential events pattern based at least in part on time occurrence of the at least one reported event and time occurrence of the at least second reported event.

In some implementations, operation 512 may include an operation 514 for creating the hypothesis by determining a spatial events pattern based at least in part on spatial occurrence of the at least one reported event and spatial occurrence of the at least second reported event as depicted in FIG. 5a. For instance, the hypothesis creation module 236 of the computing device 10 creating the hypothesis based on the spatial events pattern determination module 242 determining a spatial events pattern based at least in part on spatial occurrence of the at least one reported event and spatial occurrence of the at least second reported event.

Figure 5B:
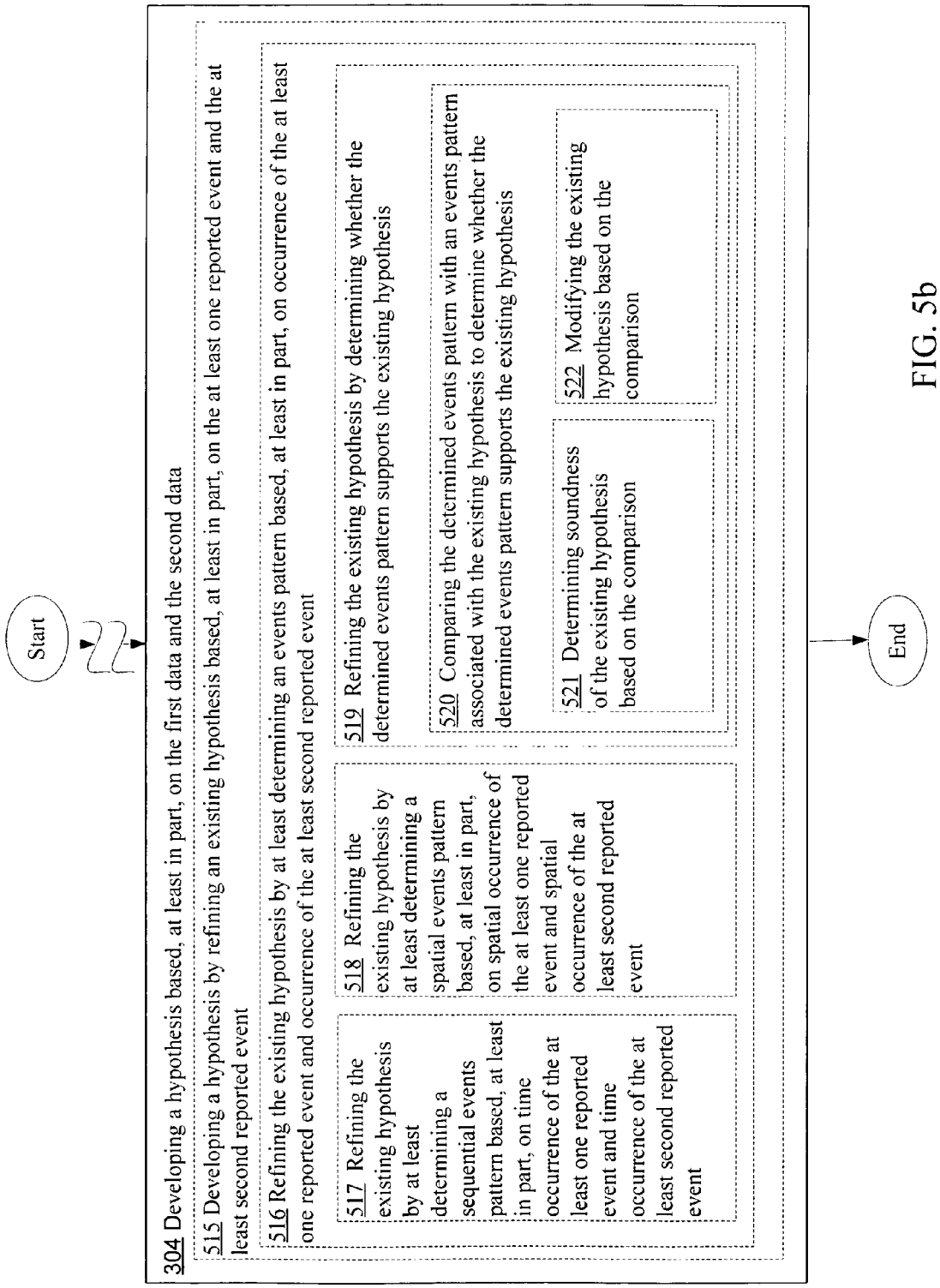
FIG. 5b is a high-level logic flowchart of a process depicting alternate implementations of the hypothesis development operation 304 of FIG. 3.

In various implementations, the hypothesis development operation 302 of FIG. 3 may involve the refinement of an already existing hypothesis. For example, in some implementations, the hypothesis development operation 302 may include an operation 515 for developing a hypothesis by refining an existing hypothesis based, at least in part, on the at least one reported event and the at least second reported event as depicted in FIG. 5b. For instance, the hypothesis development module 104 of the computing device 10 developing a hypothesis by the existing hypothesis refinement module 244 refining (e.g., further defining or developing) an existing hypothesis 80 based, at least in part, on the at least one reported event and the at least second reported event.

Various approaches may be employed in order to refine an existing hypothesis 80 in operation 515. For example, in some implementations, operation 515 may include an operation 516 for refining the existing hypothesis by at least determining an events pattern based, at least in part, on occurrence of the at least one reported event and occurrence of the at least second reported event as depicted in FIG. 5b. For instance, the existing hypothesis refinement module 244 of the computing device 10 refining the existing hypothesis 80 by the events pattern determination module 246 at least determining an events pattern based, at least in part, on occurrence of the at least one reported event and occurrence of the at least second reported event.

Operation 516, in turn, may further comprise an operation 517 for refining the existing hypothesis by at least determining a sequential events pattern based, at least in part, on time occurrence of the at least one reported event and time occurrence of the at least second reported event as depicted in FIG. 5b. For instance, the existing hypothesis refinement module 244 of the computing device 10 refining the existing hypothesis 80 by the sequential events pattern determination module 248 at least determining a sequential events pattern based, at least in part, on time occurrence of the at least one reported event and time occurrence of the at least second reported event.

In some alternative implementations, operation 516 may include an operation 518 for refining the existing hypothesis by at least determining a spatial events pattern based, at least in part, on spatial occurrence of the at least one reported event and spatial occurrence of the at least second reported event as depicted in FIG. 5b. For instance, the existing hypothesis refinement module 244 of the computing device 10 refining the existing hypothesis 80 by the spatial events pattern determination module 250 at least determining a sequential events pattern based, at least in part, on spatial occurrence of the at least one reported event and spatial occurrence of the at least second reported event.

In some implementations, operation 516 may include an operation 519 for refining the existing hypothesis by determining whether the determined events pattern supports the existing hypothesis as depicted in FIG. 5b. For instance, the existing hypothesis refinement module 244 of the computing device 10 refining the existing hypothesis 80 by the support determination module 252 determining whether the determined events pattern supports (or contradicts) the existing hypothesis 80 (e.g., the determined events pattern at least generally matches or is at least generally in-line with the existing hypothesis 80).

In various implementations, operation 519, in turn, may include an operation 520 for comparing the determined events pattern with an events pattern associated with the existing hypothesis to determine whether the determined events pattern supports the existing hypothesis as depicted in FIG. 5b. For instance, the comparison module 254 of the computing device 10 comparing he determined events pattern with an events pattern associated with the existing hypothesis 80 to determine whether the determined events pattern supports (or contradicts) the existing hypothesis 80.

In some implementations, operation 520 may further include an operation 521 for determining soundness of the existing hypothesis based on the comparison as depicted in FIG. 5b. For instance, the soundness determination module 256 of the computing device 10 determining soundness of the existing hypothesis 80 (e.g., whether the existing hypothesis 80 is a weak or a strong hypothesis) based on the comparison made, for example, by the comparison module 254. Note that the determination of "soundness" in operation 521 appears to be relatively close to the determination of "support" in operation 520. However, these operations may be distinct as it may be possible to have, for example, a determined events that does not support (e.g., contradicts) the existing hypothesis 80 (as determined in operation 520) while still determining that the existing hypothesis 80 is sound when there is, for example, strong historical data (e.g., a number of past events pattern) that supports the existing hypothesis 80. In such a scenario, the determination of a contradictory events pattern (e.g., operation 520) may result in a weaker hypothesis.

In some implementations, operation 520 may further include an operation 522 for modifying the existing hypothesis based on the comparison as depicted in FIG. 5b. For instance, the modification module 258 of the computing device 10 modifying the existing hypothesis 80 based on the comparison made, for example, by the comparison module 254. As an illustration, suppose an existing hypothesis 80 links the consumption of ice cream and coffee with increased toilet use. Suppose further that the events pattern determined by the events pattern determination module 246 (e.g., determined based on the first reported event and the second reported event) indicates that increased toilet use (e.g., as reported by the toilet monitoring device 295) occurred after only consuming ice cream (e.g., as reported by the user 20*). Then the modification module 258 may modify the existing hypothesis 80 to link increased toilet use with only the consumption of ice cream.

Figure 5C:
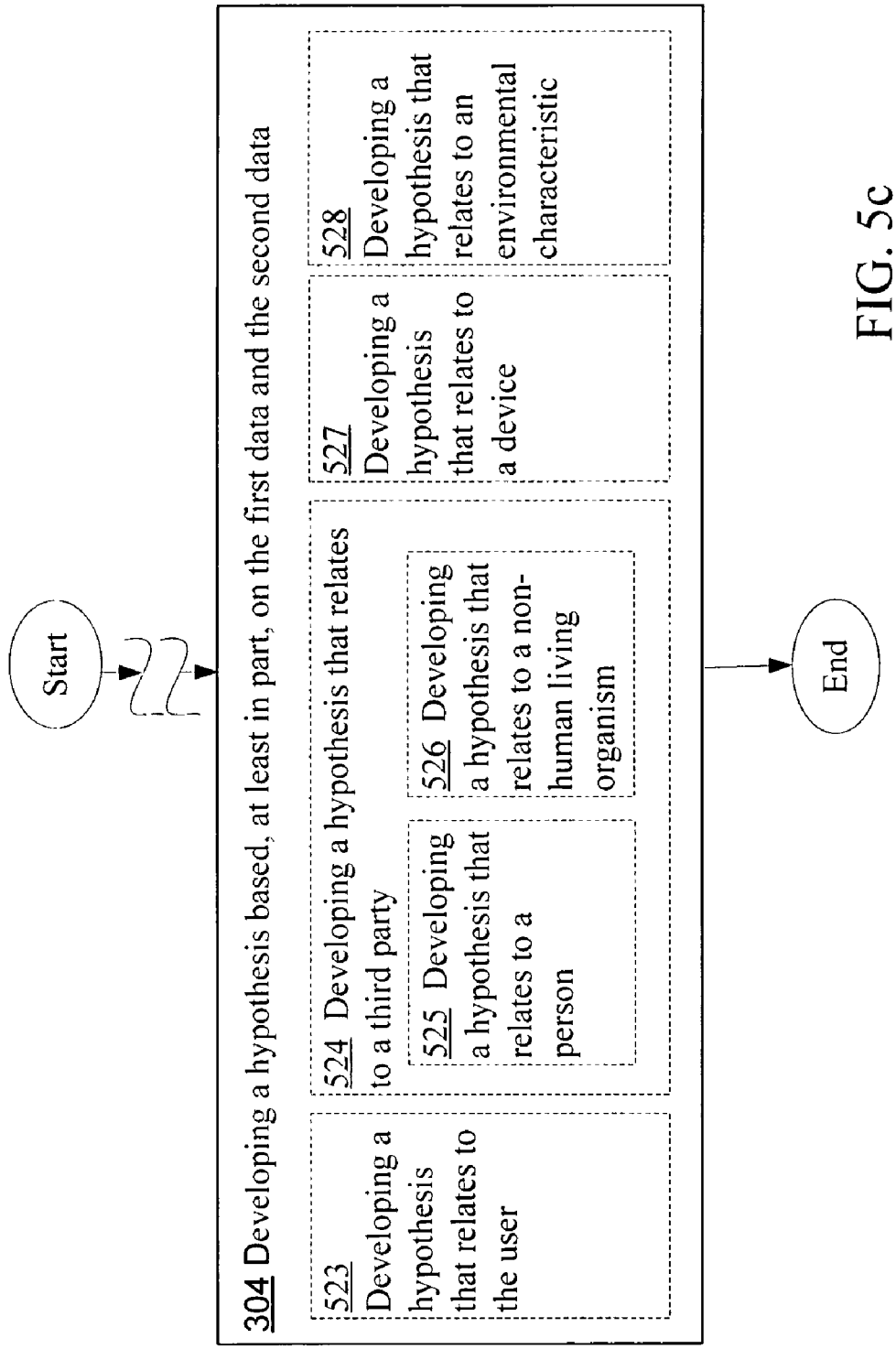
FIG. 5c is a high-level logic flowchart of a process depicting alternate implementations of the hypothesis development operation 304 of FIG. 3.

In various implementations, the hypothesis to be developed in the hypothesis development operation 304 of FIG. 3 may be related to any one or more of a variety of different entities. For example, in some implementations, the hypothesis development operation 304 may include an operation 523 for developing a hypothesis that relates to the user as depicted in FIG. 5c. For instance, the hypothesis development module 104 of the computing device 10 developing a hypothesis (e.g., creating a new hypothesis or refining an existing hypothesis 80) that relates to the user 20*.

In some alternative implementations, the hypothesis development operation 304 may include an operation 524 for developing a hypothesis that relates to a third party as depicted in FIG. 5c. For instance, the hypothesis development module 104 of the computing device 10 developing a hypothesis (e.g., creating a new hypothesis or refining an existing hypothesis 80) that relates to a third party 50 (e.g., another user, a nonuser, a pet, a livestock, and so forth).

In some implementations, operation 524 may include an operation 525 for developing a hypothesis that relates to a person as depicted in FIG. 5c. For instance, the hypothesis development module 104 of the computing device 10 developing a hypothesis (e.g., creating a new hypothesis or refining an existing hypothesis 80) that relates to a person (e.g., another user or nonuser).

In some implementations, operation 524 may include an operation 526 for developing a hypothesis that relates to a non-human living organism as depicted in FIG. 5c. For instance, the hypothesis development module 104 of the computing device 10 developing a hypothesis (e.g., creating a new hypothesis or refining an existing hypothesis 80) that relates to a non-human living organism (e.g., a pet such as a dog, a cat, or a bird, a livestock, or other types of living creatures).

In various implementations, the hypothesis development operation 304 may include an operation 527 for developing a hypothesis that relates to a device as depicted in FIG. 5c. For instance, the hypothesis development module 104 of the computing device 10 developing a hypothesis (e.g., creating a new hypothesis or refining an existing hypothesis 80) that relates to a device 55 (e.g., an automobile or a part of the automobile, a household appliance or a part of the household appliance, a mobile communication device, a computing device, and so forth).

In some implementations, the hypothesis development operation 304 may include an operation 528 for developing a hypothesis that relates to an environmental characteristic as depicted in FIG. 5c. For instance, the hypothesis development module 104 of the computing device 10 developing a hypothesis (e.g., creating a new hypothesis or refining an existing hypothesis 80) that relates to an environmental characteristic (e.g., weather, water quality, air quality, and so forth).

Figure 6:
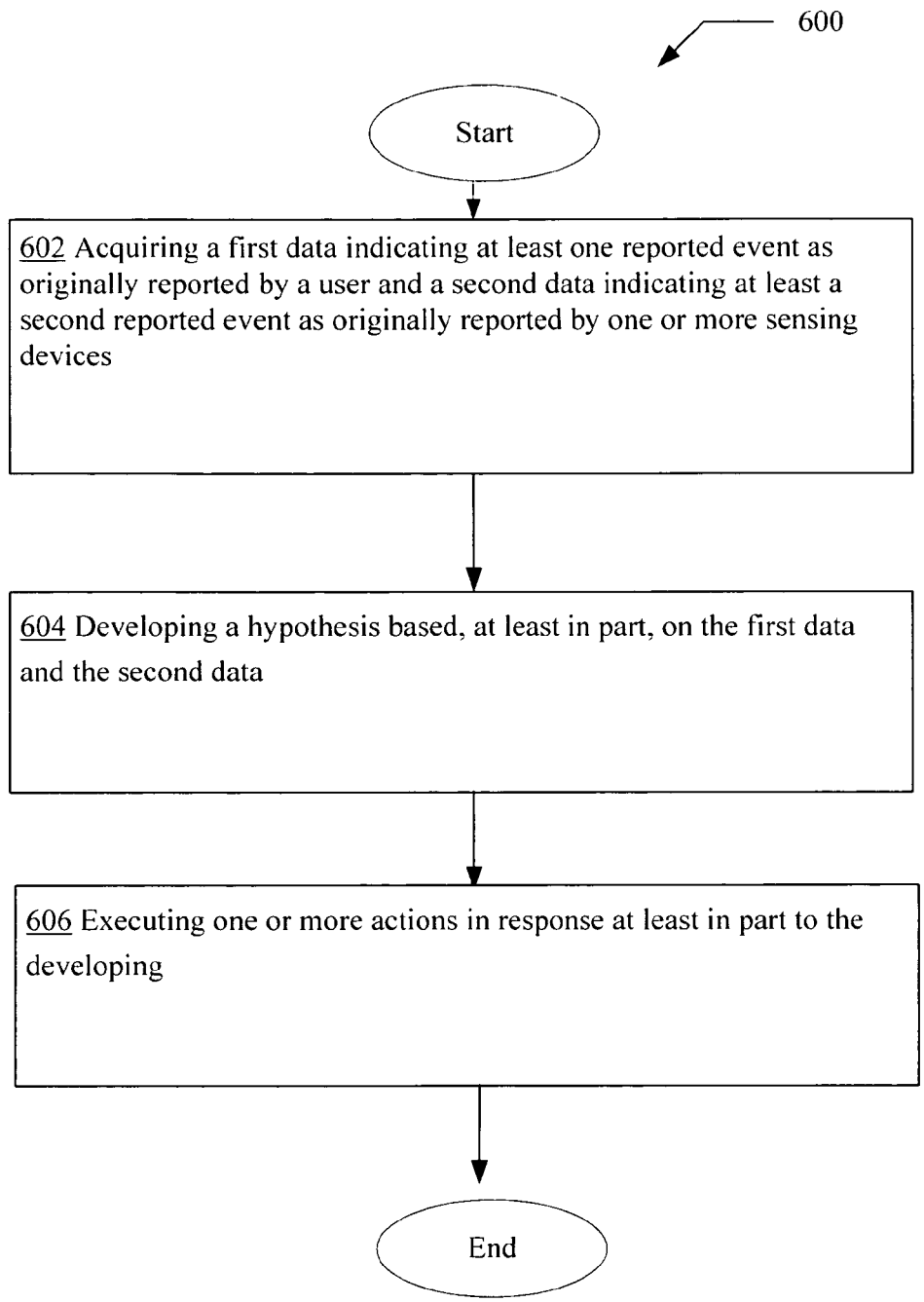
FIG. 6 is a high-level logic flowchart of another process.

Referring now to FIG. 6 illustrating another operational flow 600 in accordance with various embodiments. In some embodiments, operational flow 600 may be particularly suited to be performed by the computing device 10, which may be a network server or a standalone computing device. Operational flow 600 includes operations that mirror the operations included in the operational flow 300 of FIG. 3. For example, operational flow 600 may include a data acquisition operation 602 and a hypothesis development operation 604 that corresponds to and mirror the data acquisition operation 302 and the hypothesis development operation 304, respectively, of FIG. 3.

In addition, and unlike operational flow 300, operational flow 600 may further include an action execution operation 606 for executing one or more actions in response at least in part to the developing (e.g., developing of a hypothesis performed in the hypothesis development operation 604 of operational flow 600). For instance, the action execution module 106 of the computing device 10 executing one or more actions in response at least in part to the developing of the hypothesis (e.g., developing of the hypothesis as in the hypothesis development operation 604).

Figure 7A:
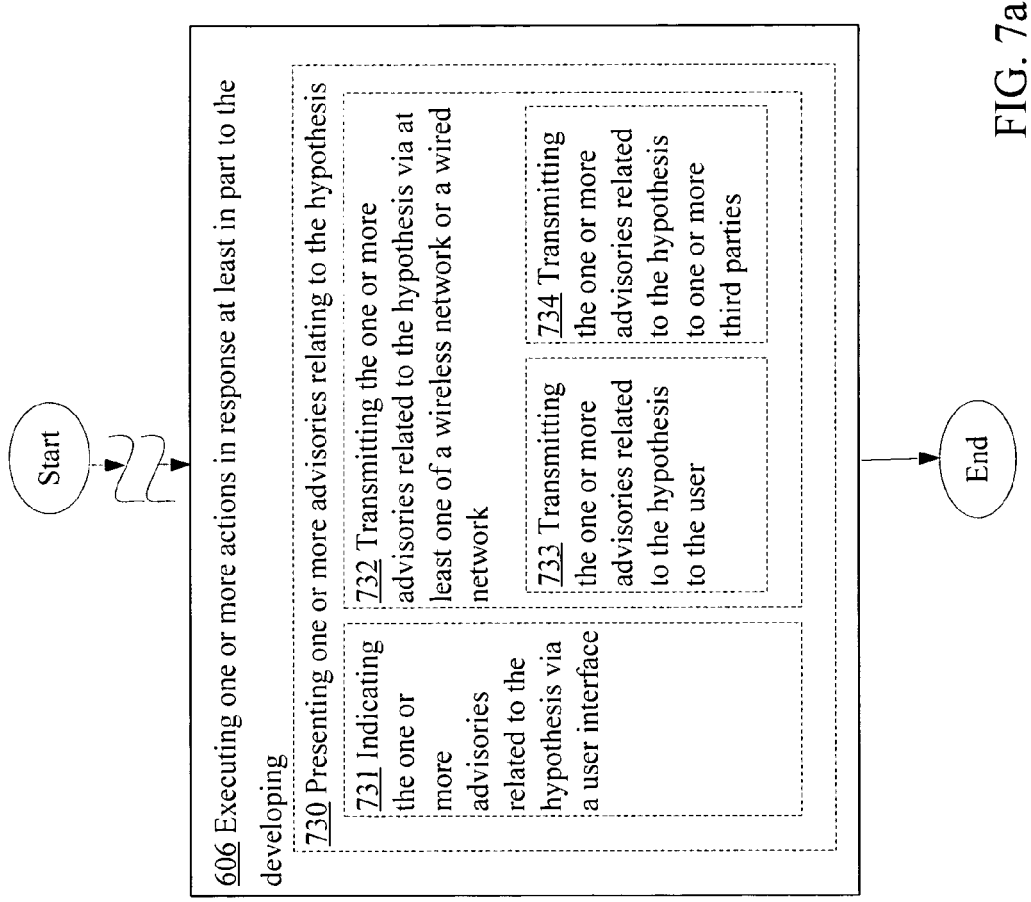
FIG. 7a is a high-level logic flowchart of a process depicting alternate implementations of the action execution operation 606 of FIG. 6.

Various types of actions may be executed in the action execution operation 606 in various alternative implementations. For example, in some implementations, the action execution operation 606 may include an operation 730 for presenting one or more advisories relating to the hypothesis as depicted in FIG. 7a. For instance, the advisory presentation module 260 of the computing device 10 presenting one or more advisories relating to the hypothesis.

The presentation of the one or more advisories in operation 730 may be performed in various ways. For example, in some implementations, operation 730 may include an operation 731 for indicating the one or more advisories related to the hypothesis via a user interface as depicted in FIG. 7a. For instance, the advisory indication module 262 of the computing device 10 indicating the one or more advisories related to the hypothesis via a user interface 122 (e.g., a display monitor, a touchscreen, a speaker system, and so forth).

In same or different implementations, operation 730 may include an operation 732 for transmitting the one or more advisories related to the hypothesis via at least one of a wireless network or a wired network as depicted in FIG. 7a. For instance, the advisory transmission module 264 of the computing device 10 transmitting (e.g., via a network interface 120) the one or more advisories related to the hypothesis via at least one of a wireless network or a wired network 40.

In some implementations, operation 732 may further include an operation 733 for transmitting the one or more advisories related to the hypothesis to the user as depicted in FIG. 7a. For instance, the advisory transmission module 264 of the computing device 10 transmitting (e.g., via a network interface 120 and to mobile device 30) the one or more advisories related to the hypothesis to the user 20a.

In the same or different implementations, operation 732 may include an operation 734 for transmitting the one or more advisories related to the hypothesis to one or more third parties as depicted in FIG. 7a. For instance, the advisory transmission module 264 of the computing device 10 transmitting (e.g., via a network interface 120) the one or more advisories related to the hypothesis to one or more third parties 50 (e.g., other users or nonusers, content providers, advertisers, network service providers, and so forth).

Figure 7B:
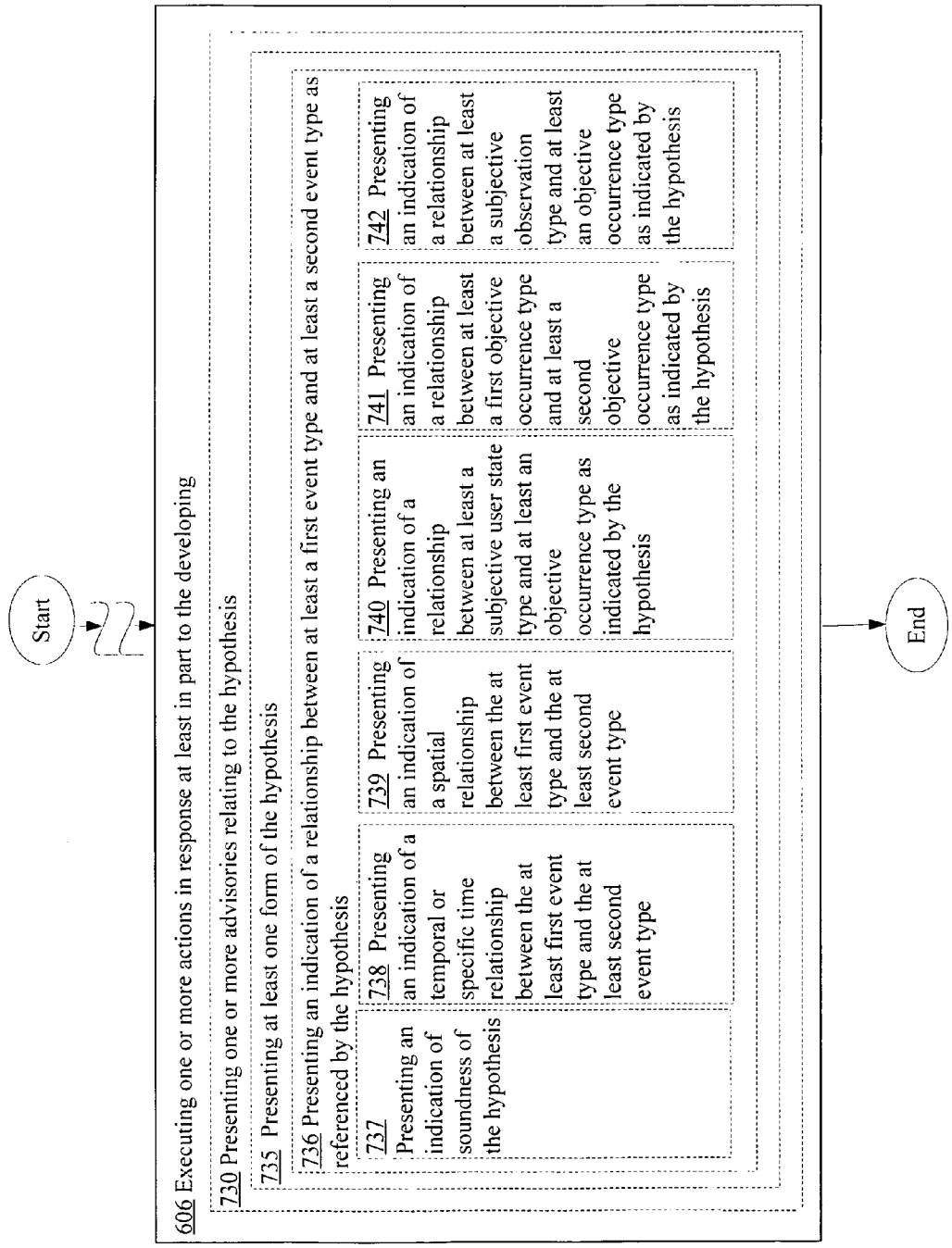
FIG. 7b is a high-level logic flowchart of a process depicting alternate implementations of the action execution operation 606 of FIG. 6.

In operation 730 of FIG. 7a, various types of advisories may be presented in various alternative implementations. For example, in some implementations, operation 730 may include an operation 735 for presenting at least one form of the hypothesis as depicted in FIG. 7b. For instance, the hypothesis presentation module 266 of the computing device 10 presenting (e.g., transmitting via a wireless and/or wired network 40 or indicated via a user interface 122) at least one form (e.g., audio, graphical, or text form) of the hypothesis.

In various instances, operation 735 may further comprise an operation 736 for presenting an indication of a relationship between at least a first event type and at least a second event type as referenced by the hypothesis as depicted in FIG. 7b. For instance, the event types relationship presentation module 268 of the computing device 10 presenting an indication of a relationship between at least a first event type (e.g., a type of event such as a subjective user state, a subjective observation, or an objective occurrence) and at least a second event type (e.g., a type of event such as an objective occurrence) as referenced by the hypothesis. For example, a hypothesis may hypothesize that a person may feel tense (e.g., subjective user state) or appear to be tense (e.g., subjective observation by another person) whenever the user blood pressure is high (e.g., objective occurrence). Note that a hypothesis does not need to indicate a cause/effect relationship, but instead, may merely indicate a linkage between different event types.

In some implementations, operation 736 may include an operation 737 for presenting an indication of soundness of the hypothesis as depicted in FIG. 7b. For instance, the hypothesis soundness presentation module 270 of the computing device 10 presenting an indication of soundness (e.g., strength or weakness) of the hypothesis. As an illustration, one way that the soundness of a hypothesis may be presented is to provide a number between, for example, 1 and 10, where 10 indicates maximum soundness (e.g., confidence). Another way to provide an indication of soundness of the hypothesis is to provide a percentage of past reported events that actually supports the hypothesis (e.g., "in the past when you have eaten ice cream, you have gotten a stomach ache within two hours of consuming the ice cream 70 percent of the time"). Of course many other ways of presenting an indication of soundness of the hypothesis may be implemented in various other alternative implementations.

In some implementations, operation 736 may include an operation 738 for presenting an indication of a temporal or specific time relationship between the at least first event type and the at least second event type as depicted in FIG. 7b. For instance, the temporal/specific time relationship presentation module 271 of the computing device presenting (e.g., transmitting via a network interface 120 or indicating via a user interface 122) an indication of a temporal or more specific time relationship between the at least first event type and the at least second event type (e.g., as referenced by the hypothesis). For example, presenting a hypothesis that indicates that a pet dog will go to the backyard (e.g., a first event type) to relieve himself after (e.g., temporal relationship) eating a bowl of ice cream.

In some implementations, operation 736 may include an operation 739 for presenting an indication of a spatial relationship between the at least first event type and the at least second event type as depicted in FIG. 7b. For instance, the spatial relationship presentation module 272 of the computing device 10 presenting an indication of a spatial relationship between the at least first event type (e.g., boss on vacation) and the at least second event type (e.g., feeling of happiness at work).

Various types of events may be linked together by the hypothesis to be presented through operation 736 of FIG. 7b. For instance, in some implementations, operation 736 may include an operation 740 for presenting an indication of a relationship between at least a subjective user state type and at least an objective occurrence type as indicated by the hypothesis as depicted in FIG. 7b. For instance, the event types relationship presentation module 268 of the computing device 10 presenting an indication of a relationship between at least a subjective user state type (e.g., overall feeling of fatigue) and at least an objective occurrence type (e.g., high blood glucose level) as indicated by the hypothesis.

In some implementations, operation 736 may include an operation 741 for presenting an indication of a relationship between at least a first objective occurrence type and at least a second objective occurrence type as indicated by the hypothesis as depicted in FIG. 7b. For instance, the event types relationship presentation module 268 of the computing device 10 presenting an indication of a relationship between at least a first objective occurrence type (e.g., consumption of white rice) and at least a second objective occurrence type (e.g., high blood glucose level) as indicated by the hypothesis.

In some implementations, operation 736 may include an operation 742 for presenting an indication of a relationship between at least a subjective observation type and at least an objective occurrence type as indicated by the hypothesis as depicted in FIG. 7b. For instance, the event types relationship presentation module 268 of the computing device 10 presenting an indication of a relationship between at least a subjective observation type (e.g., and at least an objective occurrence type (e.g., high blood glucose level) as indicated by the hypothesis.

Figure 7C:
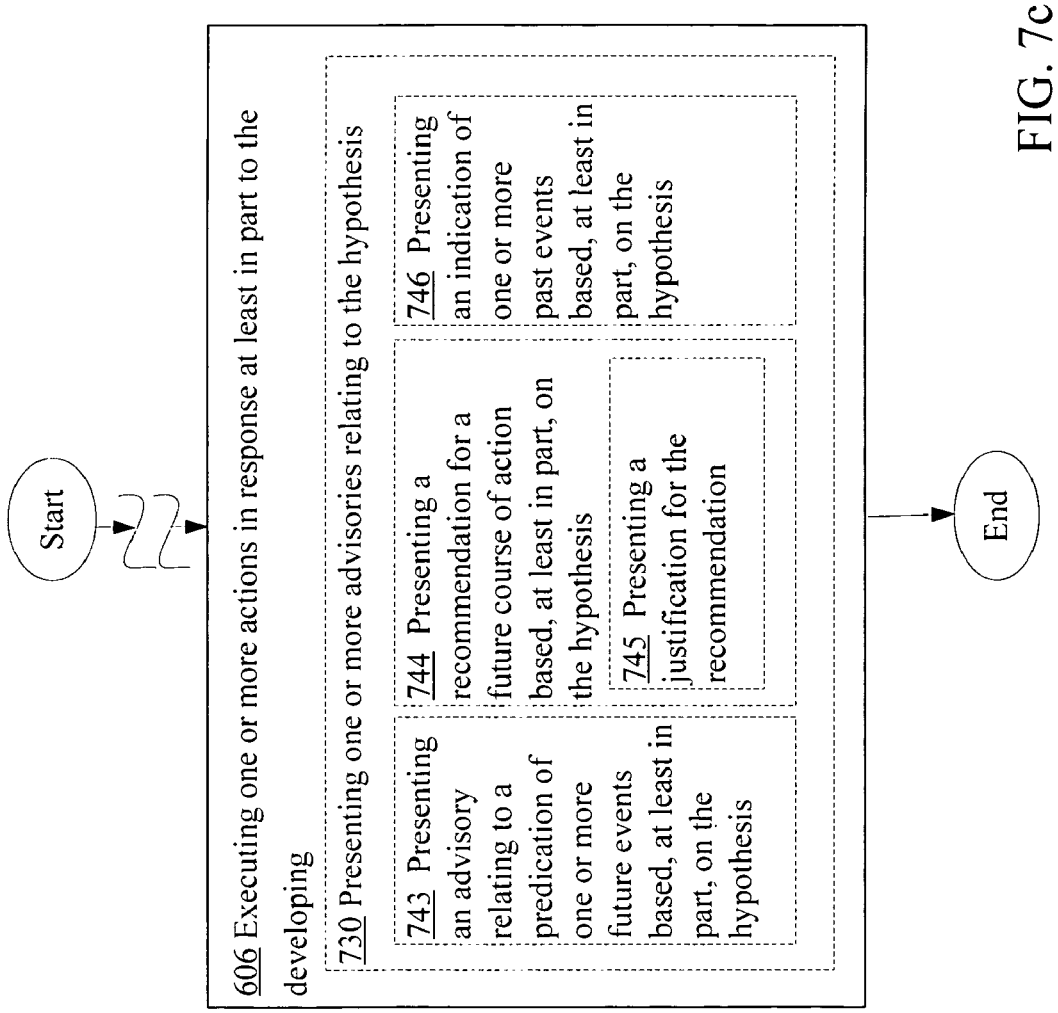
FIG. 7c is a high-level logic flowchart of a process depicting alternate implementations of the action execution operation 606 of FIG. 6.

Other types of advisories other than the hypothesis itself may also be presented through operation 730 of FIGS. 7a and 7b in various alternative implementations. For example, in some implementations, operation 730 may include an operation 743 for presenting an advisory relating to a predication of one or more future events based, at least in part, on the hypothesis as depicted in FIG. 7c. For instance, the prediction presentation module 273 of the computing device presenting an advisory relating to a predication of one or more future events (e.g., "you will have a stomach ache since you ate an ice cream an hour ago") based, at least in part, on the hypothesis.

In various implementations, operation 730 may include an operation 744 for presenting a recommendation for a future course of action based, at least in part, on the hypothesis as depicted in FIG. 7c. For instance, the recommendation presentation module 274 of the computing device 10 presenting a recommendation for a future course of action (e.g., "you should take antacid now") based, at least in part, on the hypothesis.

In some implementations, operation 744 may further include an operation 745 for presenting a justification for the recommendation as depicted in FIG. 7c. For instance, the justification presentation module 275 of the computing device 10 presenting a justification for the recommendation (e.g., "you just ate at your favorite Mexican restaurant, and each time you have gone there, you ended up with a stomach ache").

In some implementations, operation 730 may include an operation 746 for presenting an indication of one or more past events based, at least in part, on the hypothesis as depicted in FIG. 7c. For instance, the past events presentation module 276 of the computing device 10 presenting an indication of one or more past events (e.g., "did you know that the last time you went to your favorite restaurant, you subsequently had a stomach ache?") based, at least in part, on the hypothesis.

Figure 7D:
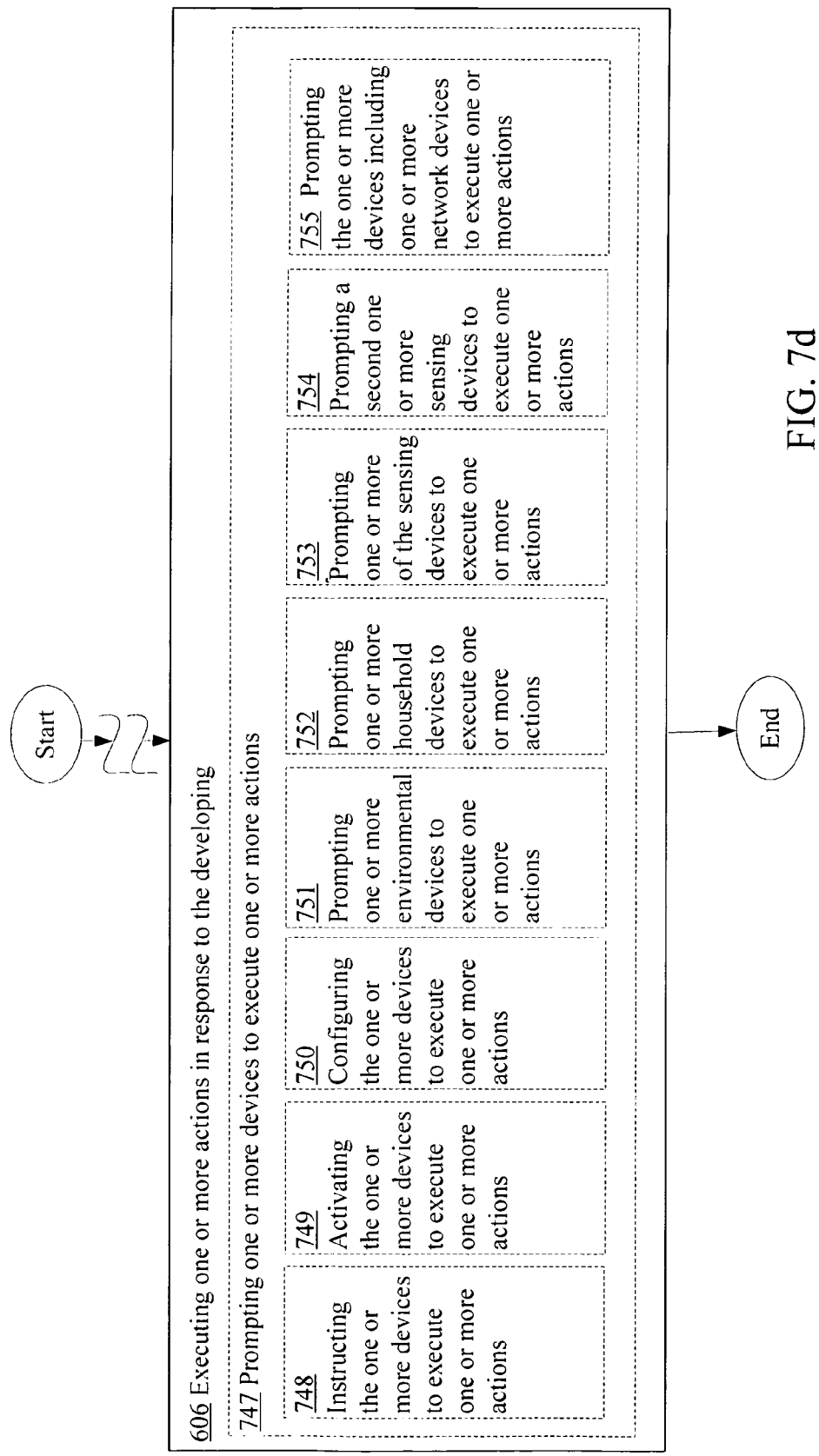
FIG. 7d is a high-level logic flowchart of a process depicting alternate implementations of the action execution operation 606 of FIG. 6.

Referring back to the action execution operation 606 of FIG. 6, in various implementations, the one or more actions to be executed in the action execution operation 606 may involve the prompting of one or more devices (e.g., sensing devices 35* or devices 55) to execute one or more actions. For example, in some implementations, the action execution operation 606 may include an operation 747 for prompting one or more devices to execute one or more actions as depicted in FIG. 7d. For instance, the device prompting module 277 of the computing device 10 prompting (e.g. as indicated by ref., 25 of FIG. 1a) one or more devices (e.g., one or more sensing devices 35* or one or more devices 55 such as an automobile or a portion thereof, a household appliance or a portion thereof, a computing device, a communication device, and so forth) to execute one or more actions. Note that the word "prompting" does not require the immediate or real time execution of one or more actions. Instead, the one or more actions may be executed by the one or more devices at some later point in time from the point in time in which the one or more devices was directed or instructed to execute the one or more actions.

In some implementations, operation 747 may include an operation 748 for instructing the one or more devices to execute one or more actions as depicted in FIG. 7d. For instance, the device instruction module 278 of the computing device 10 instructing the one or more devices (e.g., one or more sensing devices 35* or one or more devices 55 such as an automobile or a portion thereof, a household appliance or a portion thereof, a computing device, a communication device, and so forth) to execute one or more actions. For example, instructing a GPS to provide a current location for a user 20*.

In some implementations, operation 747 may include an operation 749 for activating the one or more devices to execute one or more actions as depicted in FIG. 7d. For instance, the device activation module 279 of the computing device 10 activating the one or more devices (e.g., home air conditioner/heater) to execute one or more actions (e.g., cooling or heating the home).

In some implementations, operation 747 may include an operation 750 for configuring the one or more devices to execute one or more actions as depicted in FIG. 7d. For instance, the device configuration module 280 of the computing device 10 configuring the one or more devices (e.g., automatic lawn sprinkler system) to execute one or more actions.

In some implementations, operation 747 may include an operation 751 for prompting one or more environmental devices to execute one or more actions as depicted in FIG. 7d. For instance, the device prompting module 277 of the computing device 10 prompting one or more environmental devices (e.g., air conditioner, heater, humidifier, air purifier, and/or other environmental devices) to execute one or more actions.

In some implementations, operation 747 may include an operation 752 for prompting one or more household devices to execute one or more actions as depicted in FIG. 7d. For instance, the device prompting module 277 of the computing device 10 prompting one or more household devices (e.g., coffee maker, television, lights, and so forth) to execute one or more actions.

In some implementations, operation 747 may include an operation 753 for prompting one or more of the sensing devices to execute one or more actions as depicted in FIG. 7d. For instance, the device prompting module 277 of the computing device 10 prompting one or more of the sensing devices 35* (e.g., environmental temperature sensor device 298) to execute one or more actions.

In some implementations, operation 747 may include an operation 754 for prompting a second one or more sensing devices to execute one or more actions as depicted in FIG. 7d. For instance, the device prompting module 277 of the computing device 10 prompting a second one or more sensing devices 35* (e.g., environmental humidity sensor device 299) to execute one or more actions.

In some implementations, operation 747 may include an operation 755 for prompting the one or more devices including one or more network devices to execute one or more actions as depicted in FIG. 7d. For instance, the device prompting module 277 of the computing device 10 prompting the one or more devices 55 including one or more network devices (e.g., when one or more of the devices 55 are linked to the wireless and/or wired network 40) to execute one or more actions.

Those having skill in the art will recognize that the state of the art has progressed to the point where there is little distinction left between hardware and software implementations of aspects of systems; the use of hardware or software is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

In a general sense, those skilled in the art will recognize that the various aspects described herein which can be implemented, individually and/or collectively, by a wide range of hardware, software, firmware, or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of random access memory), and/or electrical circuitry forming a communications device (e.g., a modem, communications switch, or optical-electrical equipment). Those having skill in the art will recognize that the subject matter described herein may be implemented in an analog or digital fashion or some combination thereof.

Those having skill in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. Furthermore, it is to be understood that the invention is defined by the appended claims.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.).

In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

What is claimed is:

1. A computationally-implemented system in the form of a machine, article of manufacture, or composition of matter, comprising:

means for acquiring a first data indicating at least one reported event as originally reported by a user and a second data indicating at least a second reported event as originally reported by one or more sensing devices; and
   means for developing a hypothesis based, at least in part, on the first data and the second data.

2. The computationally-implemented system of claim 1, wherein said means for acquiring a first data indicating at least one reported event as originally reported by a user and a second data indicating at least a second reported event as originally reported by one or more sensing devices comprises:
  means for prompting the user to report an occurrence of an event.

3. The computationally-implemented system of claim 1, wherein said means for acquiring a first data indicating at least one reported event as originally reported by a user and a second data indicating at least a second reported event as originally reported by one or more sensing devices comprises:
  means for acquiring, via one or more electronic entries, a first data indicating at least one reported event as originally reported by the user.

4. The computationally-implemented system of claim 3, wherein said means for acquiring, via one or more electronic entries, a first data indicating at least one reported event as originally reported by the user comprises:
  means for acquiring, via one or more blog entries, a first data indicating at least one reported event as originally reported by the user.

5. The computationally-implemented system of claim 3, wherein said means for acquiring, via one or more electronic entries, a first data indicating at least one reported event as originally reported by the user comprises:
  means for acquiring, via one or more status report entries, a first data indicating at least one reported event as originally reported by the user.

6. The computationally-implemented system of claim 1, wherein said means for acquiring a first data indicating at least one reported event as originally reported by a user and a second data indicating at least a second reported event as originally reported by one or more sensing devices comprises:
  means for acquiring a first data indicating at least one subjective user state of the user as originally reported by the user.

7. The computationally-implemented system of claim 1, wherein said means for acquiring a first data indicating at least one reported event as originally reported by a user and a second data indicating at least a second reported event as originally reported by one or more sensing devices comprises:
  means for acquiring a first data indicating at least one subjective observation made by the user.

8. The computationally-implemented system of claim 7, wherein said means for acquiring a first data indicating at least one subjective observation made by the user comprises:
  means for acquiring a first data indicating at least one subjective observation made by the user relating to an external event.

9. The computationally-implemented system of claim 1, wherein said means for acquiring a first data indicating at least one reported event as originally reported by a user and a second data indicating at least a second reported event as originally reported by one or more sensing devices comprises:
  means for acquiring a first data indicating at least one objective occurrence as originally reported by the user.

10. The computationally-implemented system of claim 9, wherein said means for acquiring a first data indicating at least one objective occurrence as originally reported by the user comprises:
  means for acquiring a first data indicating at least one activity executed by the user as originally reported by the user.

11. The computationally-implemented system of claim 9, wherein said means for acquiring a first data indicating at least one objective occurrence as originally reported by the user comprises:
  means for acquiring a first data indicating one or more physical characteristics of the user as originally reported by the user.

12. The computationally-implemented system of claim 1, wherein said means for acquiring a first data indicating at least one reported event as originally reported by a user and a second data indicating at least a second reported event as originally reported by one or more sensing devices comprises:
  means for acquiring the second data including data indicating one or more physical characteristics of the user as originally reported by the one or more sensing devices.

13. The computationally-implemented system of claim 12, wherein said means for acquiring the second data including data indicating one or more physical characteristics of the user as originally reported by the one or more sensing devices comprises:
  means for acquiring the second data including data indicating one or more physiological characteristics of the user as originally reported by the one or more sensing devices.

14. The computationally-implemented system of claim 13, wherein said means for acquiring the second data including data indicating one or more physiological characteristics of the user as originally reported by the one or more sensing devices comprises:
  means for acquiring the second data including glucose sensor data relating to the user.

15. The computationally-implemented system of claim 13, wherein said means for acquiring the second data including data indicating one or more physiological characteristics of the user as originally reported by the one or more sensing devices comprises:
  means for acquiring the second data including blood cell-sorting sensor data relating to the user.

16. The computationally-implemented system of claim 13, wherein said means for acquiring the second data including data indicating one or more physiological characteristics of the user as originally reported by the one or more sensing devices comprises:
  means for acquiring the second data including sensor data relating to blood oxygen or blood volume changes of a brain of the user.

17. The computationally-implemented system of claim 12, wherein said means for acquiring the second data including data indicating one or more physical characteristics of the user as originally reported by the one or more sensing devices comprises:
  means for acquiring the second data including imaging system data relating to the user.

18. The computationally-implemented system of claim 1, wherein said means for acquiring a first data indicating at least one reported event as originally reported by a user and a second data indicating at least a second reported event as originally reported by one or more sensing devices comprises:
  means for acquiring the second data including data indicating one or more activities of the user.

19. The computationally-implemented system of claim 18, wherein said means for acquiring the second data including data indicating one or more activities of the user comprises:
means for acquiring the second data including pedometer data relating to the user.

20. The computationally-implemented system of claim 18, wherein said means for acquiring the second data including data indicating one or more activities of the user comprises:
means for acquiring the second data including accelerometer device data relating to the user.

21. The computationally-implemented system of claim 18, wherein said means for acquiring the second data including data indicating one or more activities of the user comprises:
means for acquiring the second data including image capturing device data relating to the user.

22. The computationally-implemented system of claim 18, wherein said means for acquiring the second data including data indicating one or more activities of the user comprises:
means for acquiring the second data including toilet monitoring device data relating to the user.

23. The computationally-implemented system of claim 18, wherein said means for acquiring the second data including data indicating one or more activities of the user comprises:
means for acquiring the second data including exercising machine sensor data relating to the user.

24. The computationally-implemented system of claim 1, wherein said means for acquiring a first data indicating at least one reported event as originally reported by a user and a second data indicating at least a second reported event as originally reported by one or more sensing devices comprises:
means for acquiring the second data including global positioning system (GPS) data indicating at least one location of the user.

25. The computationally-implemented system of claim 1, wherein said means for acquiring a first data indicating at least one reported event as originally reported by a user and a second data indicating at least a second reported event as originally reported by one or more sensing devices comprises:
means for acquiring the second data including temperature sensor data indicating at least one environmental temperature associated with a location of the user.

26. The computationally-implemented system of claim 1, wherein said means for acquiring a first data indicating at least one reported event as originally reported by a user and a second data indicating at least a second reported event as originally reported by one or more sensing devices comprises:
means for acquiring the second data including air pollution sensor data indicating at least one air pollution level associated with a location of the user.

27. The computationally-implemented system of claim 1, wherein said means for acquiring a first data indicating at least one reported event as originally reported by a user and a second data indicating at least a second reported event as originally reported by one or more sensing devices comprises:
means for acquiring the second data including environmental characteristic sensor data indicating at least one environmental characteristic.

28. The computationally-implemented system of claim 1, wherein said means for acquiring a first data indicating at least one reported event as originally reported by a user and a second data indicating at least a second reported event as originally reported by one or more sensing devices comprises:
means for acquiring a third data indicating a third reported event as originally reported by a third party and a fourth data indicating a fourth reported event as originally reported by another one or more sensing devices.

29. The computationally-implemented system of claim 1, wherein said means for developing a hypothesis based, at least in part, on the first data and the second data comprises:
means for developing a hypothesis by creating the hypothesis based, at least in part, on the at least one reported event and the at least second reported event.

30. The computationally-implemented system of claim 29, wherein said means for developing a hypothesis by creating the hypothesis based, at least in part, on the at least one reported event and the at least second reported event comprises:
means for creating the hypothesis by determining an events pattern based, at least in part, on occurrence of the at least one reported event and occurrence of the at least second reported event.

31. The computationally-implemented system of claim 1, wherein said means for developing a hypothesis based, at least in part, on the first data and the second data comprises:
means for developing a hypothesis by refining an existing hypothesis based, at least in part, on the at least one reported event and the at least second reported event.

32. The computationally-implemented system of claim 31, wherein said means for developing a hypothesis by refining an existing hypothesis based, at least in part, on the at least one reported event and the at least second reported event comprises:
means for refining the existing hypothesis by at least determining an events pattern based, at least in part, on occurrence of the at least one reported event and occurrence of the at least second reported event.

33. The computationally-implemented system of claim 32, wherein said means for refining the existing hypothesis by at least determining an events pattern based, at least in part, on occurrence of the at least one reported event and occurrence of the at least second reported event comprises:
means for refining the existing hypothesis by determining whether the determined events pattern supports the existing hypothesis.

34. The computationally-implemented system of claim 33, wherein said means for refining the existing hypothesis by determining whether the determined events pattern supports the existing hypothesis comprises:
means for comparing the determined events pattern with an events pattern associated with the existing hypothesis to determine whether the determined events pattern supports the existing hypothesis.

35. The computationally-implemented system of claim 34, wherein said means for comparing the determined events pattern with an events pattern associated with the existing hypothesis to determine whether the determined events pattern supports the existing hypothesis comprises:
means for modifying the existing hypothesis based on the comparison.

36. The computationally-implemented system of claim 1, wherein said means for developing a hypothesis based, at least in part, on the first data and the second data comprises:
means for developing a hypothesis that relates to the user.

37. The computationally-implemented system of claim 1, further comprising:
means for executing one or more actions in response at least in part to the developing.

38. The computationally-implemented system of claim 37, wherein said means for executing one or more actions in response at least in part to the developing comprises:
   means for presenting one or more advisories relating to the hypothesis.

39. The computationally-implemented system of claim 38, wherein said means for presenting one or more advisories relating to the hypothesis comprises:
   means for presenting at least one form of the hypothesis.

40. The computationally-implemented system of claim 39, wherein said means for presenting at least one form of the hypothesis comprises:
   means for presenting an indication of a relationship between at least a first event type and at least a second event type as referenced by the hypothesis.

41. The computationally-implemented system of claim 40, wherein said means for presenting an indication of a relationship between at least a first event type and at least a second event type as referenced by the hypothesis comprises:
   means for presenting an indication of a relationship between at least a subjective user state type and at least an objective occurrence type as indicated by the hypothesis.

42. The computationally-implemented system of claim 40, wherein said means for presenting an indication of a relationship between at least a first event type and at least a second event type as referenced by the hypothesis comprises:
   means for presenting an indication of a relationship between at least a first objective occurrence type and at least a second objective occurrence type as indicated by the hypothesis.

43. The computationally-implemented system of claim 40, wherein said means for presenting an indication of a relationship between at least a first event type and at least a second event type as referenced by the hypothesis comprises:
   means for presenting an indication of a relationship between at least a subjective observation type and at least an objective occurrence type as indicated by the hypothesis.

44. The computationally-implemented system of claim 37, wherein said means for executing one or more actions in response at least in part to the developing comprises:
   means for prompting one or more devices to execute one or more actions.

45. A computationally-implemented method, comprising:
   acquiring a first data indicating at least one reported event as originally reported by a user and a second data indicating at least a second reported event as originally reported by one or more sensing devices; and
   developing a hypothesis based, at least in part, on the first data and the second data, wherein said developing a hypothesis based, at least in part, on the first data and the second data is performed via at least one of a machine, article of manufacture, or composition of matter.

* * * * *